United States Patent [19]

Kim et al.

[11] Patent Number: 5,899,807
[45] Date of Patent: May 4, 1999

[54] DISCHARGE CURRENT CONTROL APPARATUS OF AIR CONDITIONER AND METHOD THEREOF

[75] Inventors: Young-Man Kim; Jae-Seok Cho, both of Seoul, Rep. of Korea

[73] Assignee: Samsung Electronics Co., Ltd., Suwon, Rep. of Korea

[21] Appl. No.: 08/901,741

[22] Filed: Jul. 28, 1997

[30] Foreign Application Priority Data

Sep. 12, 1996 [KR] Rep. of Korea ................... 96-39518
Sep. 19, 1996 [KR] Rep. of Korea ................... 96-40864

[51] Int. Cl.$^6$ .............................. G05D 23/00; F24F 7/00
[52] U.S. Cl. .............................. 454/229; 236/51; 236/94
[58] Field of Search .......................... 236/49.3, 51, 94, 236/91 C; 454/256, 229

[56] References Cited

U.S. PATENT DOCUMENTS 5,637,040  6/1997  Kim et al. ............................. 454/256

FOREIGN PATENT DOCUMENTS

| 0018013 | 1/1984 | Japan ................................ 236/94 |
| 403079943 | 4/1991 | Japan ................................ 236/94 |
| 2260830 | 4/1993 | United Kingdom ................... 454/229 |

*Primary Examiner*—William Wayner
*Attorney, Agent, or Firm*—Burns, Doane, Swecker & Mathis, L.L.P.

[57] ABSTRACT

A discharge current control apparatus of an air conditioner and method thereof having a plurality of suction inlets for sucking an indoor air, a heat exchanger for heat-exchanging the indoor air sucked through the suction inlets, a discharge outlet for discharging the air heat-exchanged by the heat exchanger, a plurality of wind direction blades for controlling a wind direction of the air discharged through the discharge outlet, and an indoor fan for controlling a wind amount of the air discharged through the discharge outlet, the apparatus comprising a distance detecting unit for sensing a human body nearness distance by detecting infrared generated from a human body, a position detecting unit for sensing a human body left and right position by detecting infrared generated from a human body, a control unit for controlling a wind direction, a wind amount, and a predetermined temperature of the discharged air, so that the discharged air can be supplied to an area where the human body exits according to the human body nearness distance sensed by the distance detecting unit and the human body left and right position sensed by the position detecting unit, a wind direction control unit for controlling a wind direction of the discharged air according to the control of the control unit, and a wind amount control unit for controlling a wind amount of the discharged air according to the control of the control unit.

16 Claims, 54 Drawing Sheets

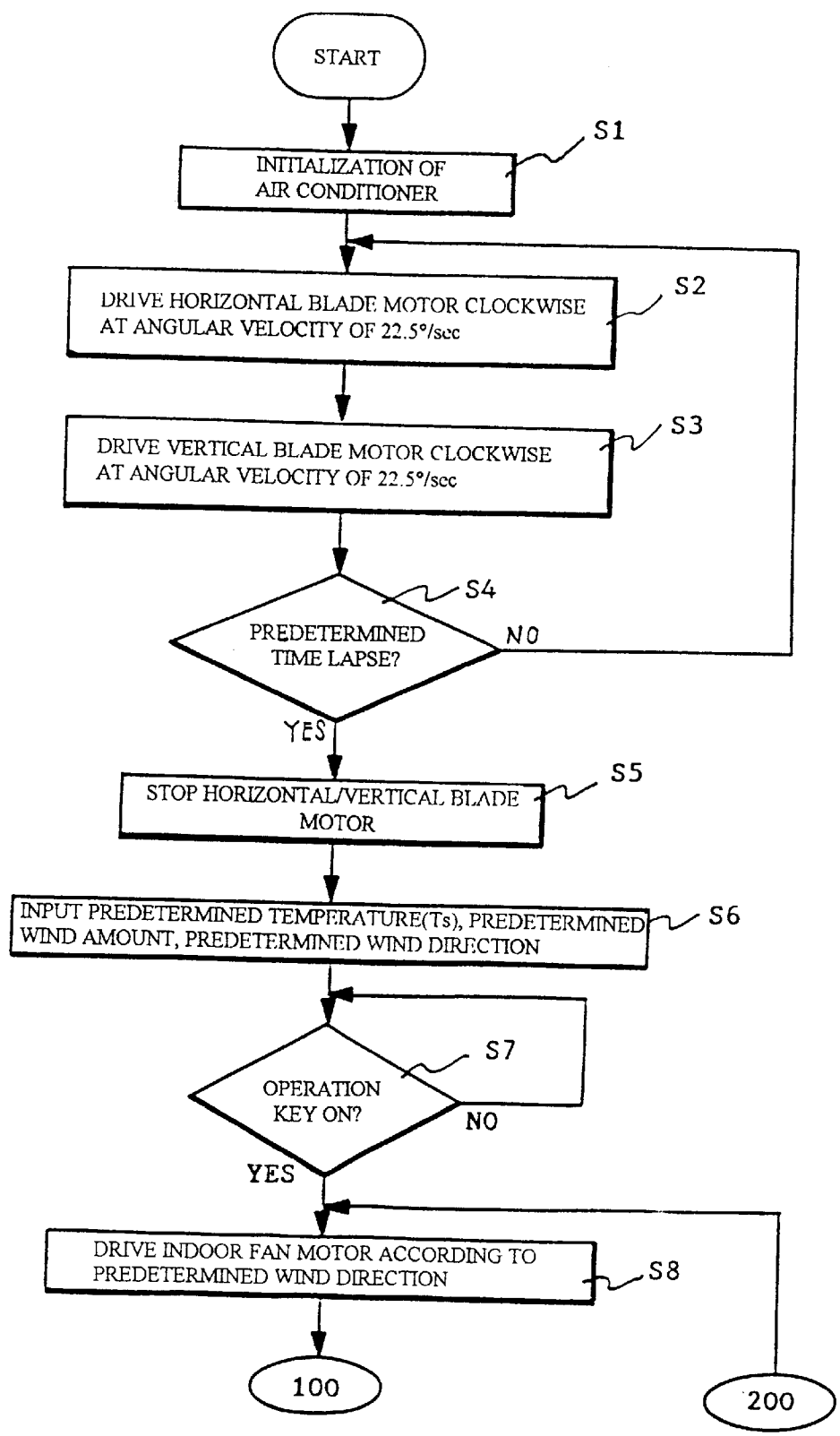

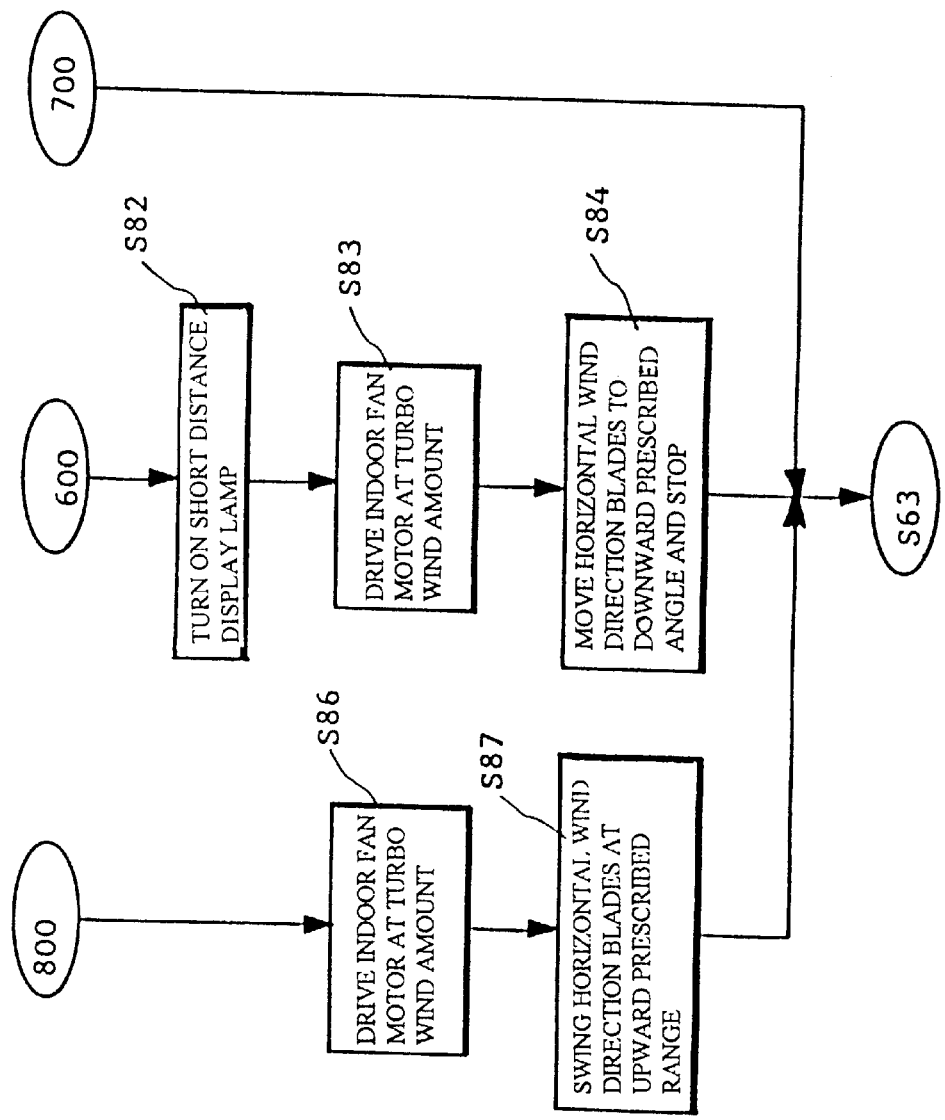

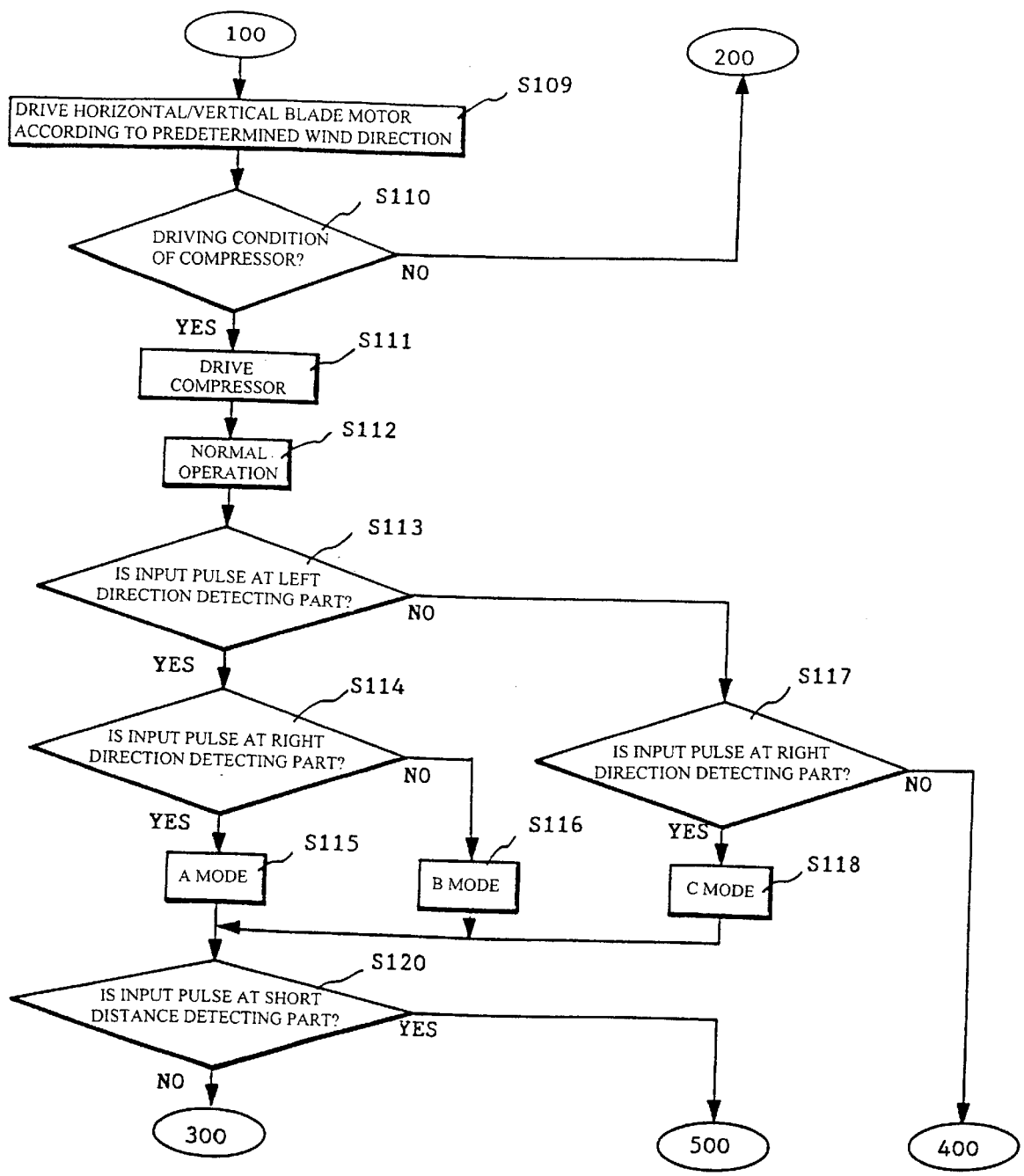

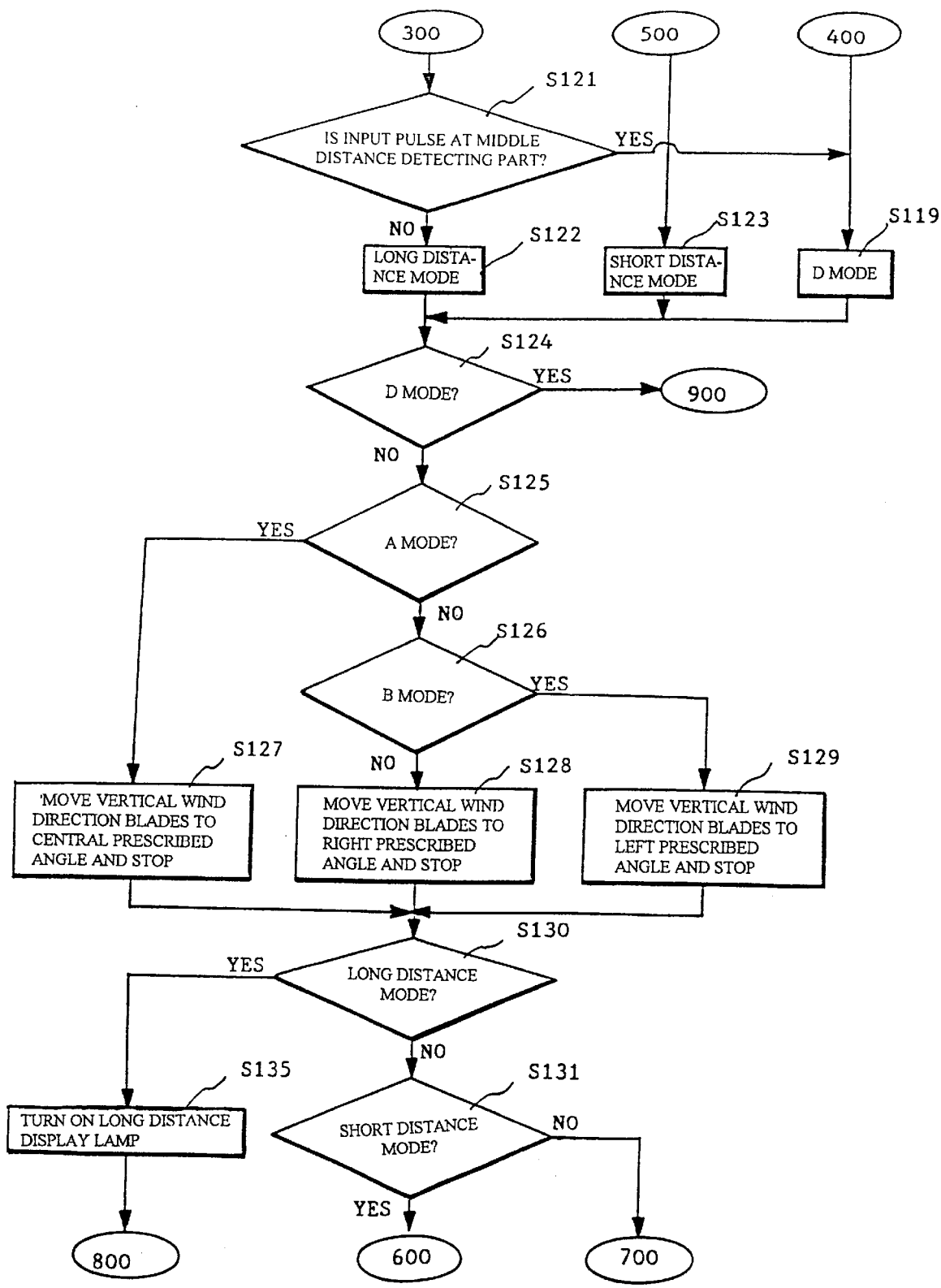

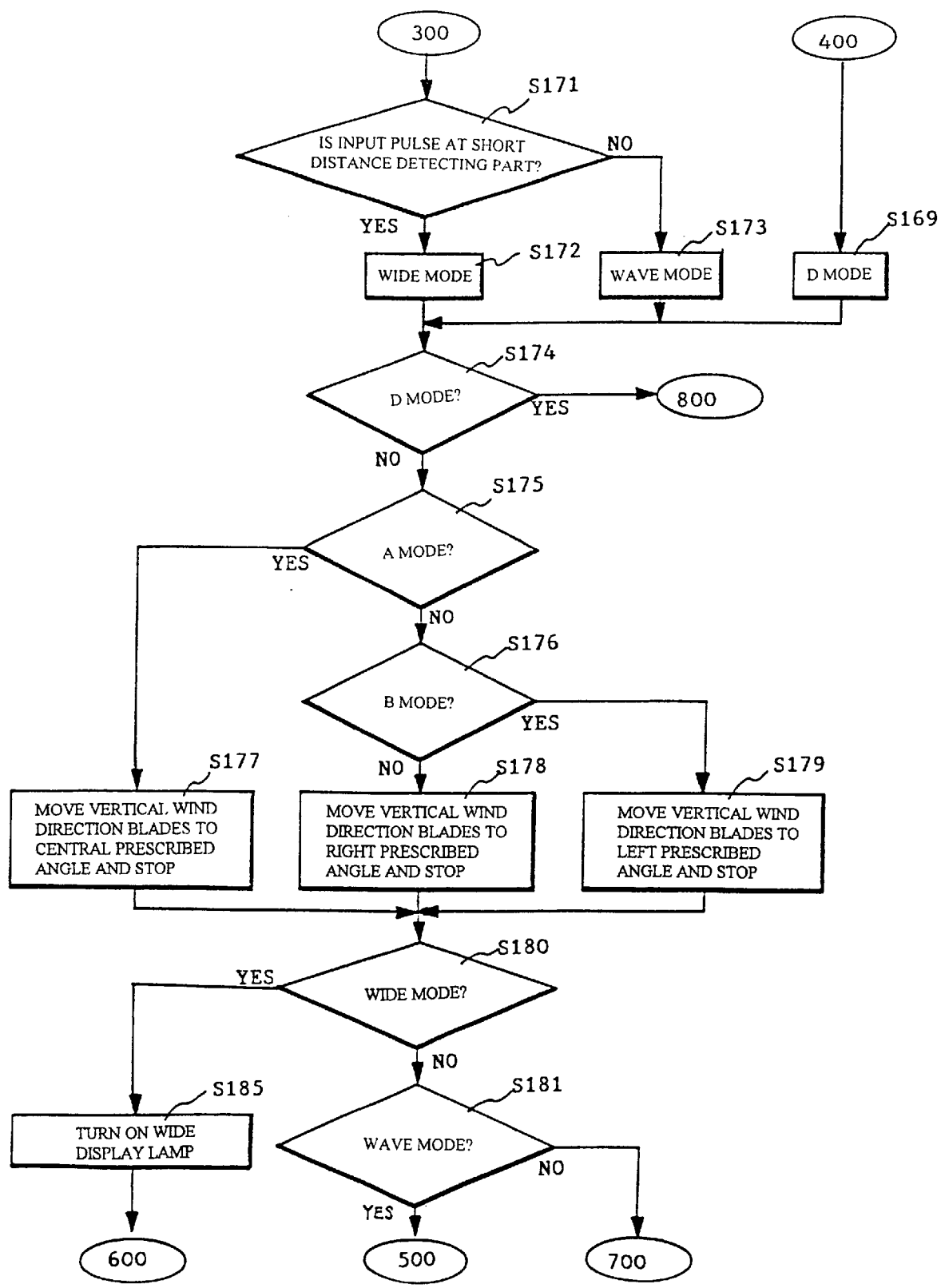

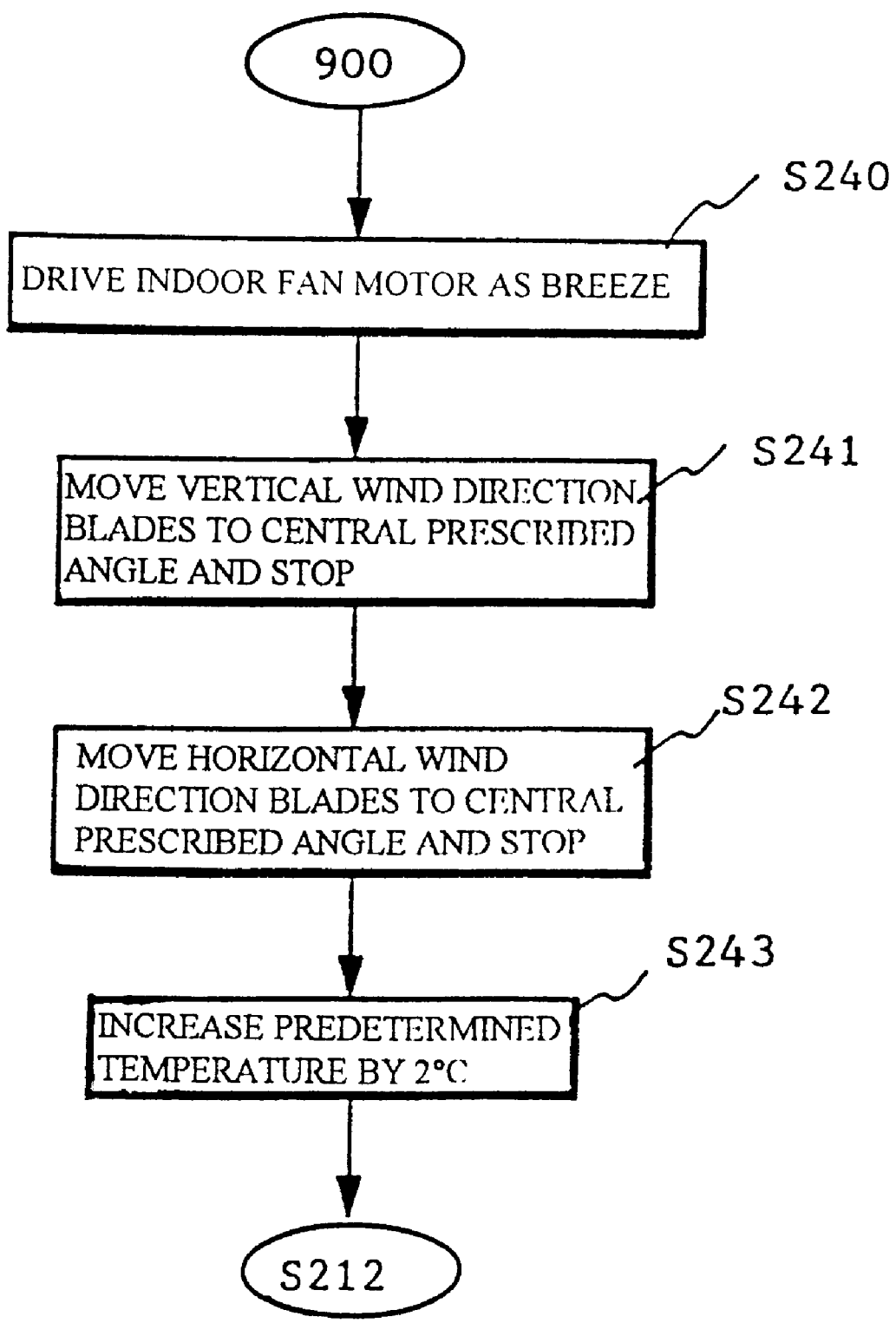

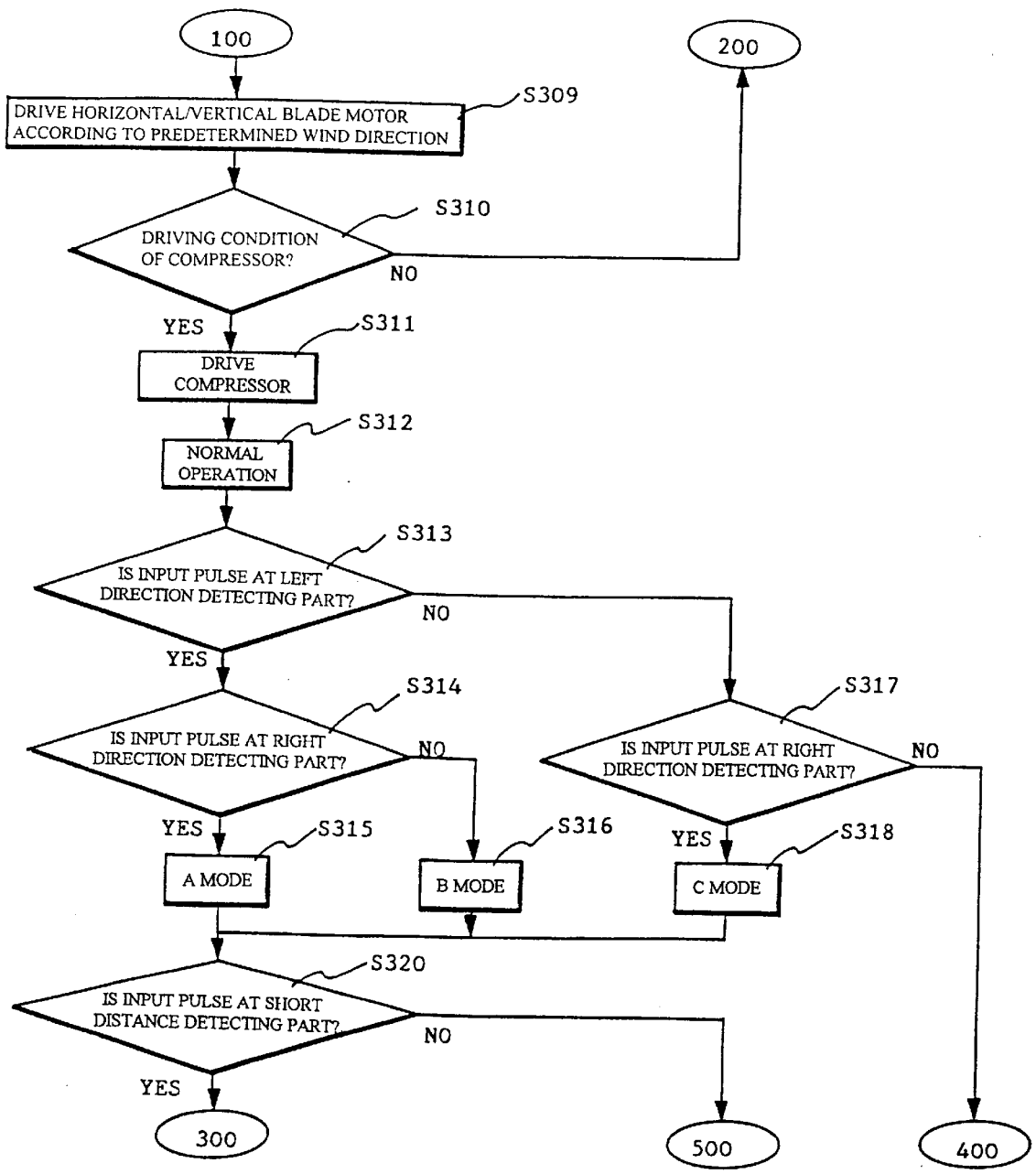

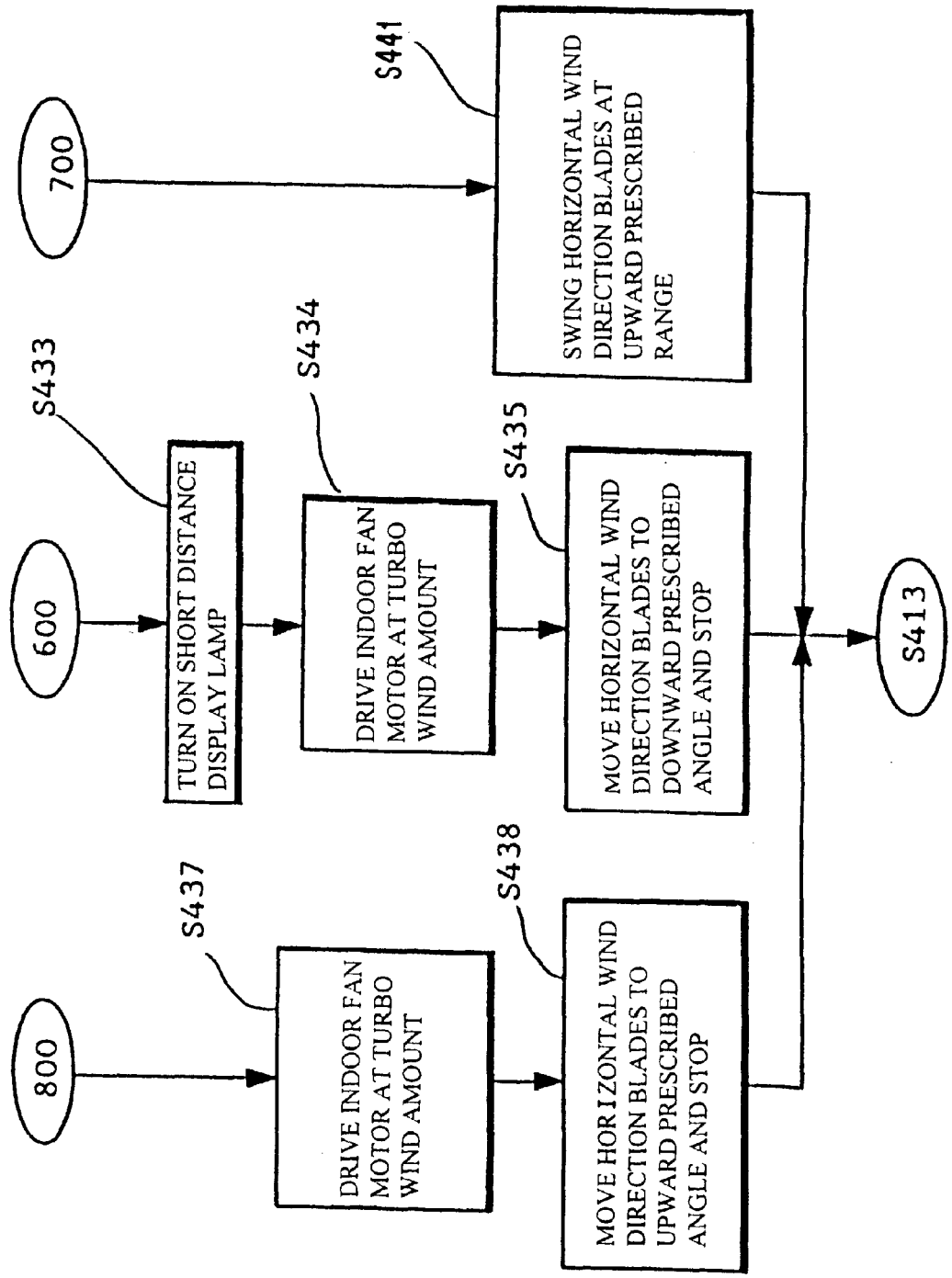

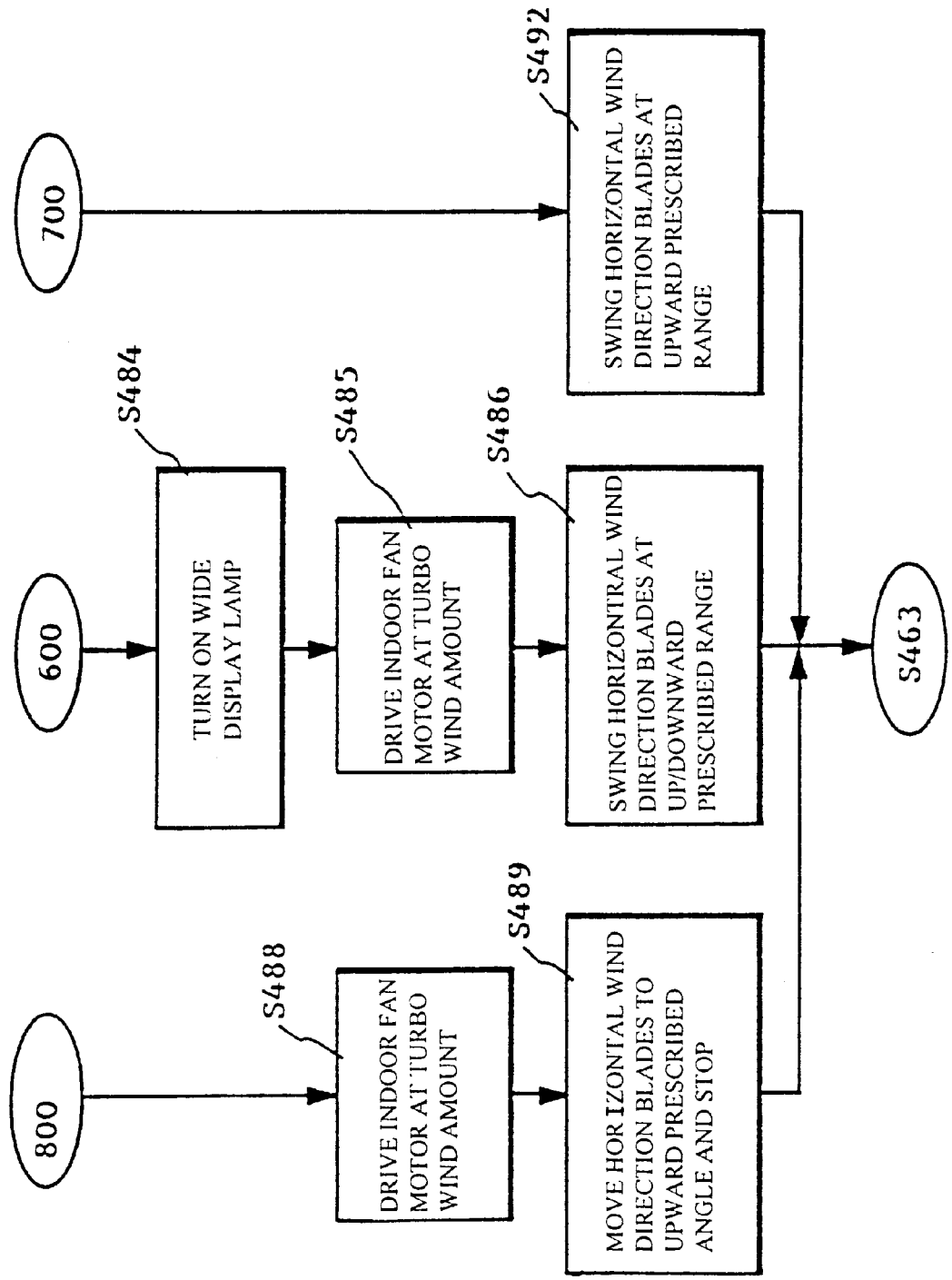

FIG. 14A 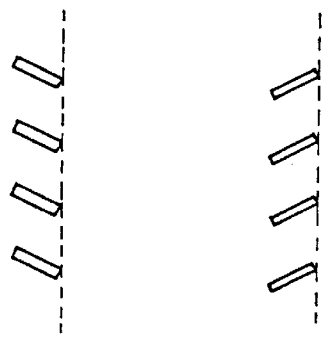 FIG. 14C 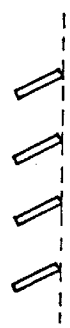 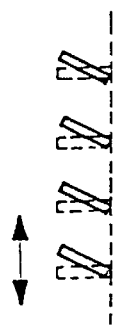 FIG. 14E  
FIG. 14B
FIG. 14D

DISCHARGE CURRENT CONTROL APPARATUS OF AIR CONDITIONER AND METHOD THEREOF

BACKGROUND OF THE INVENTION

1. Field of the Invention

The present invention relates to an air conditioner, and more particularly to a discharge current control apparatus of an air conditioner and method thereof which accomplish an air conditioning of whole indoor areas by controlling a wind direction, a wind amount and a predetermined temperature of a discharged air.

2. Description of the Prior Art

As shown in FIG. 1, a conventional air conditioner includes an indoor unit body 1 (hereinafter referred to as "body"), a suction inlet grille member 5 having a plurality of suction inlets 3 for sucking an indoor air and disposed at a lower portion of a front surface of the body 1, and a discharge outlet 7 discharging an air, which is sucked through the suction inlet 3 and transformed into a cool wind or a warm wind by heat exchange, to indoor space and disposed at an upper portion of the front surface of the body 1.

The discharge outlet 7 includes a plurality of horizontal wind direction blades 9 for controlling upward and downward a wind direction of an air discharged through the discharge outlet 7 into the indoor space and a plurality of vertical wind direction blades 11 for controlling the wind direction leftward and rightward. A cover member 13, which beautifies an external appearance of the indoor unit and protects internal parts, is provided at the front surface of the body 1.

A lower portion of the cover member 13 is provided with a control unit 15 for controlling operation modes of the air conditioner (automatic action, air cooling, humidity removal, air blast, air heating, etc.), start/stop of operation, and a wind direction and a wind amount of the air discharged through the discharge outlet 7.

In addition, as shown in FIG. 2, an inside of the suction inlet grille member 5 is provided with a filter member 17 filtering foreign particles such as dusts which float in the indoor air and are sucked through the suction inlet 3. An inside of the filter member 17 is provided with a linear heat exchanger 19 which transforms an indoor air filtered through the filter member 17 into the cool wind or the warm wind by a latent heat of vaporization of refrigerant.

Besides, an upper portion of the heat exchanger 19 is installed with a blower fan 23 (hereinafter referred to as "indoor fan") rotating according to a driving of an indoor fan motor 21 so as to suck the indoor air through the suction inlet 3 and simultaneously discharge the heat-exchanged air through the discharge outlet 7 into the indoor space. An outside of the indoor fan 23 is provided with a duct member 25 which covers the indoor fan 23 and at the same time guides the air flow sucked through the suction inlet 3 and discharged through the discharge outlet 7.

In the aforementioned air conditioner, when a user selects a desired operation mode and turns on an operation key by operating a remote controller or a control unit 15, the indoor fan 23 is rotated according to the driving of the indoor fan motor 21 so that the indoor air is sucked through the suction inlet 3 into the body 1.

The filter member 17 removes the foreign particles such as dusts, which float in the indoor air and are sucked through the suction inlet 3, and then the filtered indoor air is heat-exchanged by the latent heat of vaporization of the refrigerant flowing within the heat exchanger 19 during a passage of the heat exchanger 19.

The heat-exchanged air is guided upward by means of the duct member 25 and then is discharged through the discharge outlet 7 into the indoor space. At this time, the wind direction of the discharged air is controlled upward and downward or leftward and rightward according to an angle of wind direction of the horizontal wind direction blades 9 and vertical wind direction blades 11.

A method which controls the wind direction of the discharged air upward and downward is as follows: when a key provided at the control unit 15 for operating the horizontal wind direction blades 9 is turned on, an angle of the horizontal wind direction blades 9 is changed upward and downward, and when the key is turned off, the operation of the horizontal wind direction blades 9 is stopped.

In addition, a method which controls the wind direction of the discharged air leftward and rightward is as follows: when a key provided at the control unit 15 for operating the vertical wind wind direction blades 11 is turned on, the vertical wind direction blades 11 are rotated at a predetermined angle, and when the key is pushed again, the operation of the vertical wind direction blades 11 is stopped.

However, in the aforementioned conventional air conditioner, it is inconvenient to use because a desired discharge current pattern should be found by operating the keys while the user directly confirms positions of the horizontal wind direction blades 9 and the vertical wind direction blades 11. In addition, a control range of wind direction is narrow and it is not possible to control air currents of a whole indoor space and a long distance because the discharged air is discharged in predetermined upward/downward or leftward/rightward directions according to the angle of wind direction of the horizontal wind direction blades 9 and the vertical wind direction blades 11.

Furthermore, since an angle control of the horizontal wind direction blades 9 and the vertical wind direction blades 11 is necessary at predetermined intervals for air conditioning of the whole indoor space and an increase of wind amount is necessary for air conditioning of the long distance, the user should control a change of the wind direction and the wind amount according to the foregoing of his own accord.

In addition, since the vertical wind direction blades 11 can rotate only in leftward and rightward direction, it is impossible to control the air current concentrically with regard to one of the indoor space.

SUMMARY OF THE INVENTION

It is an object of the present invention to provide a discharge current control apparatus of an air conditioner and method thereof in which a wind direction, a wind amount, and a predetermined temperature of a discharged air are automatically controlled by detecting existence and inexistence of a human body, proximity state between an indoor unit body and a human body, position of a human body, and activity quantity of a human body at whole areas of an indoor space, so that the air conditioner is convenient for use and a delightful room can be provided owing to air conditioning of whole areas of the indoor space.

To accomplish the object of the present invention, there is provided a discharge current control apparatus of an air conditioner having a plurality of suction inlets for sucking an indoor air, a heat exchanger for heat-exchanging the indoor air sucked through the suction inlets, a discharge outlet for discharging the air heat-exchanged by the heat exchanger, a plurality of wind direction blades for controlling a wind direction of the air discharged through the discharge outlet, and an indoor fan for controlling a wind amount of the air discharged through the discharge outlet, the apparatus comprising distance detecting means for sensing a human body nearness distance by detecting infrared generated from a human body, position detecting means for sensing a human body left and right position by detecting infrared generated from a human body, control means for controlling a wind direction, a wind amount, and a predetermined temperature of the discharged air, so that the discharged air can be supplied to an area where the human body exits according to the human body nearness distance sensed by the distance detecting means and the human body left and right position sensed by the position detecting means, wind direction control means for controlling a wind direction of the discharged air by controlling an angle of the wind direction of the wind direction blades according to the control of the control means, and wind amount control means for controlling a wind amount of the discharged air by controlling a velocity of the indoor fan according to the control of the control means.

In addition, a discharge current control method of an air conditioner according to the present invention comprises a distance detecting step for sensing a human body nearness distance by detecting infrared generated from a human body, a position detecting step for sensing a human body left and right position by detecting infrared generated from a human body, a wind direction control step for controlling a wind direction of a discharged air by controlling an angle of the wind direction of wind direction blades according to the human body nearness distance sensed by the distance detecting step and the human body left and right position sensed by the position detecting step, a wind amount control step for controlling a wind amount of the discharged air by controlling a velocity of an indoor fan according to the human body nearness distance sensed by the distance detecting step and the human body left and right position sensed by the position detecting step, and a temperature control step for controlling a predetermined temperature according to the human body left and right position sensed by the position detecting step.

BRIEF DESCRIPTION OF THE DRAWINGS

FIGS. 4A through 4E are flow charts for showing a discharge current control operation in a short distance and wide mode according to the present invention;

FIGS. 5A through 5E are flow charts for showing a discharge current control operation in a short distance and wave mode according to the present invention;

FIGS. 6A through 6E are flow charts for showing a discharge current control operation in a short distance and long distance mode according to the present invention;

FIGS. 7A through 7E are flow charts for showing a discharge current control operation in a wide and wave mode according to the present invention;

FIGS. 8A through 8E are flow charts for showing a discharge current control operation in a wide and long distance mode according to the present invention;

FIGS. 10A through 10E are flow charts for showing a discharge current control operation in a short distance, wide, and wave mode according to the present invention;

FIGS. 12A through 12E are flow charts for showing a discharge current control operation in a short distance, wave, and long distance mode according to the present invention;

FIGS. 13A through 13E are flow charts for showing a discharge current control operation in a wide, wave, and long distance mode according to the present invention;

FIG. 14 is a explanatory diagram for illustrating an operation of horizontal wind direction blades taken along line A—A of FIG. 1.

DESCRIPTION OF THE PREFERRED EMBODIMENTS

One embodiment of the present invention will be hereinafter described in detail with reference to accompanying drawings.

Figure 1:
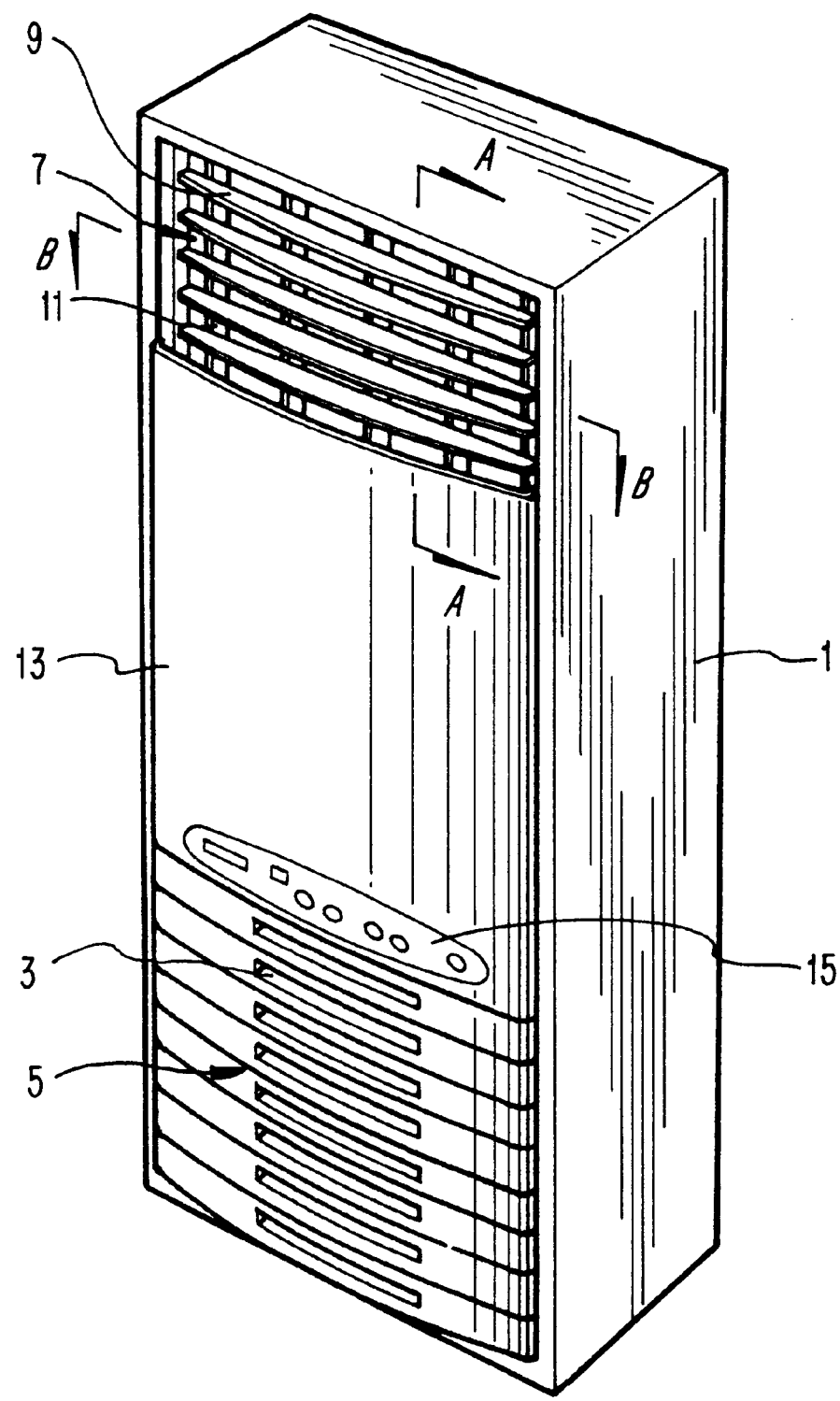
FIG. 1 is a perspective view for illustrating an indoor unit of a conventional air conditioner.
Figure 2:
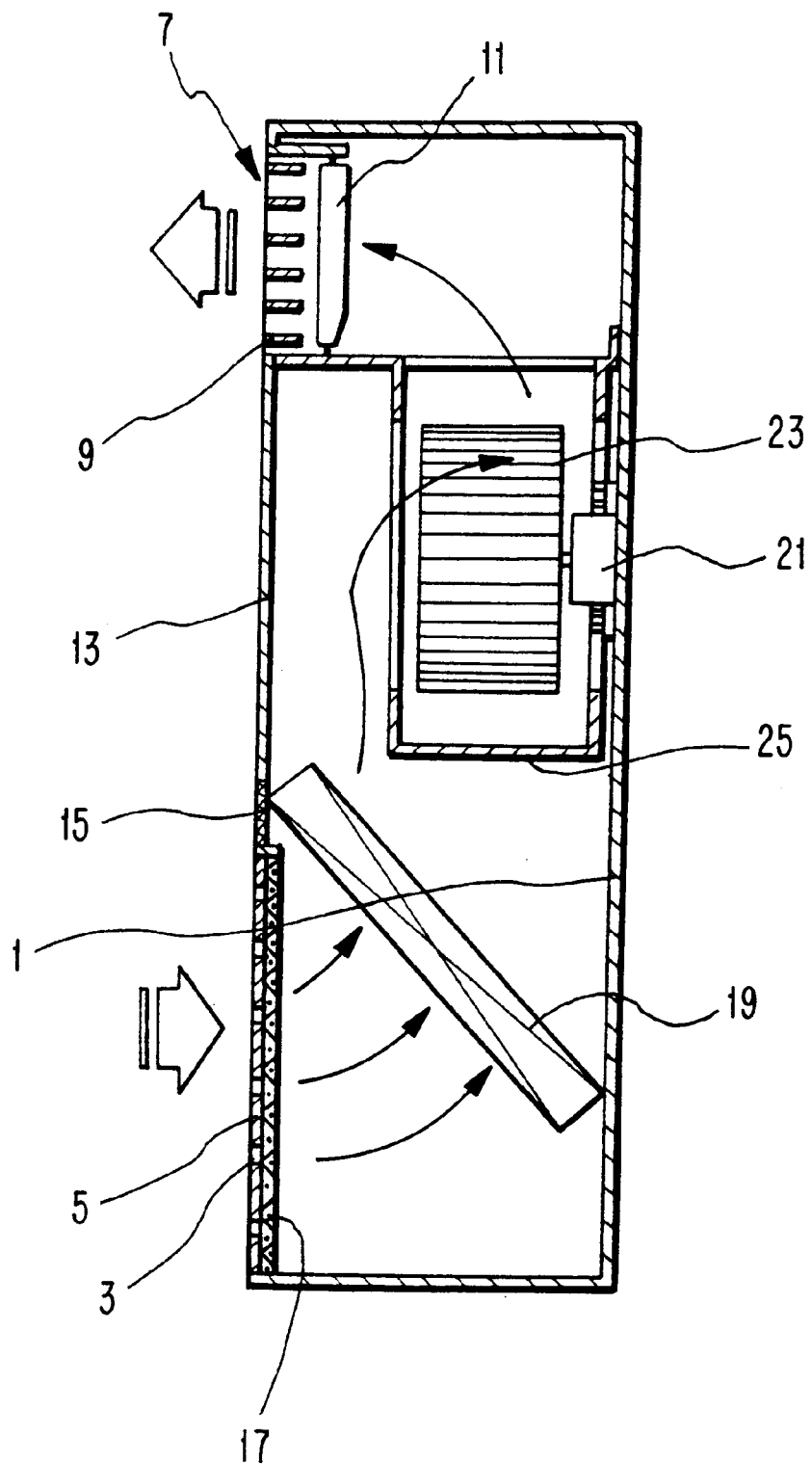
FIG. 2 is a longitudinal sectional view of FIG. 1.

Throughout the drawings, like terms and reference numerals are used for designation of like or equivalent parts or portions as in FIGS. 1 and 2, and redundant references will be omitted for simplicity of illustration and explanation.

Figure 3:
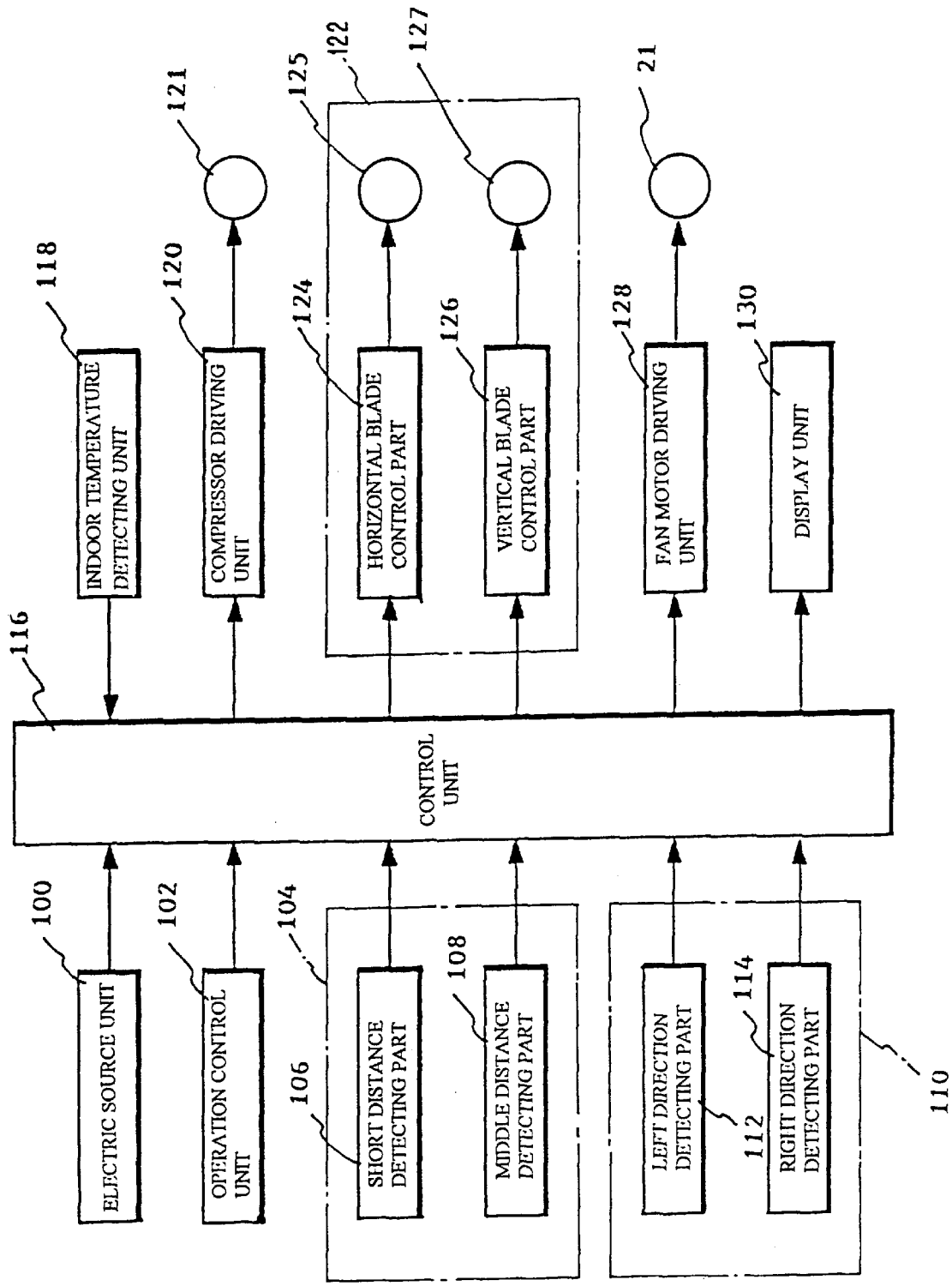
FIG. 3 is a block diagram of a discharge current control apparatus in an air conditioner according to one embodiment of the present invention.

As shown in FIG. 3, an electric source unit 100 transforms a commercial alternating current (AC) voltage supplied from an AC electric source into a predescribed direct current (DC) voltage and outputs the DC voltage.

An operation control unit 102 includes a plurality of function keys so that a user can input desired operation modes of an air conditioner (automatic action, air cooling, humidity removal, air blast, air heating, etc.), start/stop of operation, predetermined temperature (Ts), and predetermined wind direction and amount of the discharged air.

A distance detecting unit 104 is infrared sensors comprising two cells having different types of detecting distances which can sense the distance between a human body and the body 1 by detecting infrared generated from the human body.

The distance detecting unit 104 comprises a cell 106 which can sense a short distance within 2 meters (CELL #1; hereinafter, referred to as a short distance detecting part) and a cell 108 which can sense a middle distance within 4 meters (CELL #2; hereinafter, referred to as a middle distance detecting part).

A position detecting unit 110 is infrared sensors comprising two cells which can sense whether the human body is located in some direction with respect to the body 1 by detecting the infrared generated from the human body. The position detecting unit 110 comprises a cell 112 which can sense a left direction (CELL #1; hereinafter, referred to as a left direction detecting part) and a cell 114 which can sense a right direction (CELL #2; hereinafter, referred to as a right direction detecting part).

In addition, a control unit 116 is a microcomputer which initializes the air conditioner by receiving the DC voltage outputted from the electric source unit 100 and controls whole operations of the air conditioner according to selected operation signals and start/stop operation signals inputted through the operation control unit 102. The control unit 116 controls wind direction angles of the horizontal wind direction blades 9 and vertical wind direction blades 11, velocity of the indoor fan 23, and the predetermined temperature (Ts), so that the discharged air can be supplied to whole areas of the indoor space, according to the distance between the human body and the indoor unit body sensed by the distance detecting unit 104, and the left and right position of the human body sensed by the position detecting unit 110.

An indoor temperature detecting unit 118 senses a temperature (Tr) of an indoor air inhaled through the suction inlet 3 so that the operation control unit 102 can carry out the air conditioning by controlling the indoor temperature (Tr) to the predetermined temperature (Ts). A compressor driving unit 120 receives a control signal outputted from the control unit 116 and controls a compressor 121 according to a difference between the Ts and the Tr sensed by the indoor temperature detecting unit 118.

In addition, a wind direction control unit 122 controls the direction of the discharged air up/downward and left/right so that the discharge air can be supplied to whole areas of the indoor space, according to the distance between the human body and the indoor unit body sensed by the distance detecting unit 104, and the left and right position of the human body sensed by the position detecting unit 110. The wind direction control unit 122 comprises a horizontal blade control part 124, which receives the control signal outputted from the control unit 116 and controls a horizontal blade motor 125 in order to move the horizontal wind direction blades 9, and a vertical blade control part 126 which receives the control signal outputted from the control unit 116 and controls a vertical blade motor 127 in order to move the vertical wind direction blades 11.

Moreover, a fan motor driving unit 128 not only receives the control signal outputted from the control unit 116, controls a rotation number of the indoor fan motor 21, and drives the indoor fan 23 so as to blow the heat-exchanged air (cool wind or warm wind) into the indoor space according to the selected wind amount by the operation control unit 102, but also controls the wind amount of the discharged air so that the discharge air can be supplied to whole areas of the indoor space, according to the distance between the human body and the indoor unit body sensed by the distance detecting unit 104, and the left and right position of the human body sensed by the position detecting unit 110.

A display unit 130 turns on/off a short distance display lamp indicating a short distance operation state (FOCUS) for air-conditioning places which are near the body 1, a wide display lamp indicating a wide operation state (WIDE) for air-conditioning the whole areas of the indoor space, and a wave display lamp indicating a wave operation state (WAVE) for air-conditioning a central portion of the indoor space, as well as receives the control signal outputted from the control unit 116 according to key signals inputted through the operation control unit 102 and displays operation selection modes (automatic action, air cooling, humidity removal, air blast, air heating, etc.), the Ts, and the Tr.

Operations and Effects of the above-mentioned discharge current control apparatus of the air conditioner and method thereof will be hereinafter described.

First, the short distance control and the wide control are described with reference to FIGS. 4A through 4E.

FIGS. 4A through 4E are flow charts for showing a discharge current control operation in a short distance and wide mode according to the present invention, and S indicates a step in FIGS. 4A through 4E.

To begin with, when the air-conditioner is turned on, the electric source unit 100 transforms a commercial alternating current (AC) voltage supplied from an AC electric source into a predescribed direct current (DC) voltage and outputs the DC voltage to respective driving circuits and the control unit 116.

Accordingly, the control unit 116 receives the DC voltage outputted from the electric source unit 100 and initializes the air-conditioner at step S1, and the control unit 116 outputs control signals for driving the horizontal blade motor 125 to the horizontal blade control part 124 so as to move the horizontal wind direction blades 9 into a closed state as an operational starting point at step S2.

Accordingly, the horizontal blade control part 124 receives the control signal outputted from the control unit 116 and drives the horizontal blade motor 125 in a clockwise direction at an angular velocity of 22.5°/sec, to thereby close the horizontal wind direction blades 9.

Subsequently, the control unit 116 outputs control signals for driving the vertical blade motor 127 to the vertical blade control part 126 so as to move the vertical wind direction blades 11 into a closed state as an operational starting point at step S3.

Accordingly, the vertical blade control part 126 receives the control signal outputted from the control unit 116 and drives the vertical blade motor 127 in a clockwise direction at an angular velocity of 22.5°/sec, to thereby close the vertical wind direction blades 11.

At this time, the control unit 116 counts a driving time of the horizontal and vertical blade motors 125 and 127, and judges whether a prescribed time (about 7 seconds) is elapsed or not at step S4. In case that the prescribed time is not elapsed (in case of NO), the control unit 116 decides that the horizontal and vertical wind direction blades 9 and 11 are not completely closed, the flow returns to the step S2, and the steps below the step S2 are repeatedly carried out until the prescribed time is elapsed.

In case that the prescribed time is elapsed (in case of YES) as a result of judgement at the step S4, the control unit 116 decides that the horizontal and vertical wind direction blades 9 and 11 are completely closed, so that step S5 is carried out.

The horizontal and vertical blade control parts 124 and 126 stop the driving of the horizontal and vertical blade motors 125 and 127 according to the control of the control unit 116, so that the closing operation of the horizontal and vertical wind direction blades 9 and 11 is completed and this state is used as an operation starting point.

Meanwhile, when the operation is turned off, an initialization routine of the steps from S2 to S5 is also carried out.

In other words, if the position of the horizontal and vertical wind direction blades 9 and 11 is changed by any external operation when an electric source is applied or an operation is turned off, an exact position control is difficult, so that the initialization routine, which closes the horizontal and vertical wind direction blades 9 and 11 completely, is carried out.

At step S6, a predetermined temperature (Ts), a predetermined wind amount, and a predetermined wind direction of a room, which is planned for cooling or heating, are inputted to the control unit 116 through the operation control unit 102. At step S7, it is determined whether an operation key is turned on. If the operation key is not turned on (in case of NO), the air conditioner is maintained as an operation standby state until the operation key is turned on while the step S7 is repeatedly carried out.

As a result of judgement at the step S7, if the operation key is turned on (in case of YES), an operation command and an operation signal are inputted to the control unit 116 through the operation control unit 102. In order to carry out a cooling or heating operation, step S8 is executed, and the control unit 116 outputs a control signal for driving the indoor fan motor 21 to the fan motor driving unit 128.

Accordingly, the fan motor driving unit 128 receives a control signal outputted from the control unit 116 according to the predetermined wind amount inputted through the operation control unit 102, and controls the rotation number (velocity) of the indoor fan motor 21, thereby driving the indoor fan 23.

When the indoor fan 23 is driven according to the predetermined wind amount, the indoor air is sucked through the suction inlet 3 into the body 1. At this time, the indoor temperature detecting unit 118 detects the temperature (Tr) of the indoor air sucked through the suction inlet 3, and outputs it to the control unit 116.

At step S9, the control unit 116 outputs a control signal for driving the horizontal and vertical blade motors 125 and 127 to the horizontal and vertical blade control parts 124 and 126 so as to control the angle of the wind direction of the horizontal and vertical wind direction blades 9 and 11 according to the predetermined wind direction inputted by the operation control unit 102.

Accordingly, the horizontal and vertical blade control parts 124 and 126 receives the control signal outputted from the control unit 116, and drives the horizontal and vertical blade motor 125 and 127, so that the angle of the wind direction of the horizontal and vertical wind direction blades 9 and 11 is controlled according to the wind direction predetermined by a user.

At step S10, the indoor temperature (Tr) detected by the indoor temperature detecting unit 118 and the temperature (Ts) predetermined by the user at the operation control unit 102, are compared, so that it is determined whether it is a driving condition of the compressor 121.

The above-mentioned driving condition of the compressor 121 is as follows: in case of a cooling operation, the indoor temperature (Tr) detected by the indoor temperature detecting unit 118 is higher than the predetermined temperature (Ts), on the other hand, in case of a heating operation, the indoor temperature (Tr) is lower than the predetermined temperature (Ts).

As a result of judgement at the step S10, if it is not the driving condition of the compressor 121 (in case of NO), the flow returns to the step S8, detects the indoor temperature (Tr) continuously, and the steps S8 and S9 are repeatedly carried out. If it is the driving condition of the compressor 121 (in case of YES), the flow proceeds to step S11, and at the step S11, the control unit 116 determines an operation frequency of the compressor 121 according to the difference between the indoor temperature (Tr) and the predetermined temperature (Ts), and outputs a control signal for driving the compressor 121 to the compressor driving unit 120.

Accordingly, the compressor driving unit 120 drives the compressor 121 according to the operation frequency determined at the control unit 116.

If the compressor 121 is driven, at step S12, the indoor air is sucked through the suction inlet 3 into the body 1 while the indoor fan 23 is driven, the filter member 17 removes the foreign particles such as dusts, which float in the indoor air and are sucked through the suction inlet 3, and then the filtered indoor air is heat-exchanged by the latent heat of vaporization of the refrigerant flowing within the heat exchanger 19 during a passage of the heat exchanger 19.

The heat-exchanged air is guided upward by means of the duct member 25 and then is discharged through the discharge outlet 7 into the indoor space. At this time, the wind direction of the discharged air is controlled upward and downward or leftward and rightward according to an angle of wind direction of the horizontal wind direction blades 9 and vertical wind direction blades 11.

During the aforementioned normal operation of the air conditioner, at step S13, the left direction detecting part 112 of the position detecting unit 110 detects infrared rays generated from a human body and judges whether there is an input pulse, so as to decide a left and right position of the human body.

As a result of judgement at the step S13, if there is an input pulse at the left direction detecting part 112 (in case of YES), the flow proceeds to step S14, and the right direction detecting part 114 of the position detecting unit 110 detects infrared rays generated from a human body and judges whether there is an input pulse, so as to decide a left and right position of the human body.

As a result of judgement at the step S14, if there is an input pulse at the right direction detecting part 114 (in case of YES), it is determined that there are activities of human bodies on the left and right sides of the body 1, the flow proceeds to step S15, and the control unit 116 sets the operation mode of the air conditioner to A mode.

If there is no input pulse at the right direction detecting part 114 (in case of NO), it is determined that there are activities of human bodies only on the left side of the body 1, the flow proceeds to step S16, and the control unit 116 sets the operation mode of the air conditioner to B mode.

On the other hand, as a result of judgement at the step S13, if there is no input pulse at the left direction detecting part 112 (in case of NO), the flow proceeds to step S17, and it is judged whether there is an input pulse at the right direction detecting part 114.

If there is an input pulse at the right direction detecting part 114 (in case of YES), it is determined that there are activities of human bodies only on the right side of the body 1, the flow proceeds to step S18, and the control unit 116 sets the operation mode of the air conditioner to C mode.

As a result of judgement at the step S17, if there is no input pulse at the right direction detecting part 114 (in case of NO), it is determined that there is no activity of human bodies on the left and right sides of the body 1, the flow proceeds to step S19, and the control unit 116 sets the operation mode of the air conditioner to D mode.

At step S20, in order to determined whether human bodies are at a short distance within 2 meters, the short distance detecting part 106 of the distance detecting unit 104 judges whether there is an input pulse by detecting infrared rays generated from human bodies.

If there is an input pulse at the short distance detecting part 106 (in case of YES), the flow proceeds to step S21, and in order to determined whether human bodies are at a middle distance within 4 meters, the middle distance detecting part 108 of the distance detecting unit 104 judges whether there is an input pulse by detecting infrared rays generated from human bodies.

As a result of judgement at the step S21, if there is an input pulse at the middle distance detecting part 108 (in case of YES), it is determined that there are activities of human bodies at the short and middle distances from the body 1, the flow proceeds to step S22, and the control unit 116 sets the operation mode of the air conditioner to a wide mode.

If the is no input pulse at the middle distance detecting part 108 (in case of NO), it is determined that there are activities of human bodies at the short distance from the body 1, the flow proceeds S23, and the control unit 116 sets the operation mode of the air conditioner to a short distance mode.

As a result of judgement at the step S20, if there is no input pulse at the short distance detecting part 106 (in case of NO), the flow proceeds to step S19, the control unit 116 sets the operation mode of the air conditioner to D mode.

Figure 15A:
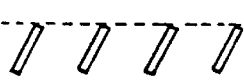
FIG. 15 is explanatory diagram for illustrating an operation of vertical wind direction blades taken along line B—B of FIG. 1.
Figure 15B:
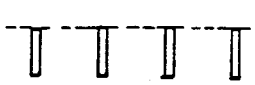

At step S24, it is judged whether the operation mode is D mode. If the operation mode is not D mode (in case of NO), the flow proceeds to step S25, and it is judged whether the operation mode is A mode. If the operation mode is A mode (in case of YES), the flow proceeds to step S27 so as to supply the discharge air to the left and right sides of the body 1. At the step S27, the vertical blade control part 126 receives a control signal outputted from the control unit 116, drives the vertical blade motor 127, moves the angle of the vertical wind direction blades 11 to a central prescribed angle as shown in FIG. 15(B), and then stops the driving of the vertical blade motor 127.

As a result of judgement at the step S25, if the operation mode is not A mode (in case of NO), the flow proceeds to step S26, and it is judged whether the operation mode is B mode. If the operation mode is not B mode (in case of NO), it is determined that the operation mode is C mode, and the flow proceeds to step S28. At the step S28, the control unit 116 outputs a control signal for controlling the angle of the vertical wind direction blades 11 to the vertical blade control part 126 so as to supply the discharge air only to the right side of the body 1.

Figure 15C:
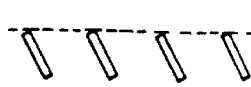

The vertical blade control part 126 receives a control signal outputted from the control unit 116, drives the vertical blade motor 127, moves the angle of the vertical wind direction blades 11 to a right prescribed angle (about 15°) as shown in FIG. 15(C), and then stops the driving of the vertical blade motor 127.

As a result of judgement at the step S26, if the operation mode is B mode (in case of YES), the flow proceeds to step S29 so as to supply the discharged air only to the left side of the body 1. The vertical blade control part 126 receives a control signal outputted from the control unit 116, drives the vertical blade motor 127, moves the angle of the vertical wind direction blades 11 to a left prescribed angle (about 15°) as shown in FIG. 15(A), and then stops the driving of the vertical blade motor 127.

At step S30, it is judged whether the operation mode of the air conditioner is a wide mode. If it is not the wide mode (in case of NO), the flow proceeds to step S31 and it is judged whether the operation mode is a short distance mode.

As a result of judgement at the step S31, if it is a short distance mode (in case of YES), the flow proceeds to step S32 and the control unit 116 outputs a control signal for displaying a short distance operation state of the air conditioner to the display unit 130.

Accordingly, the display unit 130 turns on a short distance display lamp according to the control of the control unit 116, thereby displaying the short distance operation state. At step S33, the control unit 116 outputs a control signal for driving the indoor fan motor 21 to the fan motor driving unit 128, so that the discharged air reaches places which are near the body 1 (short distance).

According to this, the fan motor driving unit 128 receives the control signal outputted from the control unit 116 and drives the indoor fan motor 21 at a turbo wind amount (about 670 RPM). At step 34, the control unit 116 outputs a control signal for controlling the angle of the horizontal wind direction blades 9 to the horizontal blade control part 124, so that the discharged air reaches the short distance.

Accordingly, the horizontal blade control part 124 receives the control signal outputted from the control unit 116, drives the horizontal blade motor 125, moves the angle of the horizontal wind direction blades 9 to a downward prescribed angle (about 15°) as shown in FIG. 14(B), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied to the left, right or central side of places near the body 1 according to the downward prescribed angle fixation of the horizontal wind direction blades 9 and the left, right, or central prescribed angle fixation of the vertical wind direction blades 11 mounted at the discharge outlet 7, thereby air conditioning of the short distance mode is carried out, the flow returns to the step S13, and the operations below the step S13 are repeatedly carried out.

In addition, as a result of judgement at the step S30, if the operation mode is the wide mode (in case of YES), the flow proceeds to step S35, and the control unit 116 outputs a control signal for displaying a wide operation state air-conditioning equally the whole indoor areas, which are relatively near the body 1 or relatively away from the body 1, to the display unit 130.

Accordingly, the display unit 130 turns on a wide display lamp according to the control of the control unit 116 and displays the wide operation state. At step S36, the control unit 116 outputs a control signal for driving the indoor fan motor 21 to the fan motor driving unit 128 so as to spread the discharged air evenly to the whole indoor areas.

According to this, the fan motor driving unit 128 receives the control signal outputted from the control unit 116 and drives the indoor fan motor 21 at a turbo wind amount. At step 37, the control unit 116 outputs a control signal for controlling the angle of the horizontal wind direction blades 9 to the horizontal blade control part 124, so that the discharged air is spread equally to the whole indoor areas.

Accordingly, the horizontal blade control part 124 receives the control signal outputted from the control unit 116 and drives the horizontal blade motor 125, thereby the horizontal wind direction blades 9 swing at an upward and downward prescribed angle (about 30°) as shown in FIG. 14(E).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied to the whole indoor areas on the left, right or central side which are relatively near the body 1 and relatively away from the body 1 according to the upward/downward prescribed angle swing of the horizontal wind direction blades 9 and the left, right, or central prescribed angle fixation of the vertical wind direction blades 11 mounted at the discharge outlet 7, thereby air conditioning of a wide range is carried out, the flow returns to the step S13, and the operations below the step S13 are repeatedly carried out.

As a result of judgement at the step S24, if the operation mode is D mode (in case of YES), the flow proceeds to step S40, and the fan motor driving unit 128 receives a control signal outputted from the control unit 116 and drives the indoor fan at a speed of a breeze by controlling the rotation number of the indoor fan motor 21. At step S41, the control unit 116 outputs a control signal for controlling the angle of the vertical wind direction blades 11 to the vertical blade control part 126.

The vertical blade control part 126 receives the control signal outputted from the control unit 116, drives the vertical blade motor 127, moves the angle of the vertical wind direction blades 11 to a central prescribed angle as shown in FIG. 15(B), and then stops the driving of the vertical blade motor 127.

At step S42, the control unit 116 outputs a control signal for controlling the angle of the horizontal wind direction blades 9 to the horizontal blade control part 124.

Accordingly, the horizontal blade control part 124 receives the control signal outputted from the control unit 116, drives the horizontal blade motor 125, moves the angle of the horizontal wind direction blades 9 to a central prescribed angle as shown in FIG. 14(D), and then stops the driving of the horizontal blade motor 125. At step S43, the operation control unit 102 increases the temperature (Ts) predetermined by the user, by 2° C., the flow returns to the step S12, the normal operation is continuously carried out, and the operations below the step S12 are repeatedly carried out.

Next, an air conditioner including a short distance control and a wave control is described with reference to FIGS. 5A to 5E.

FIGS. 5A through 5E are flow charts for showing a discharge current control operation in a short distance and wave mode according to the present invention.

Figure 4B:
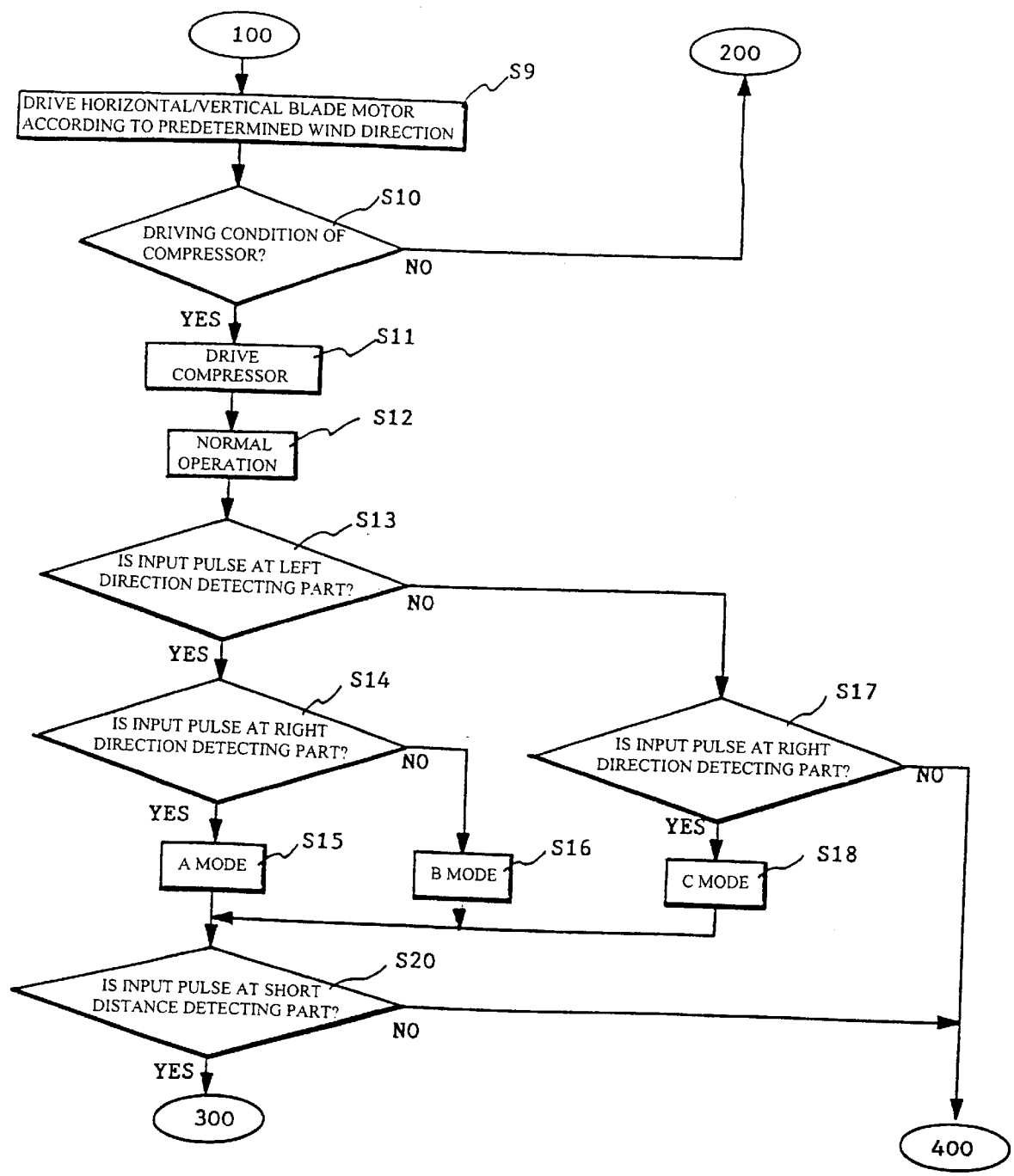
Figure 4C:
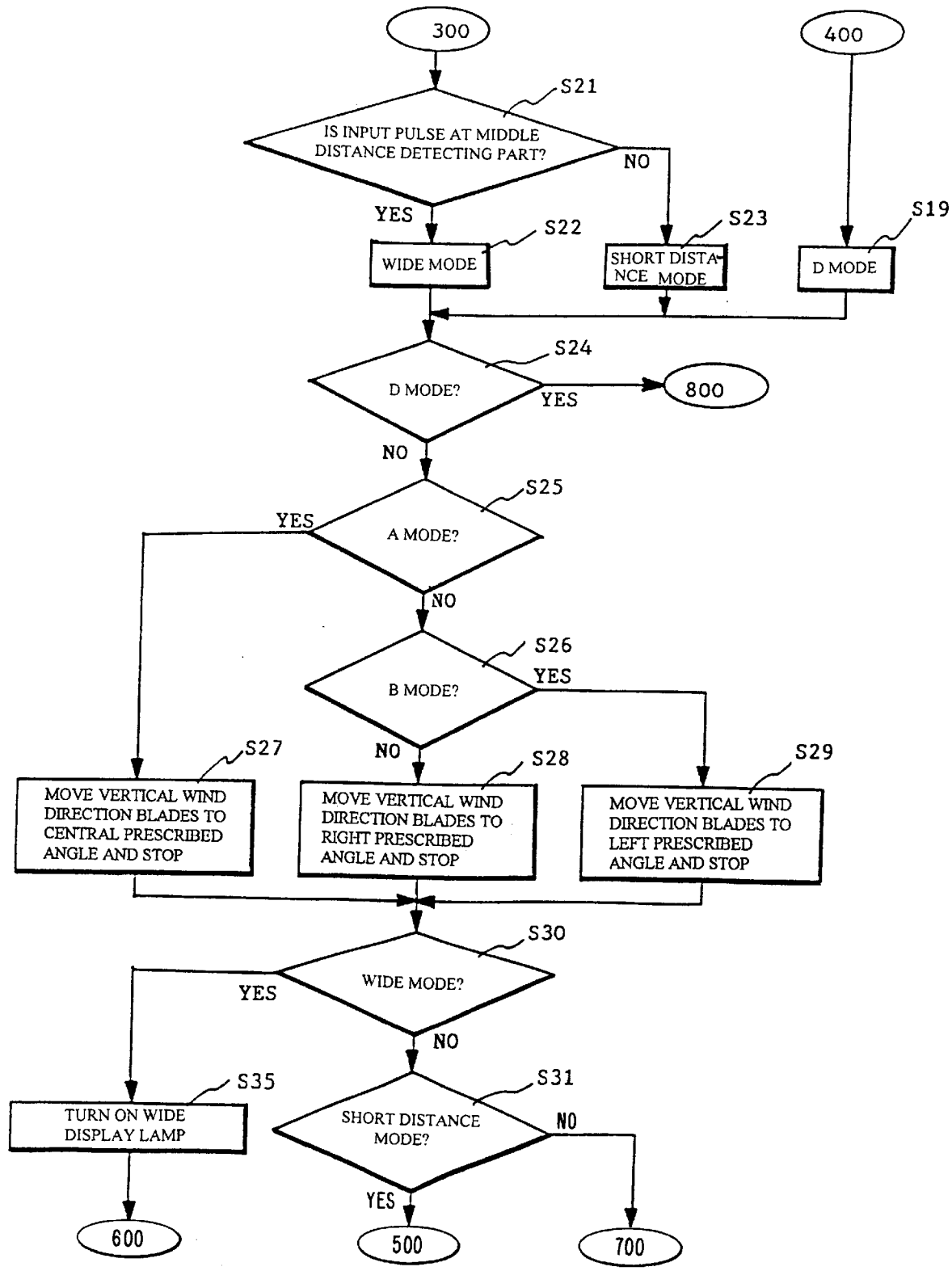
Figure 4D:
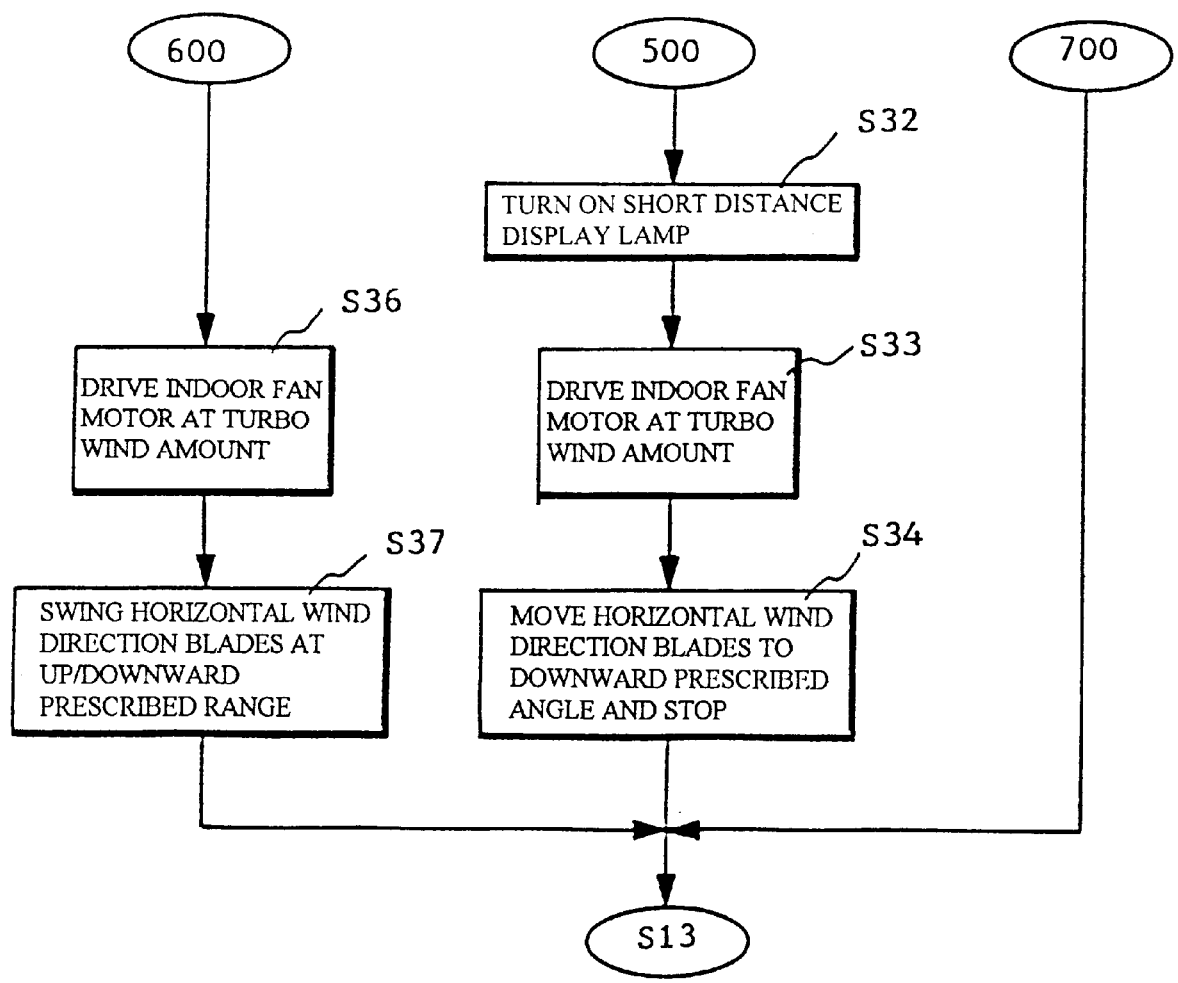

Operations from step S51 to step S69 and those from the step S1 to the step S19 shown in FIGS. 4A to 4C are the same.

At step S70, it is judged whether there is an input pulse at the short distance detecting part 106. If there is no input pulse at the short distance detecting part 106 (in case of NO), the flow proceeds to step S71, and it is judged whether there is an input pulse at the middle distance detecting part 108.

As a result of judgement at the step S71, if there is an input pulse at the middle distance detecting part 108 (in case of YES), it is determined that there are activities of human bodies at places which are relatively away from the body 1, the flow proceeds to step S72, and the control unit 116 sets the operation mode of the air conditioner to a wave mode. If there is no input pulse at the middle distance detecting part 108 (in case of NO), the flow proceeds to step S69, and the control unit 116 sets the operation mode of the air conditioner to D mode.

On the other hand, as a result of judgement at the step S70, if there is an input pulse at the short distance detection part 106 (in case of YES), it is determined that there are activities of human bodies at the short distance which is near the body 1, the flow proceeds to step S73, and the control unit 116 sets the operation mode of the air conditioner to a short distance mode.

At step S74, it is judged whether the operation mode is D mode. If the operation mode is not D mode (in case of NO), the flow proceeds to step S75, and it is judged whether the operation mode is A mode. If the operation mode is A mode (in case of YES), the flow proceeds to step S77, the vertical blade control part 126 drives the vertical blade motor 127, moves the angle of the vertical wind direction blades 11 to a central prescribed angle as shown in FIG. 15(B), and then stops the driving of the vertical blade motor 127.

As a result of judgement at the step S75, if the operation mode is not A mode (in case of NO), the flow proceeds to step S76, and it is judged whether the operation mode is B mode. If the operation mode is not B mode (in case of NO), it is determined that the operation mode is C mode, and the flow proceeds to step S78. At the step S78, the vertical blade control part 126 drives the vertical blade motor 127 according to a control of the control unit 116, moves the angle of the vertical wind direction blades 11 to a right prescribed angle (about 15°) as shown in FIG. 15(C), and then stops the driving of the vertical blade motor 127.

As a result of judgement at the step S76, if the operation mode is B mode (in case of YES), the flow proceeds to step S79. The vertical blade control part 126 drives the vertical blade motor 127 according to a control of the control unit 116, moves the angle of the vertical wind direction blades 11 to a left prescribed angle (about 15°) as shown in FIG. 15(A), and then stops the driving of the vertical blade motor 127.

At step S80, it is judged whether the operation mode of the air conditioner is a wave mode. If it is not the wave mode (in case of NO), the flow proceeds to step S81 and it is judged whether the operation mode is a short distance mode.

As a result of judgement at the step S81, if it is a short distance mode (in case of YES), the flow proceeds to step S82 and the display unit 130 turns on a short distance display lamp according to the control of the control unit 116, thereby displaying the short distance operation state. At step S83, the fan motor driving unit 128 receives the control signal outputted from the control unit 116 and drives the indoor fan motor 21 at a turbo wind amount (about 670 RPM). At step S84, the control unit 116 outputs a control signal to the horizontal blade control part 124, so that the discharged air reaches the short distance.

Accordingly, the horizontal blade control part 124 drives the horizontal blade motor 125, moves the angle of the horizontal wind direction blades 9 to a downward prescribed angle (about 15°) as shown in FIG. 14(B), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied to the left, right or central side of places near the body 1 according to the downward prescribed angle fixation of the horizontal wind direction blades 9 and the left, right, or central prescribed angle fixation of the vertical wind direction blades 11 mounted at the discharge outlet 7, thereby air conditioning of the short distance mode is carried out, the flow returns to the step S63, and the operations below the step S63 are repeatedly carried out.

In addition, as a result of judgement at the step S80, if the operation mode is the wave mode (in case of YES), the flow proceeds to step S85, and the control unit 116 outputs a control signal for displaying a wave operation state air-conditioning an indoor central portion, which is relatively away from the body 1, to the display unit 130.

Accordingly, the display unit 130 turns on a wave display lamp according to the control of the control unit 116 and displays the wave operation state. At step S86, the fan motor driving unit 128 receives the control signal outputted from the control unit 116 and drives the indoor fan motor 21 at a turbo wind amount. At step S87, the control unit 116 outputs a control signal to the horizontal blade control part 124, so that the discharge air reaches the indoor central portion which is relatively away from the body 1.

Accordingly, the horizontal blade control part 124 drives the horizontal blade motor 125, thereby the horizontal wind direction blades 9 swing at an upward prescribed angle (about 15°) as shown in FIG. 14(C).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. A wave is formed in the discharged air flow according to the upward prescribed angle swing of the horizontal wind direction blades 9 and the left, right, or central prescribed angle fixation of the vertical wind direction blades 11 mounted at the discharge outlet 7, thereby air conditioning of the indoor central portion is carried out, the flow returns to the step S63, and the operations below the step S63 are repeatedly carried out.

Figure 4E:
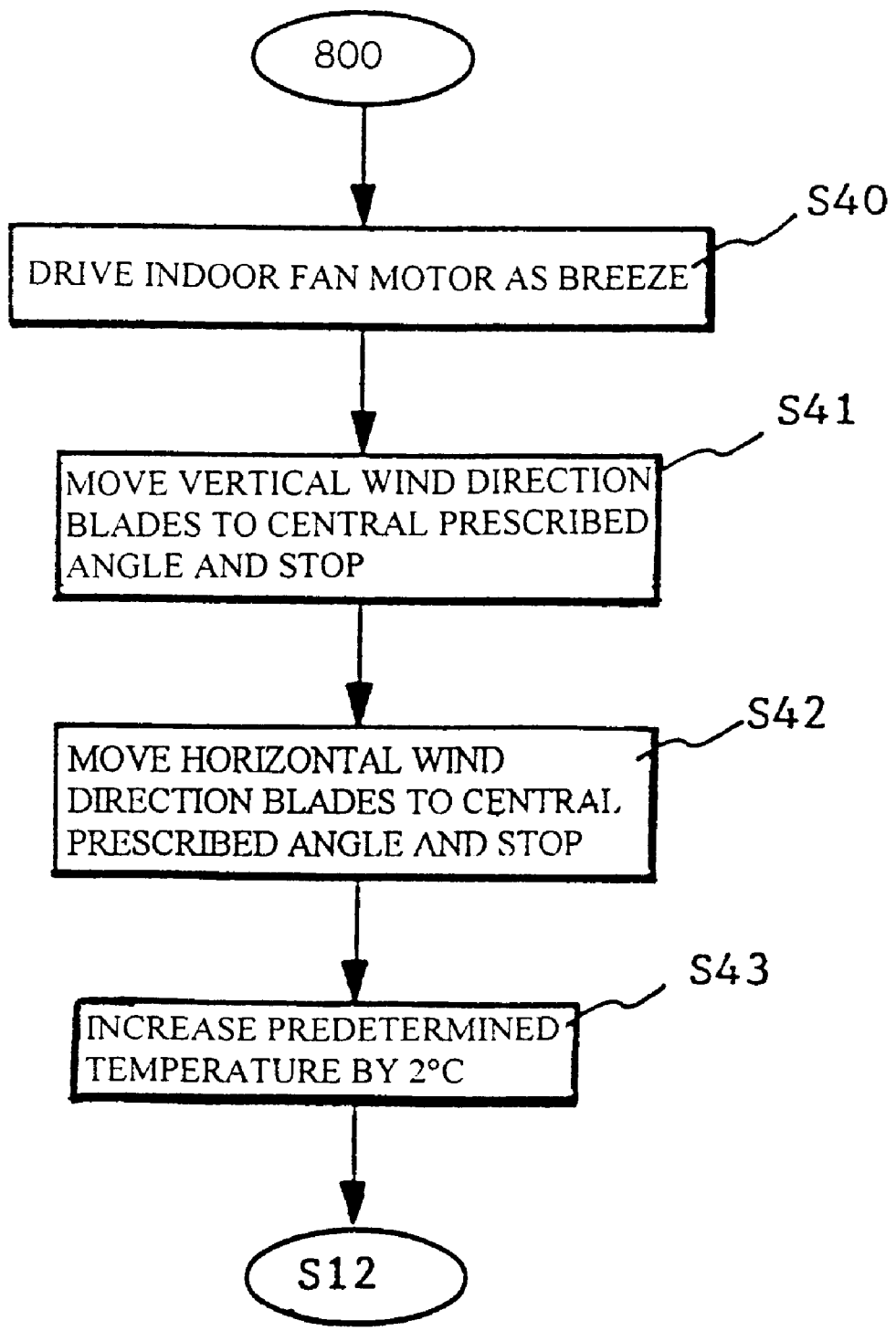
Figure 5A:
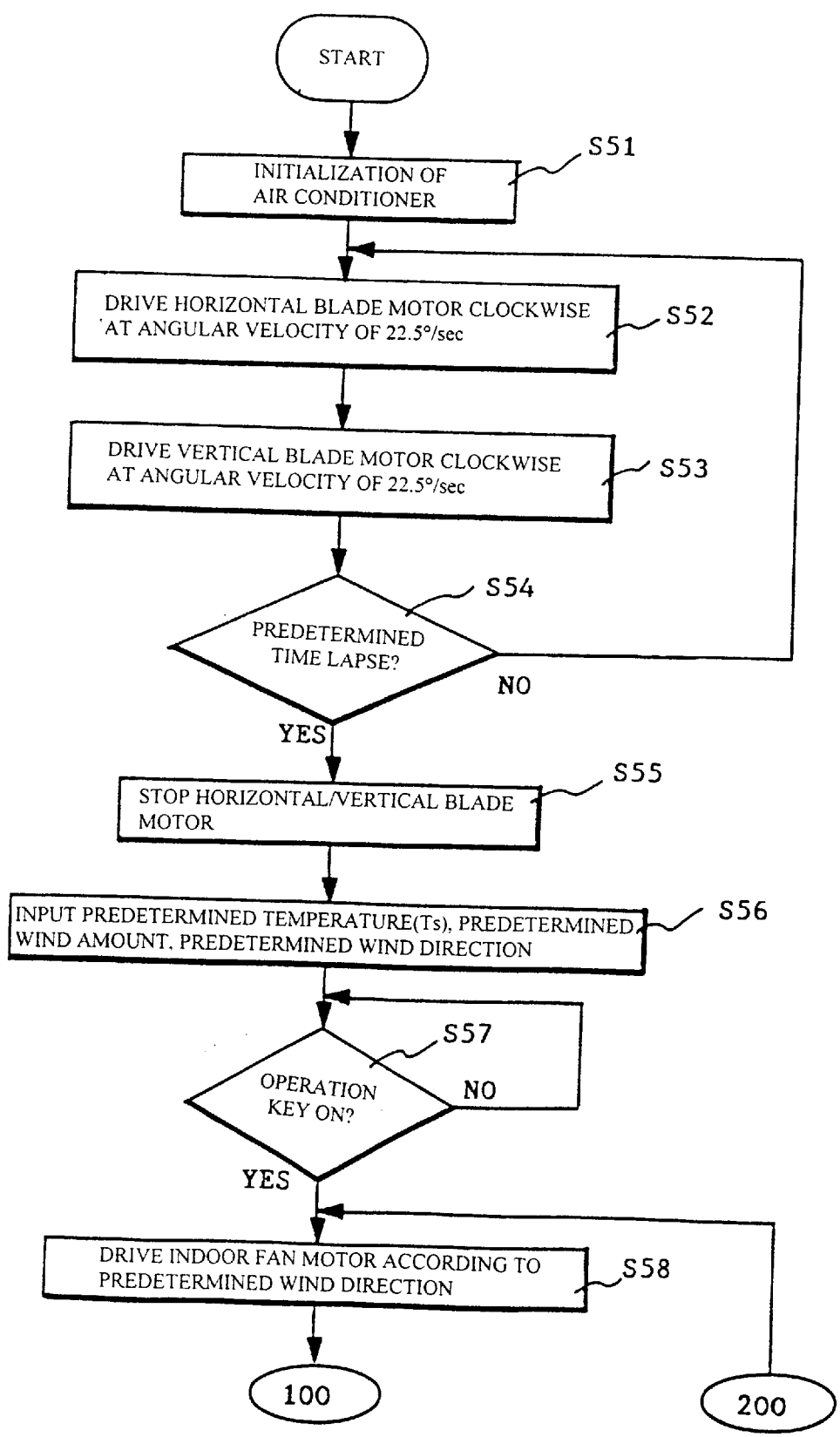
Figure 5B:
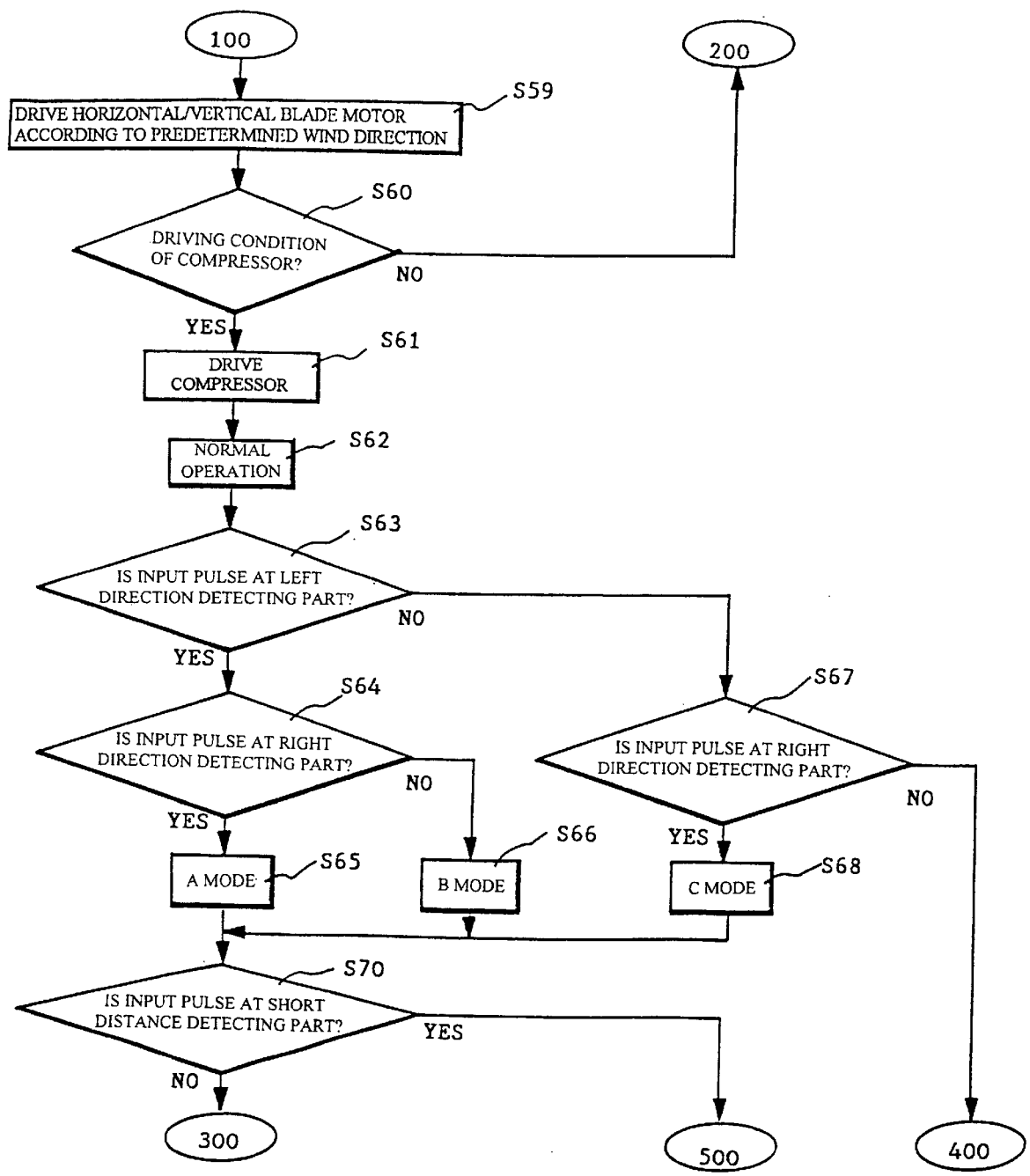
Figure 5C:
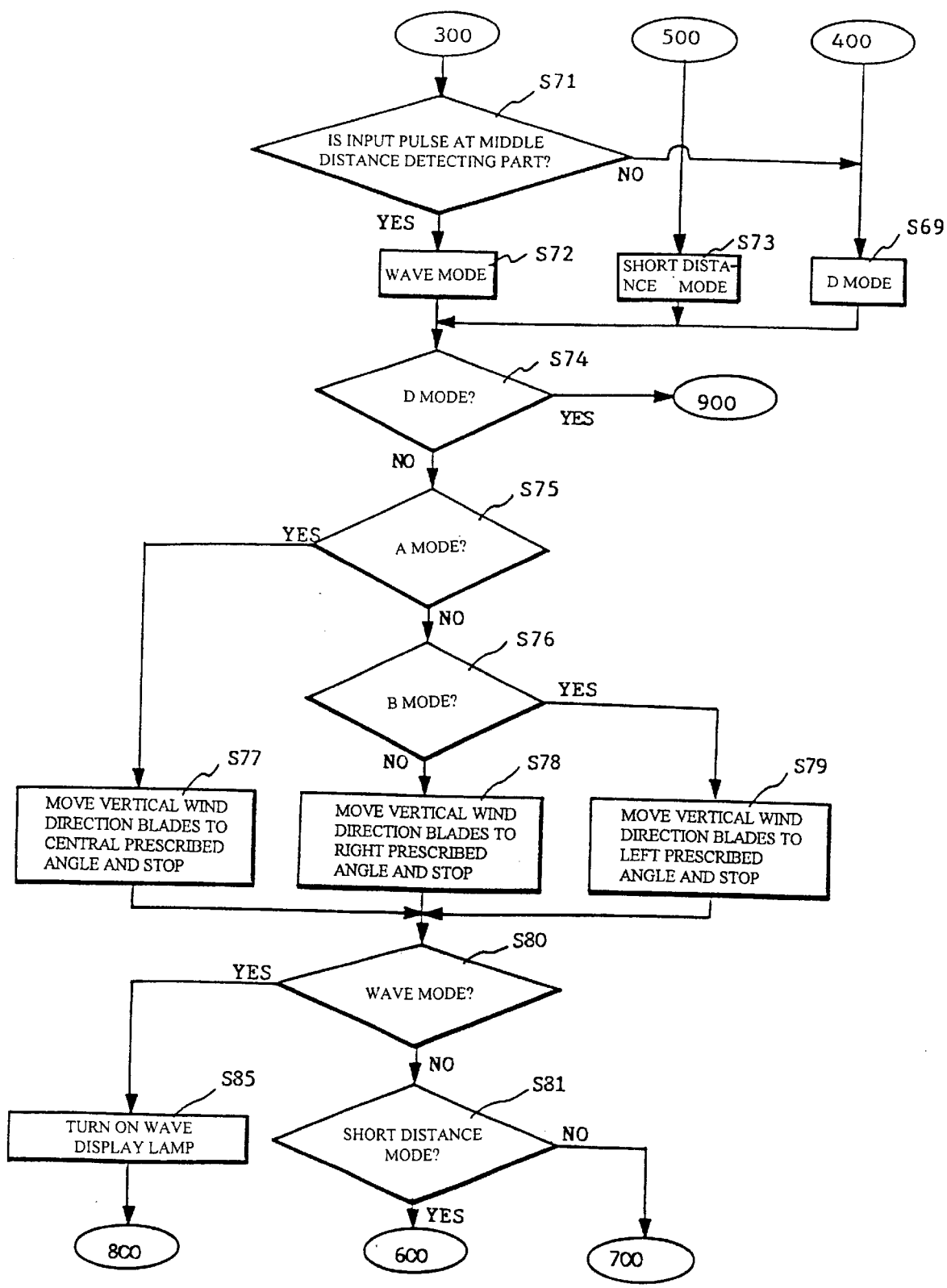
Figure 5E:
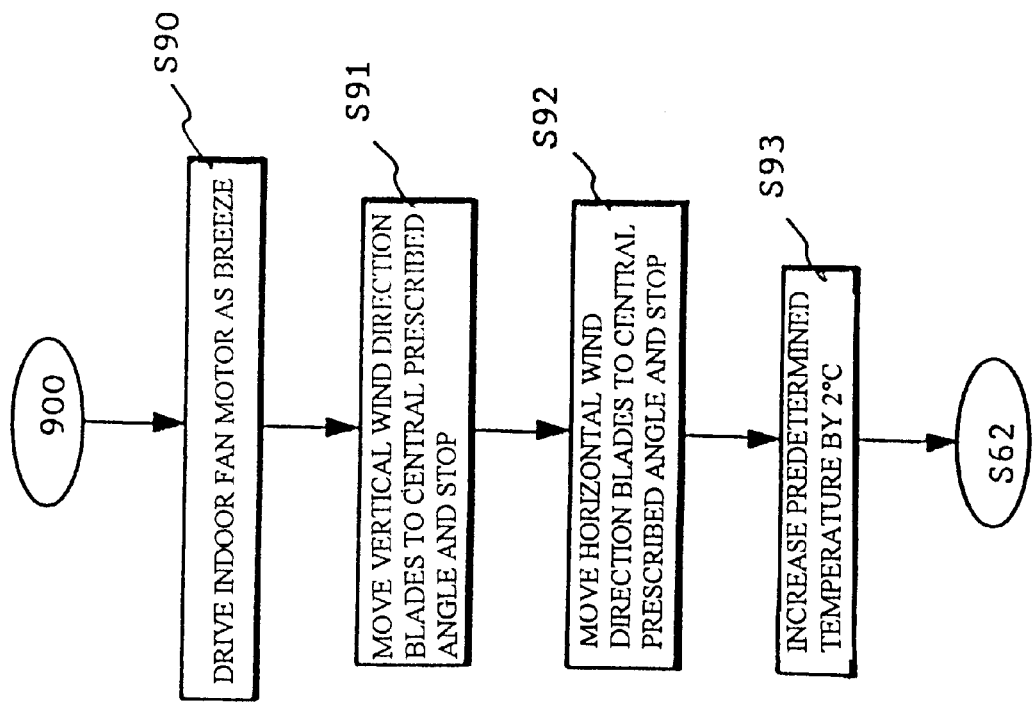
Figure 6A:
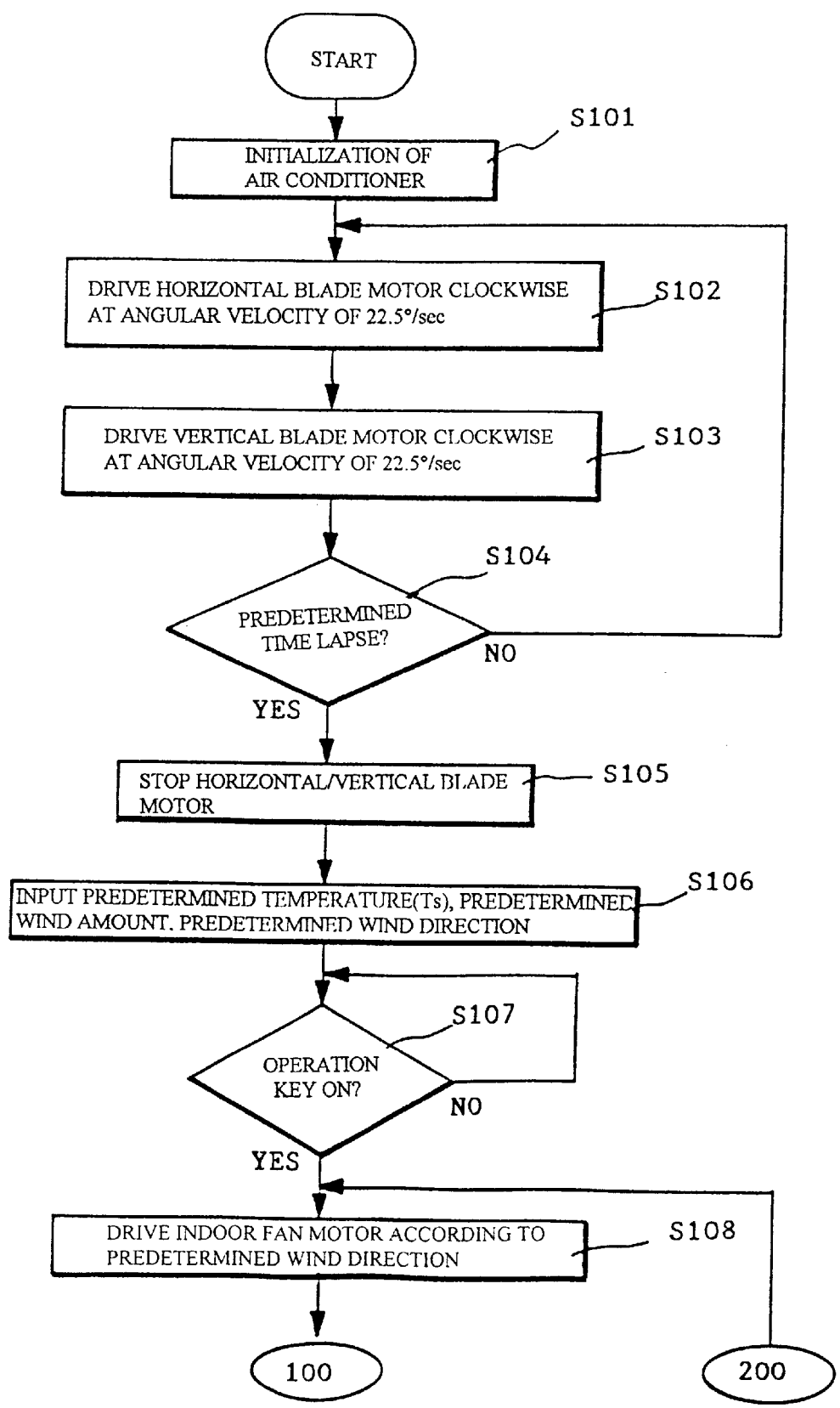
Figure 6D:
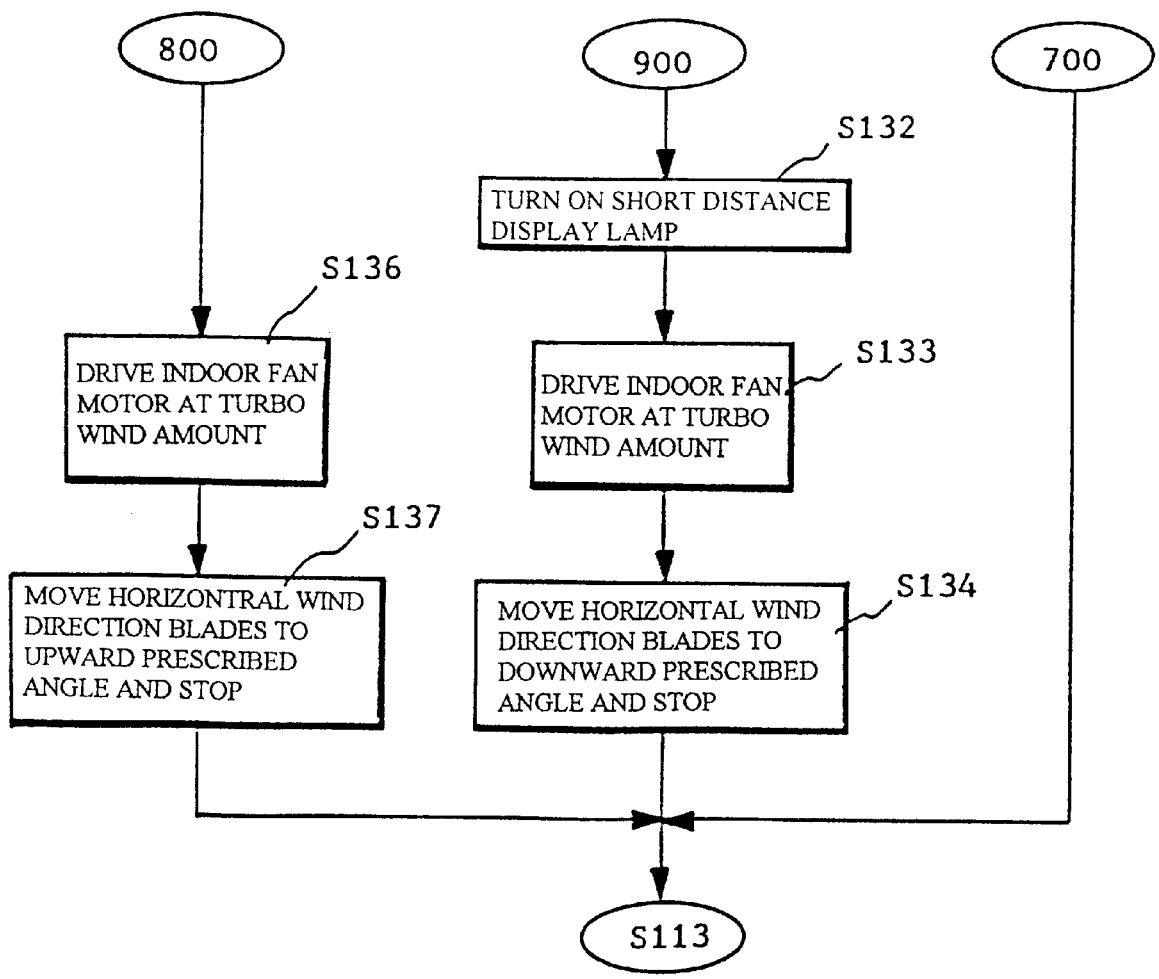
Figure 6E:
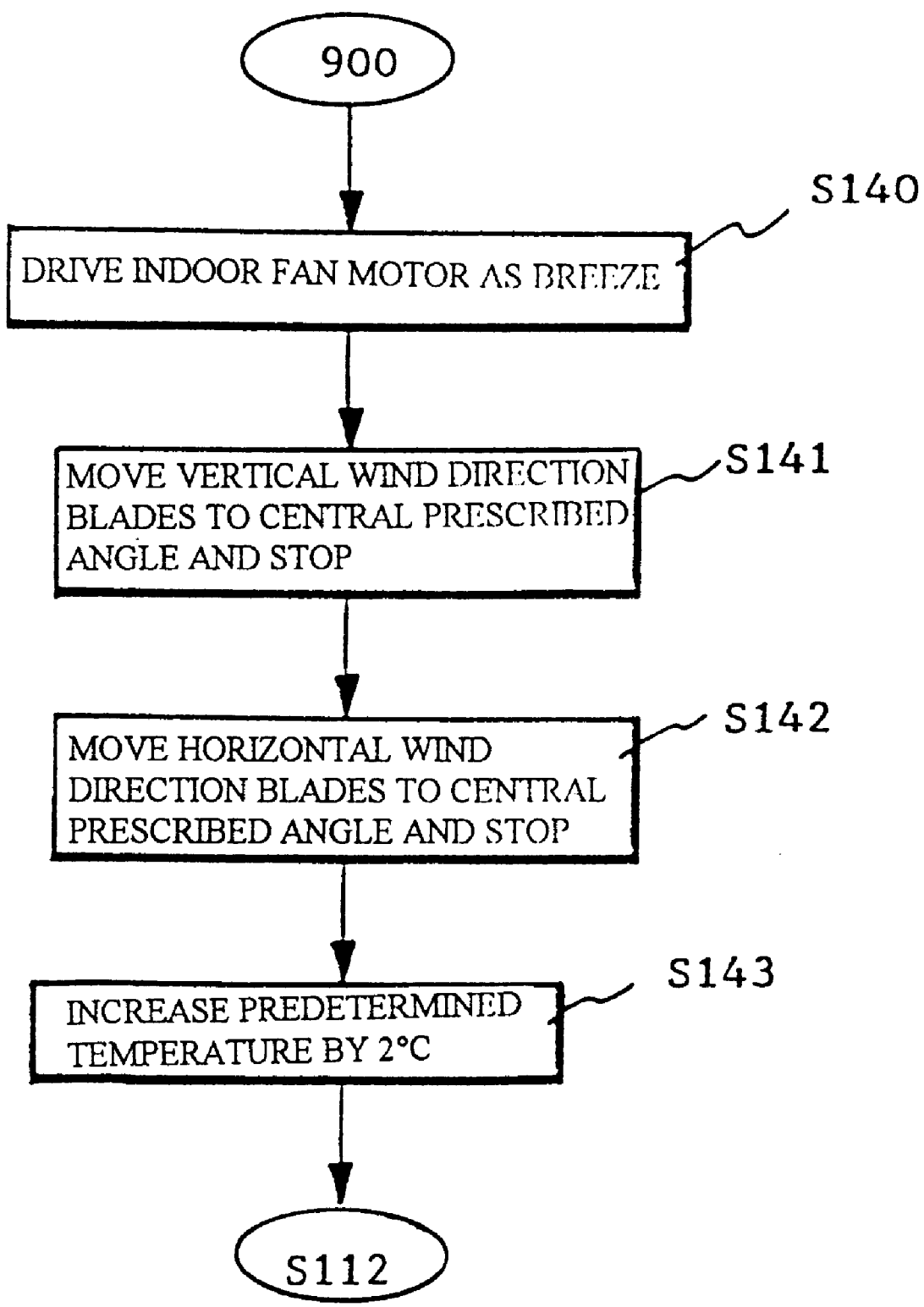
Figure 7A:
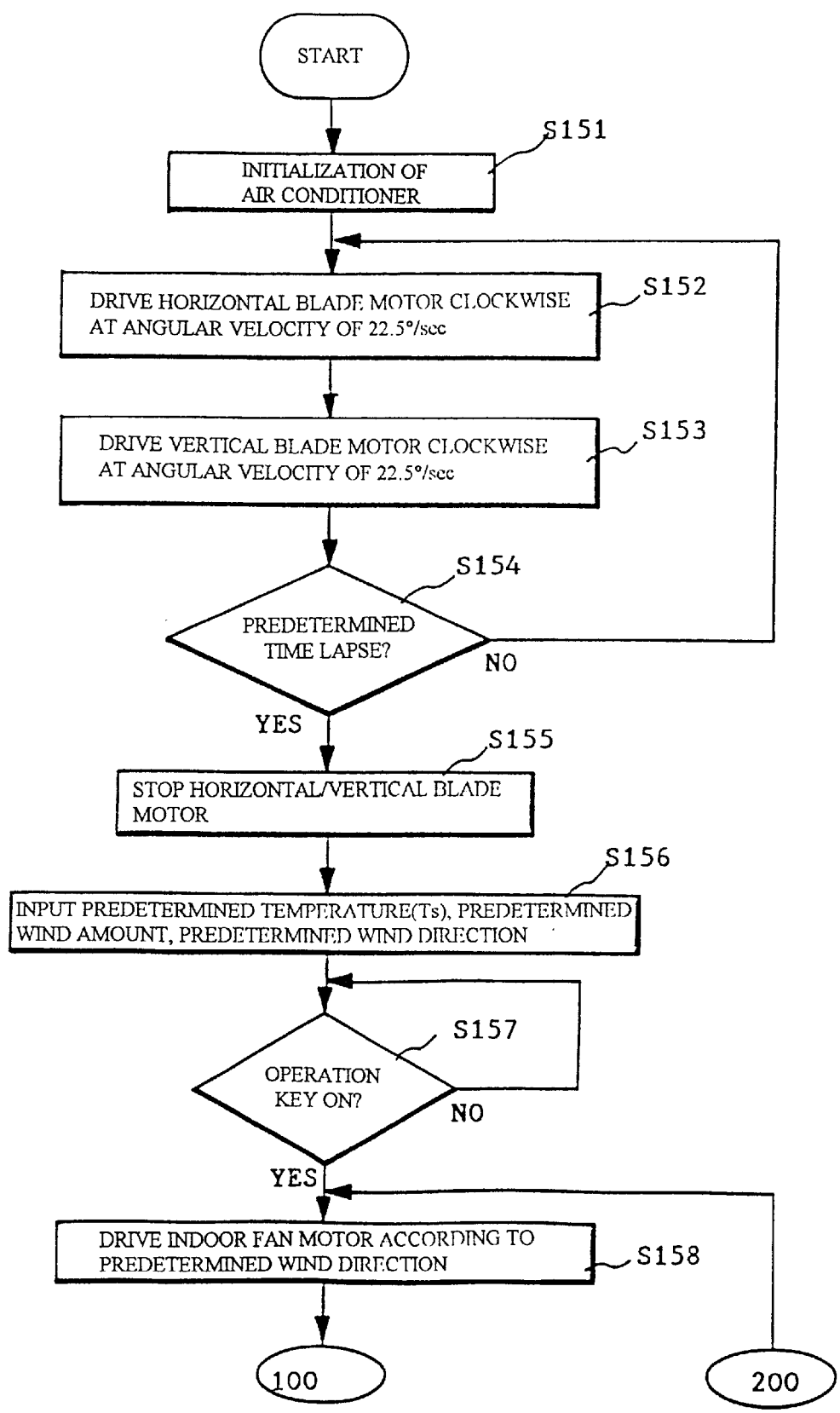
Figure 7B:
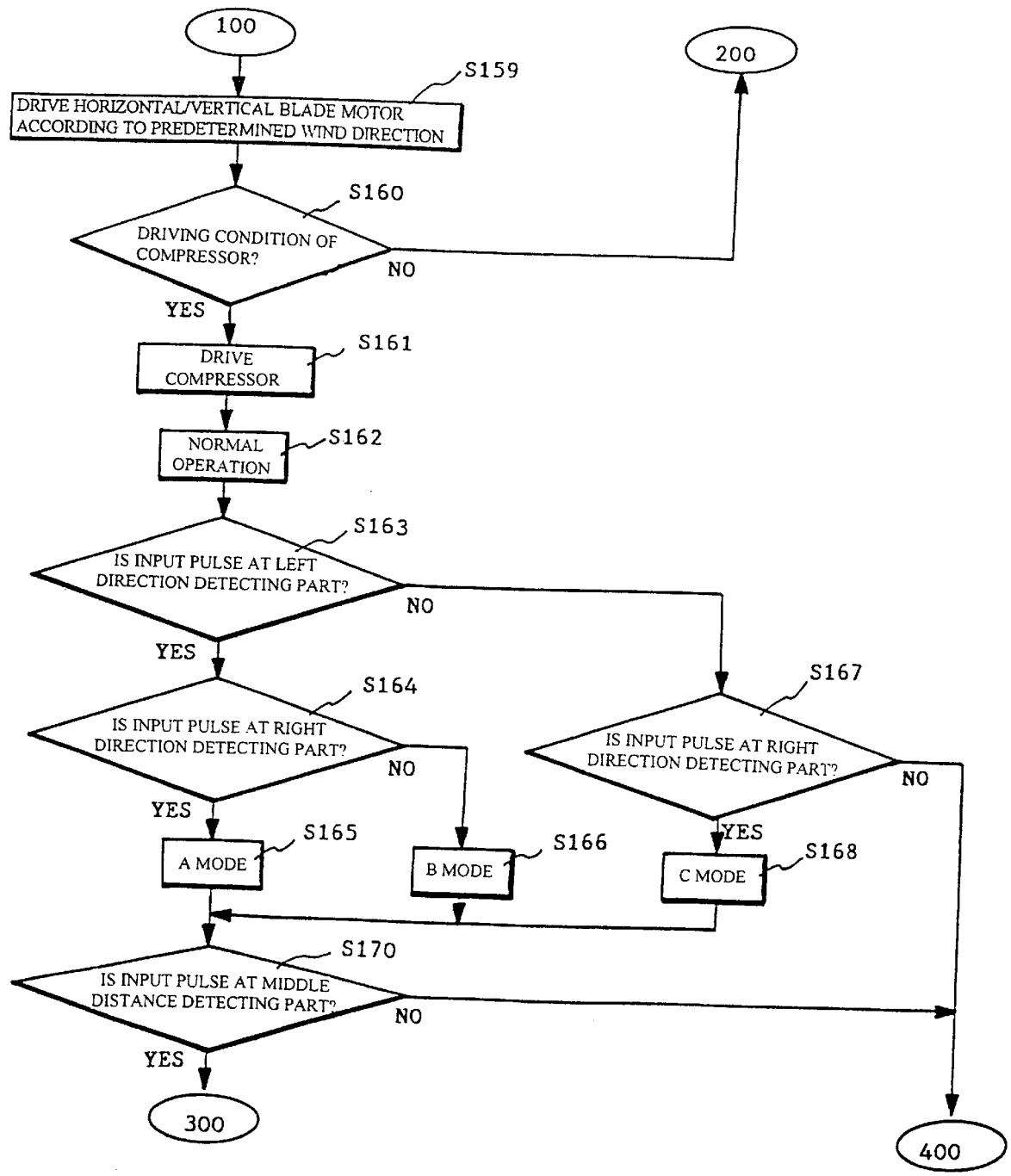
Figure 7D:
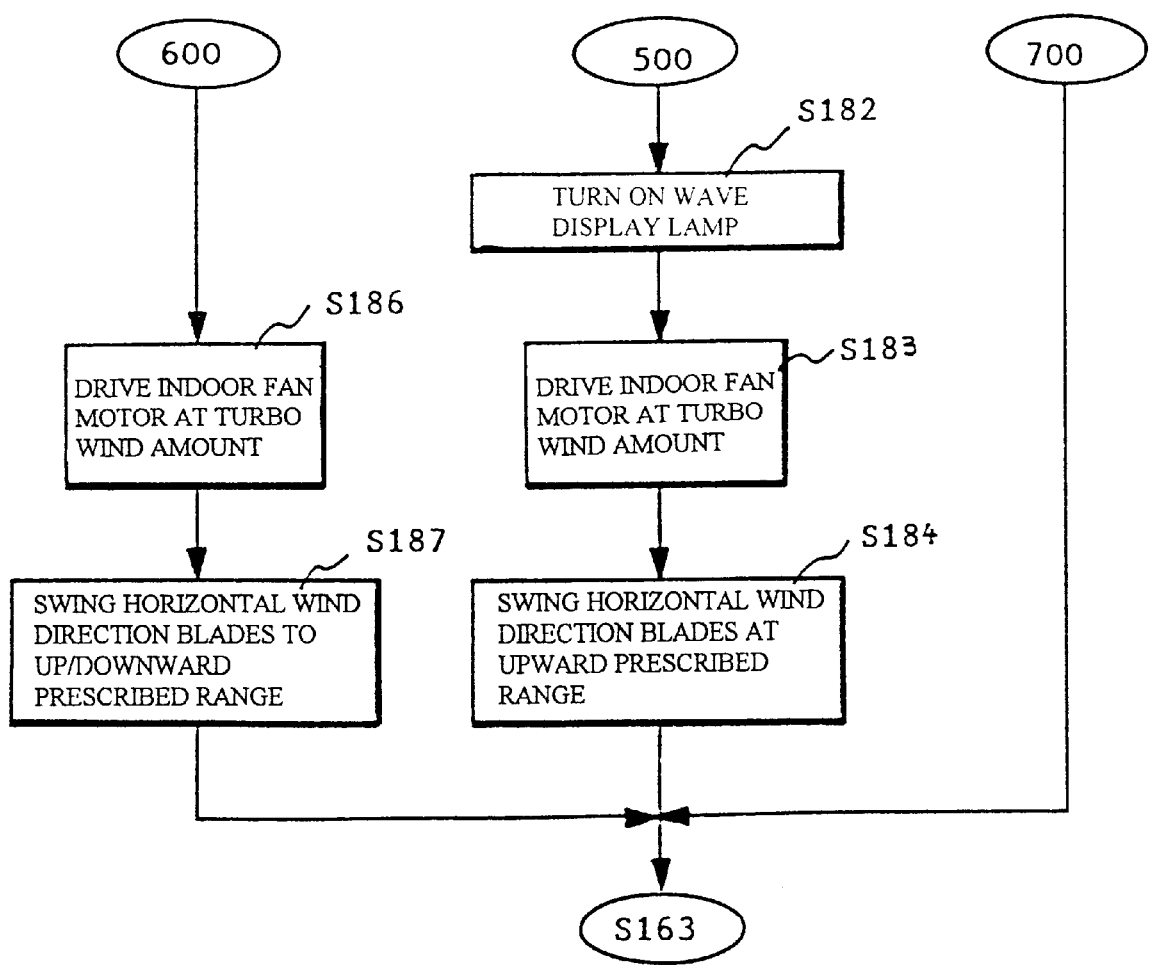
Figure 7E:
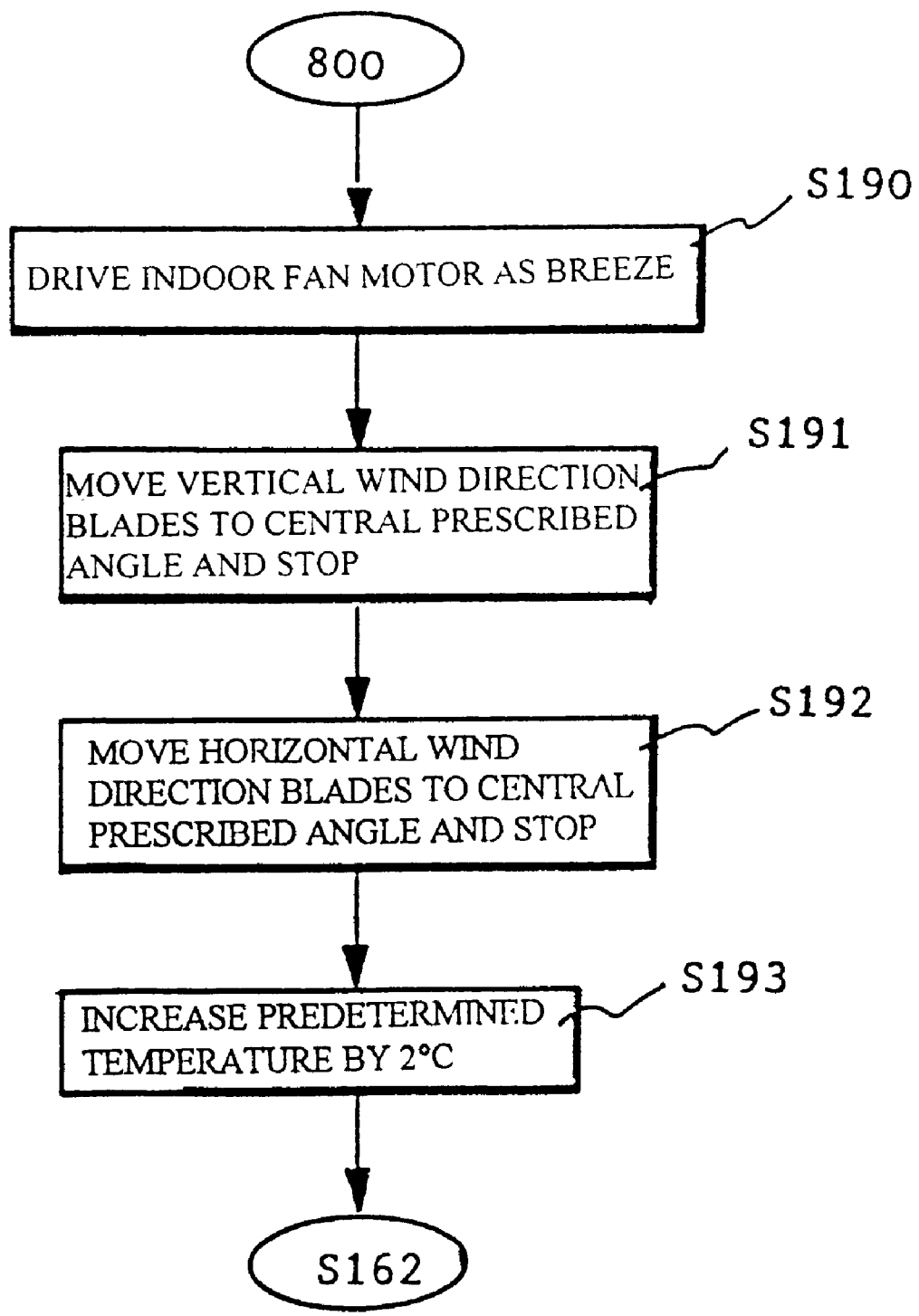
Figure 8A:
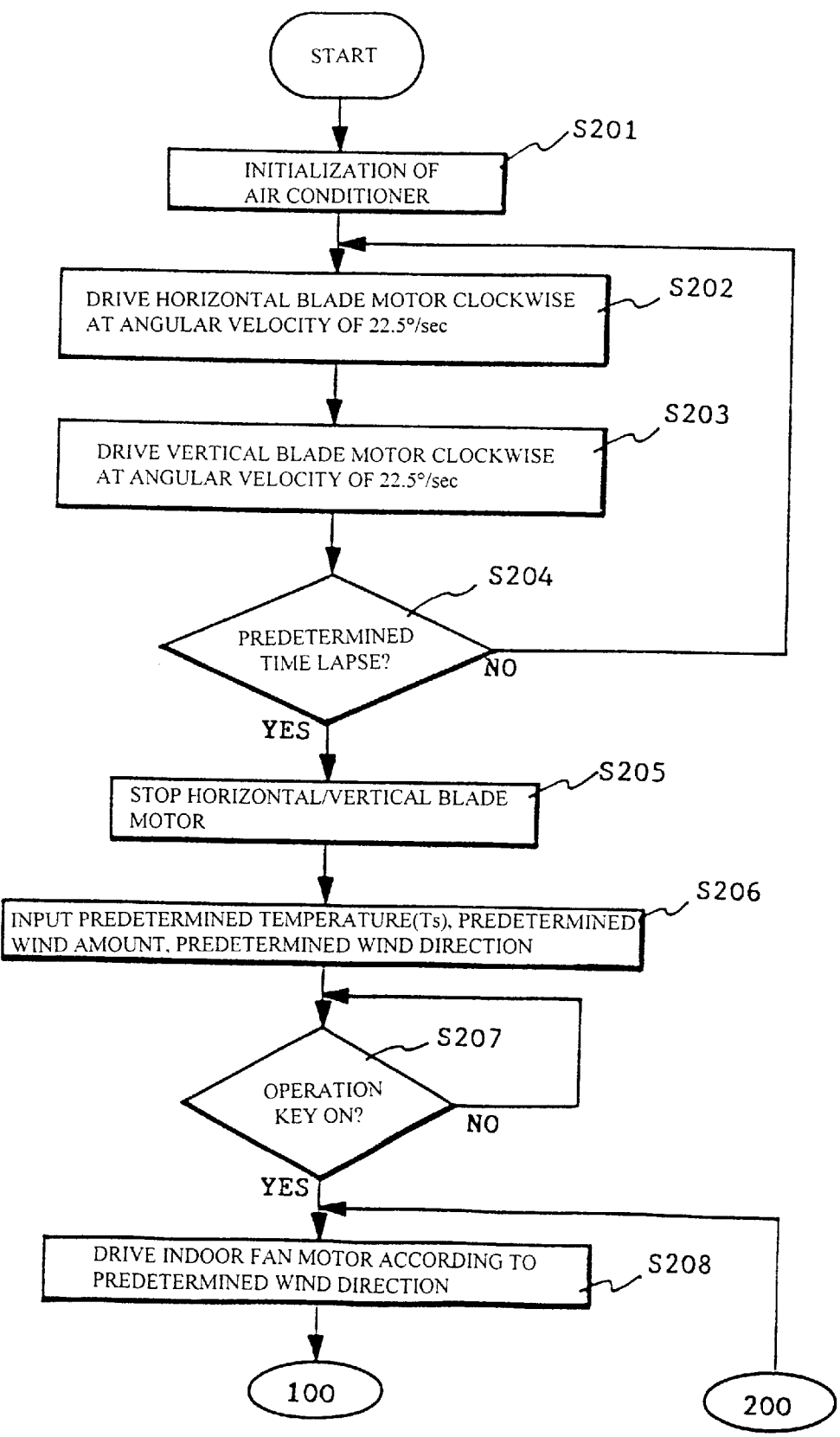
Figure 8B:
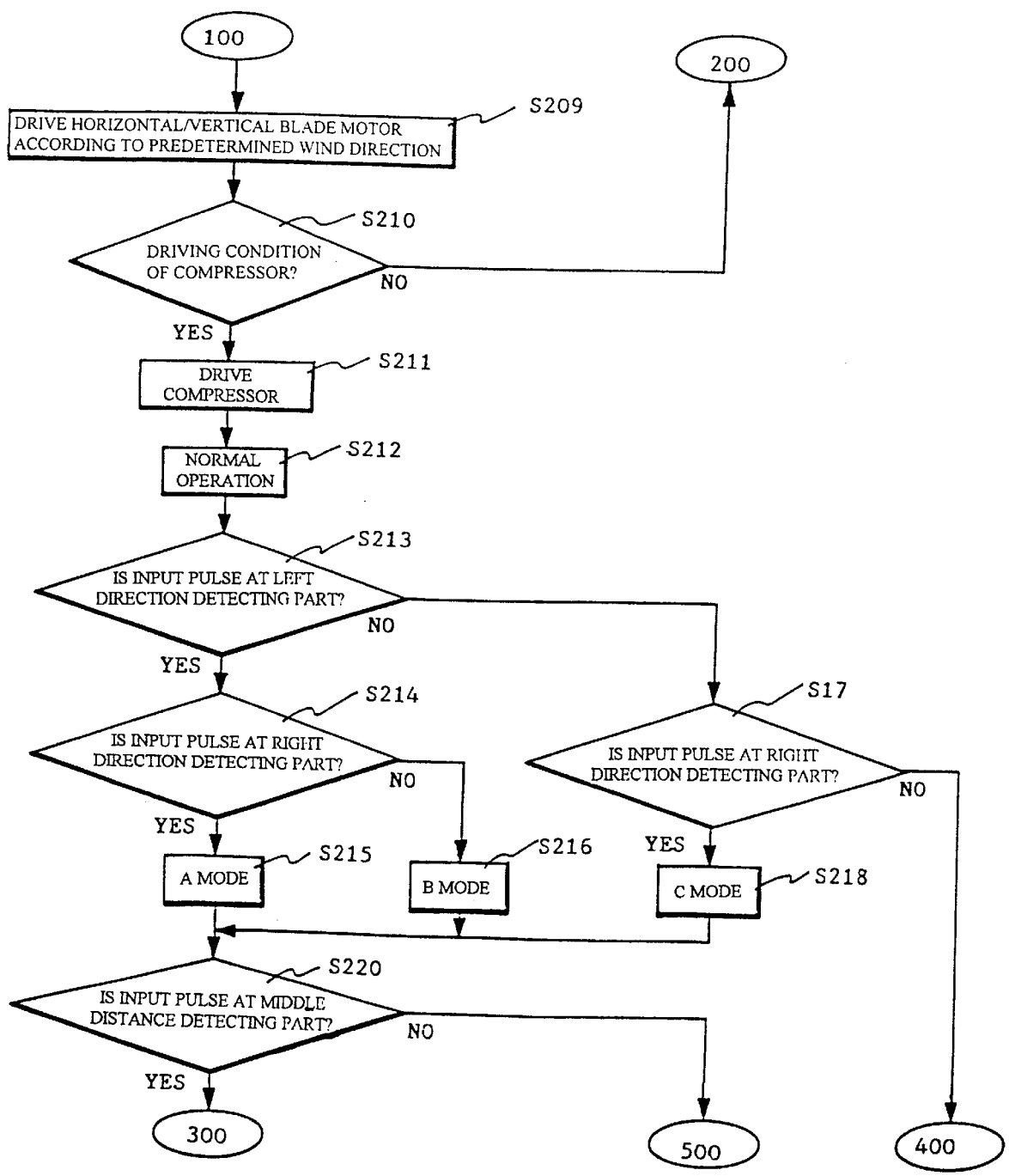
Figure 8C:
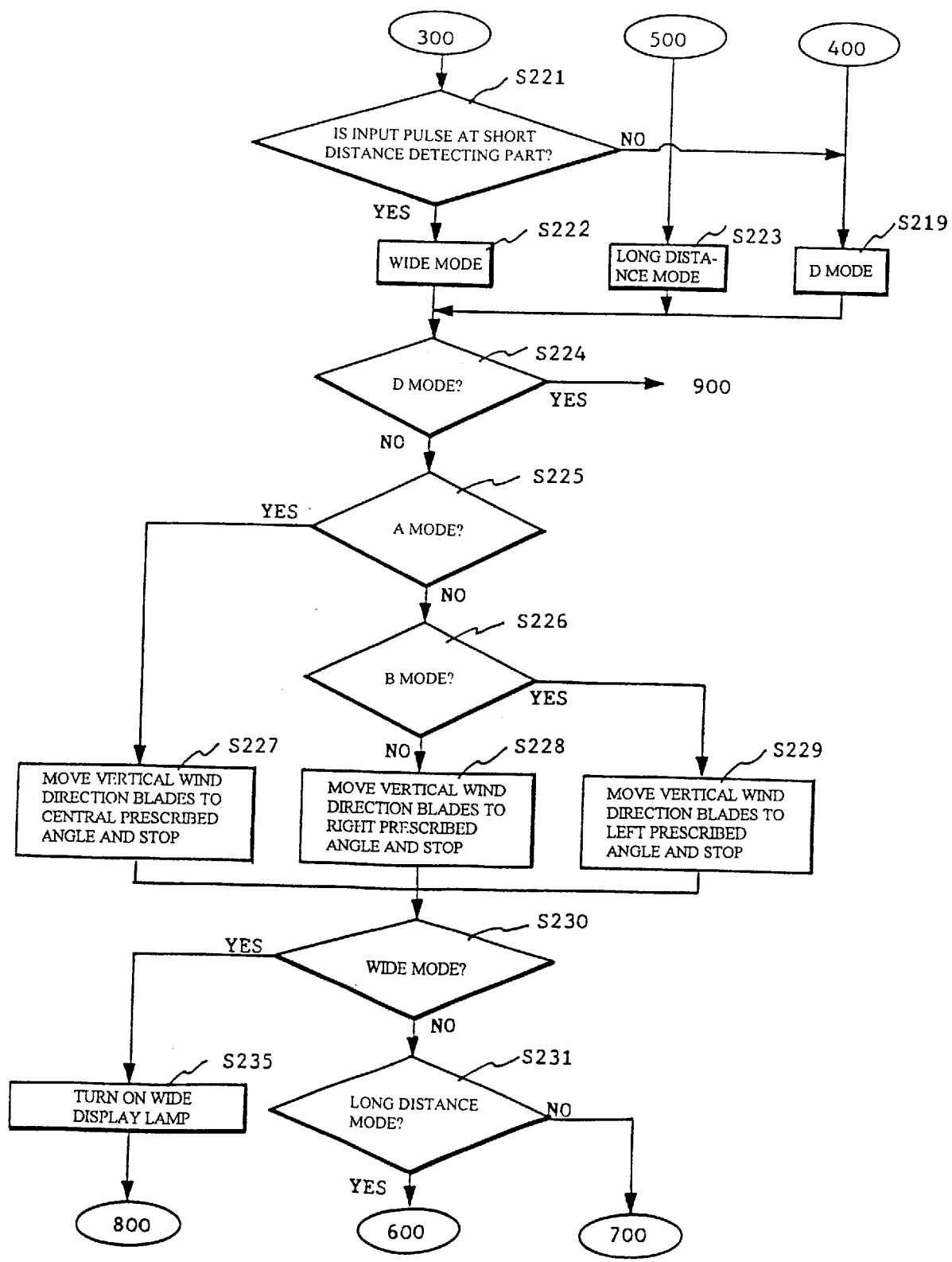
Figure 8D:
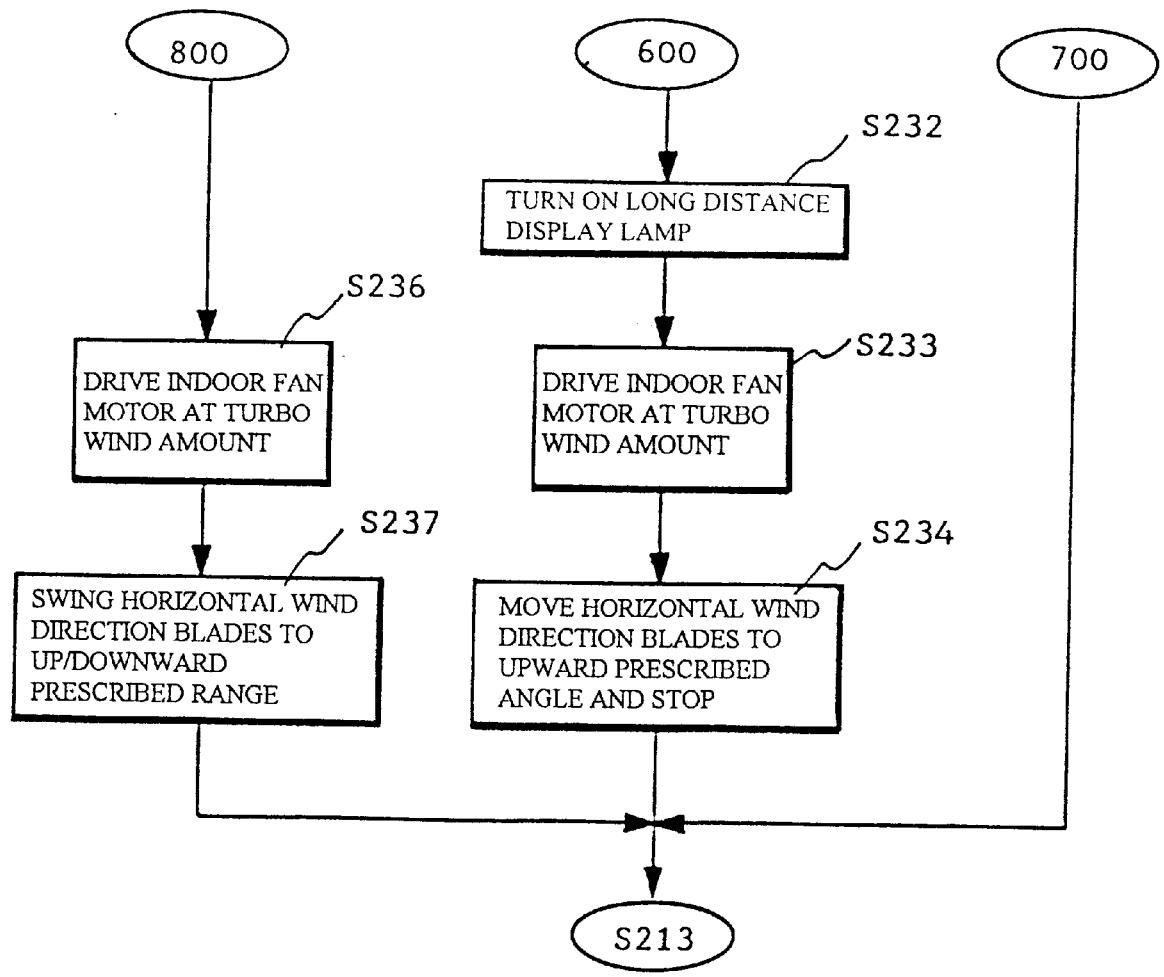
Figure 9A:
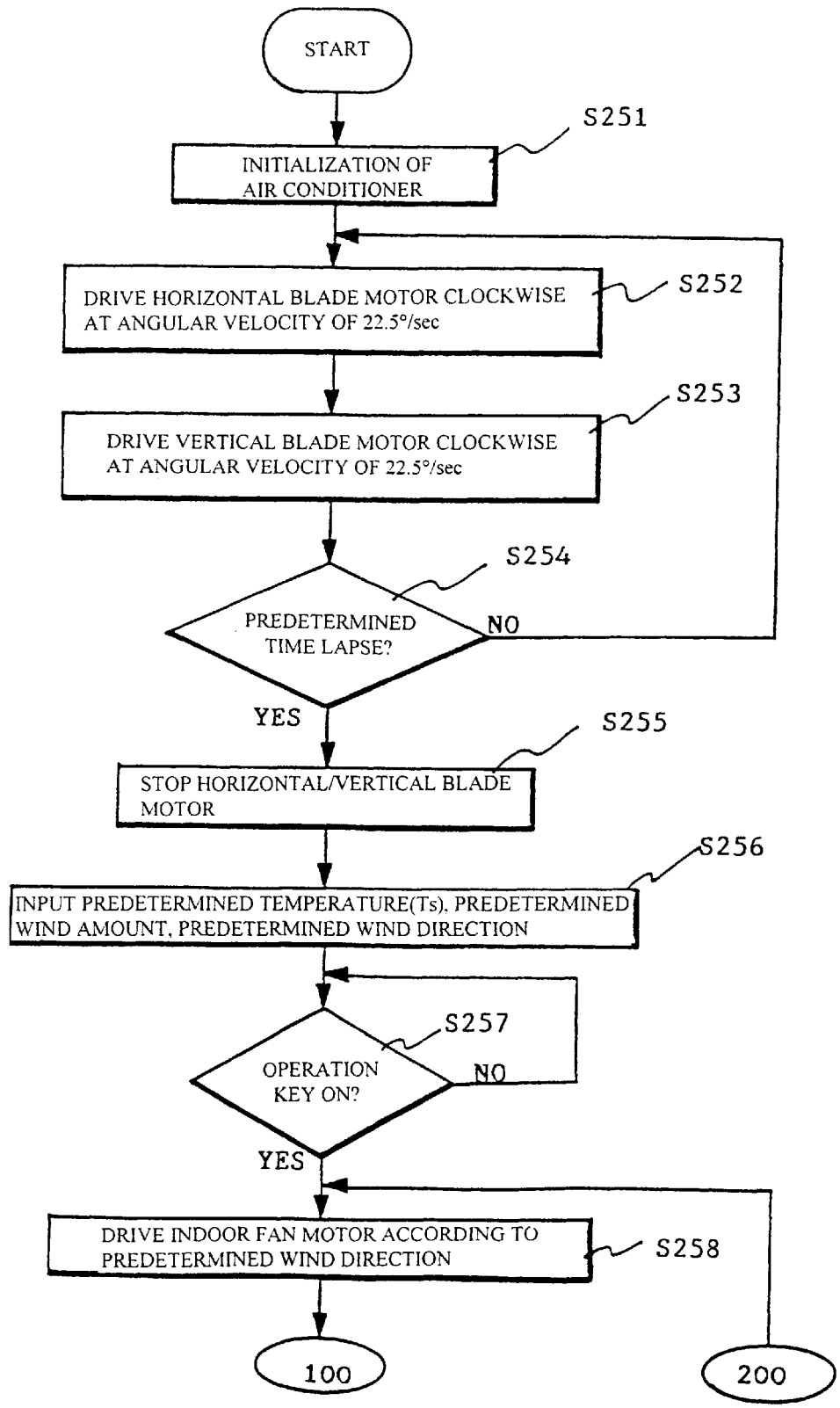
FIGS. 9A through 9E are flow charts for showing a discharge current control operation in a wave and long distance mode according to the present invention.
Figure 9B:
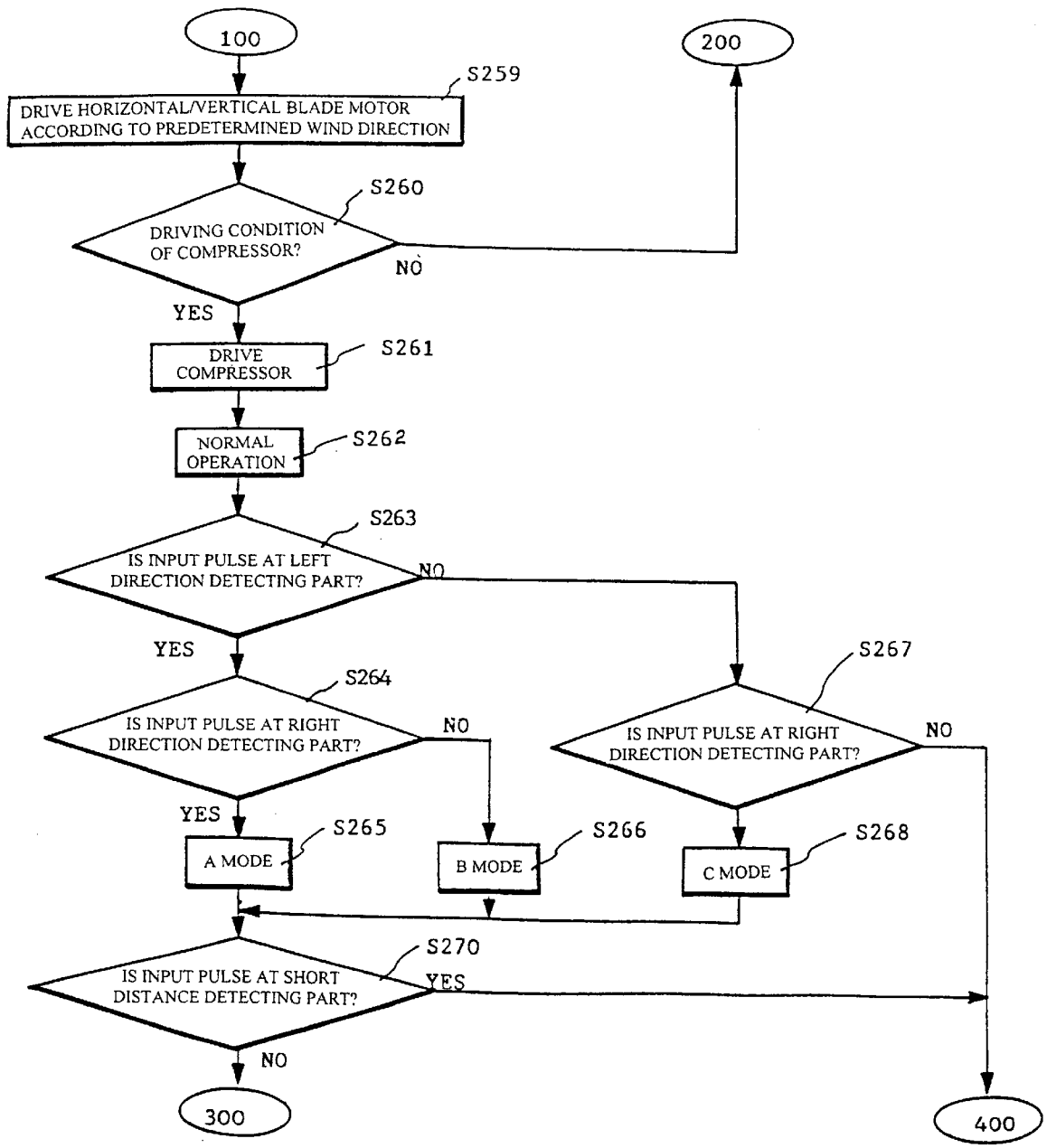
Figure 9C:
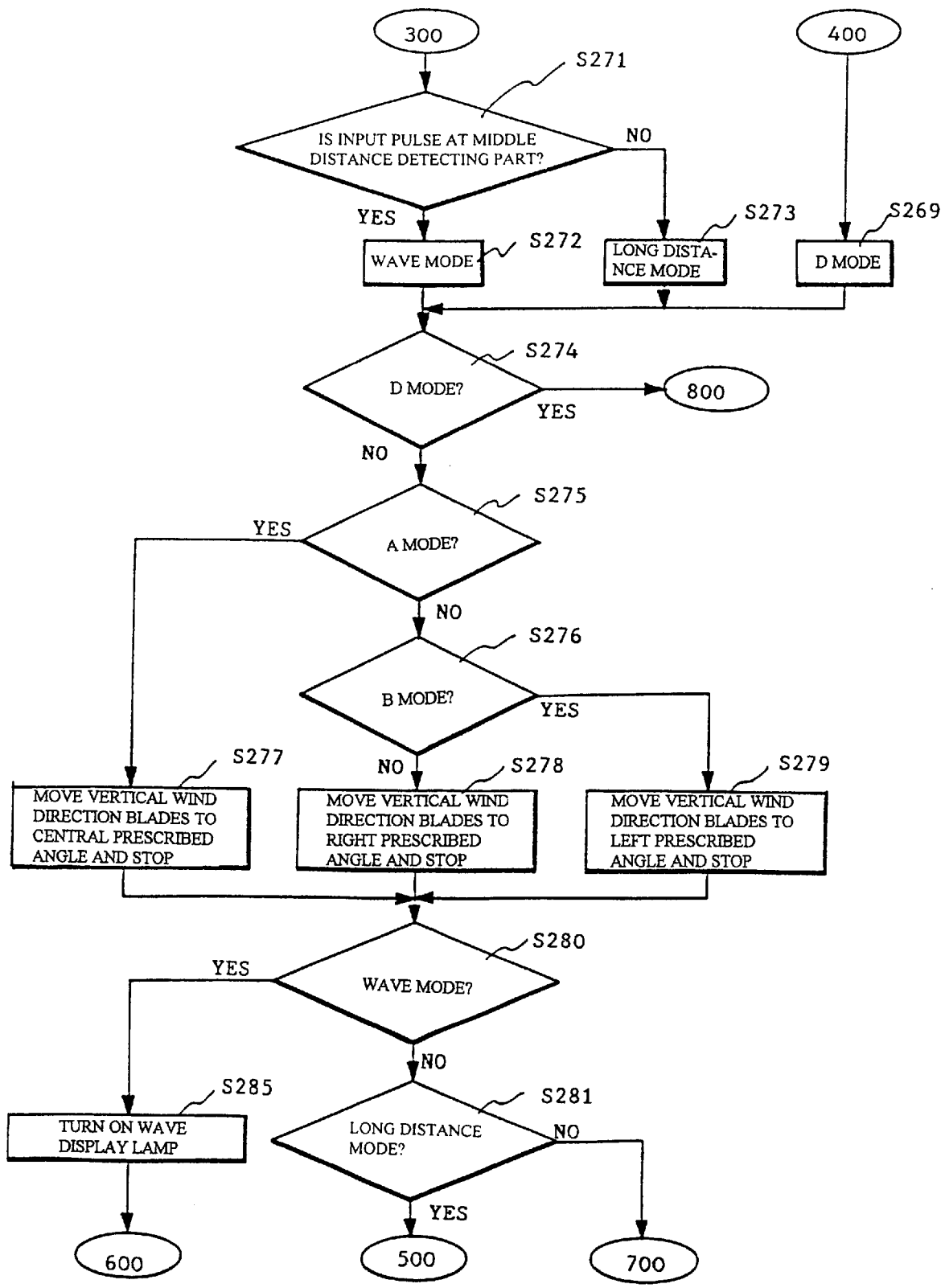
Figure 9D:
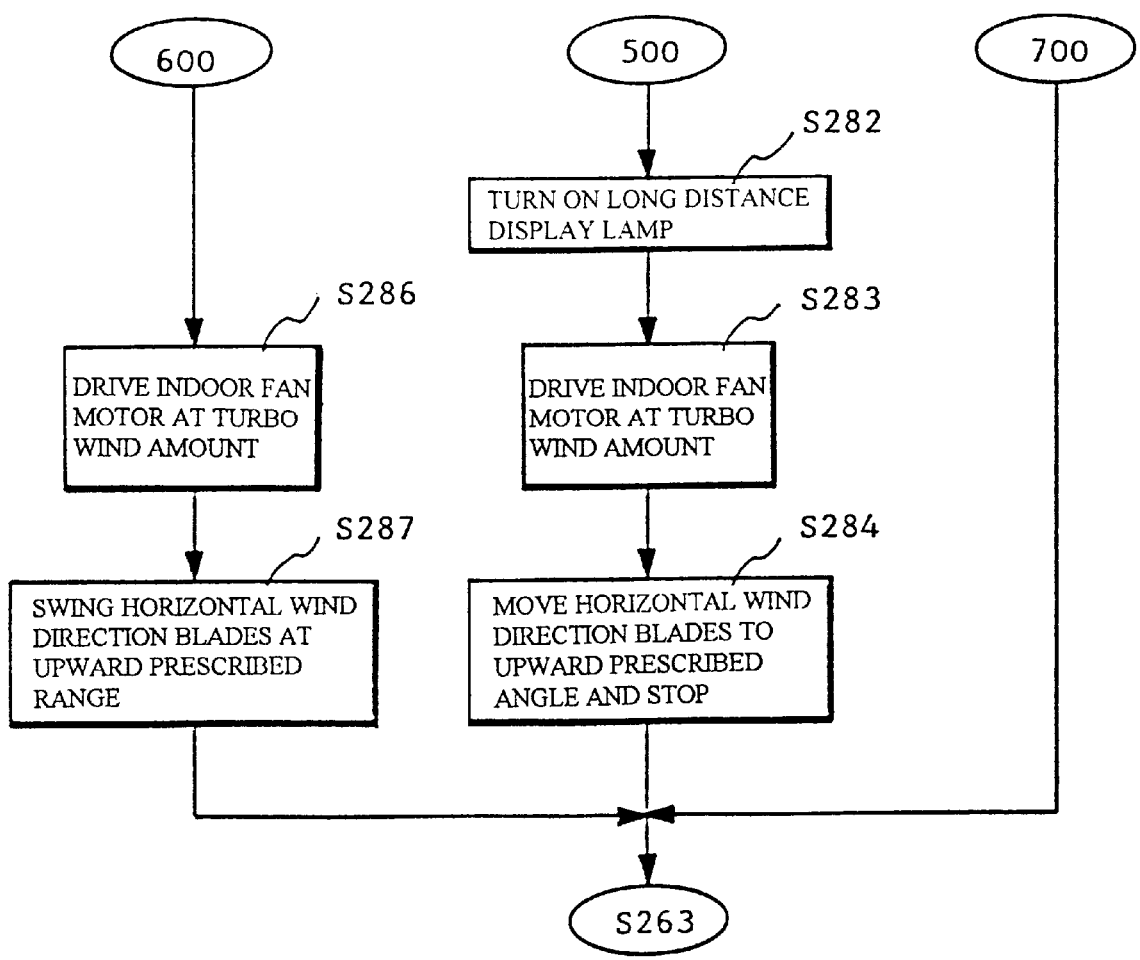
Figure 9E:
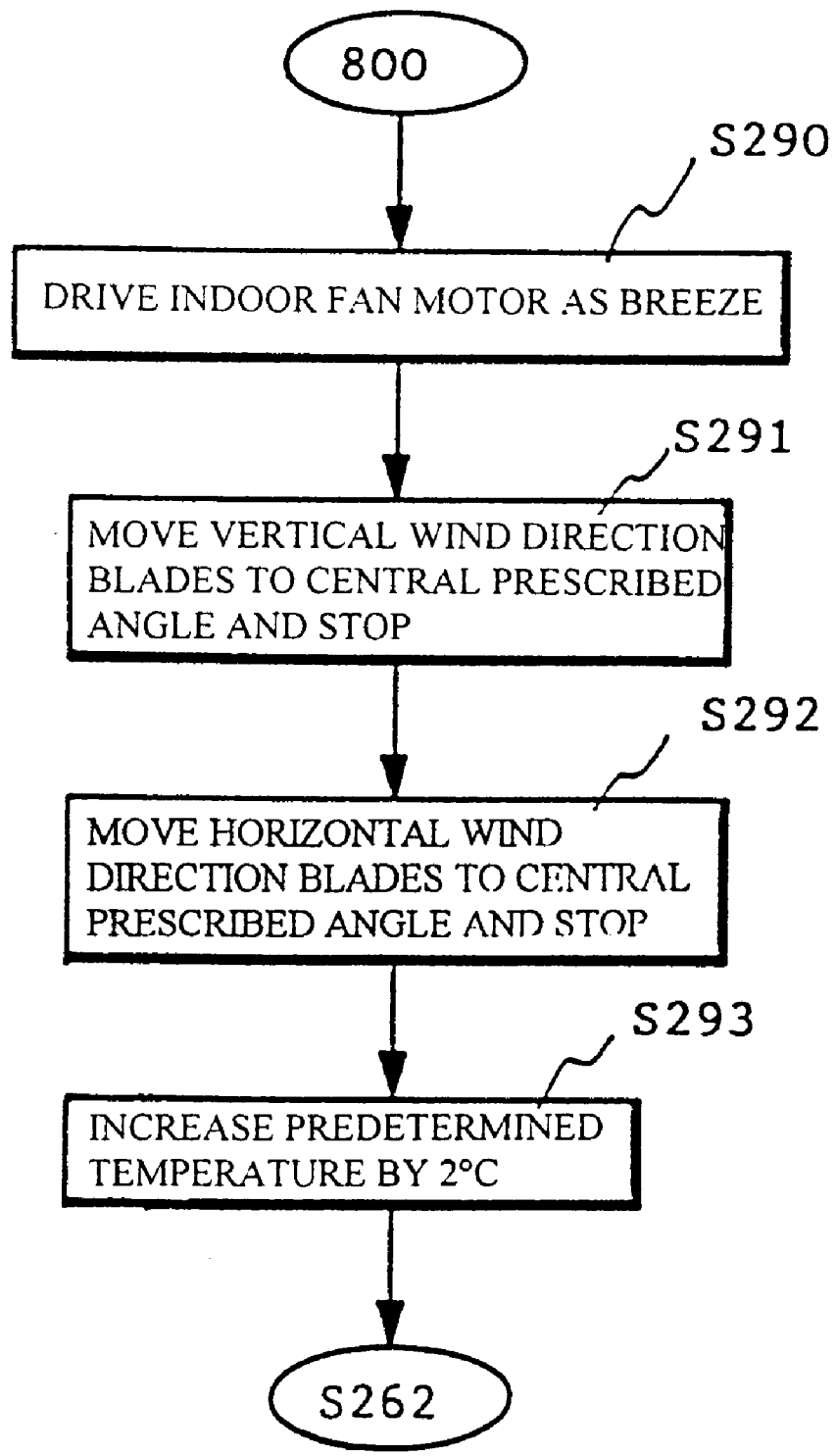
Figure 10A:
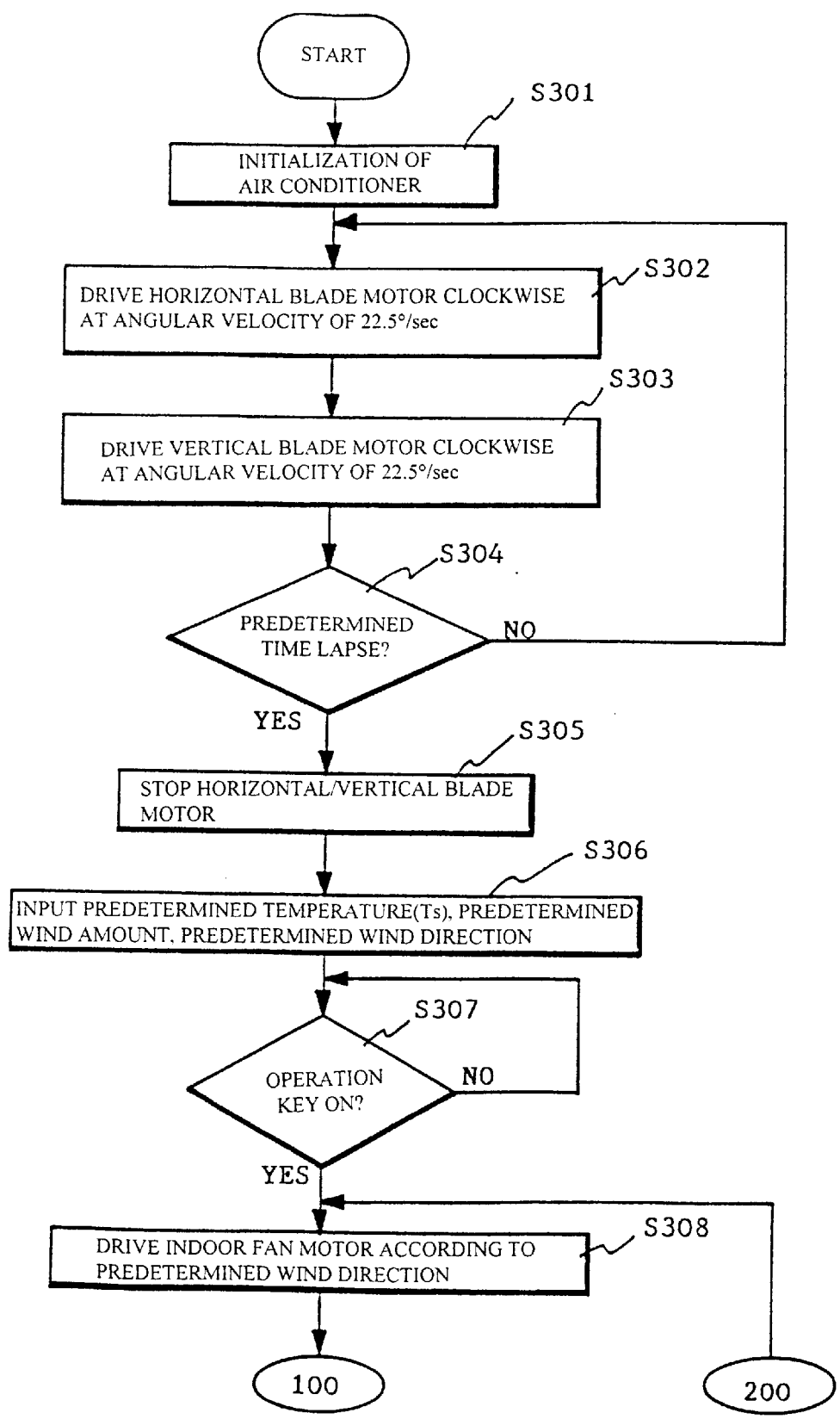
Figure 10C:
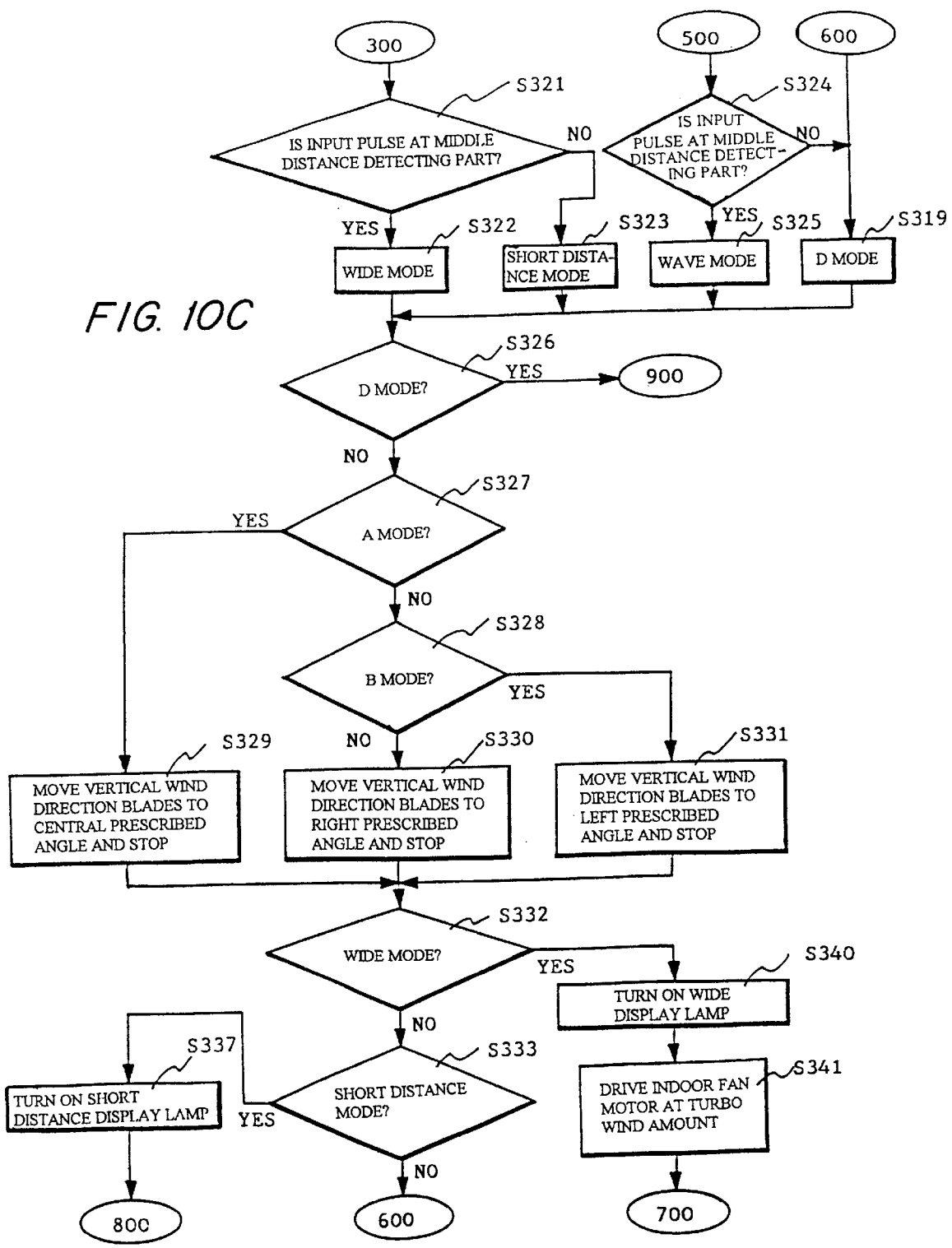
Figure 10D:
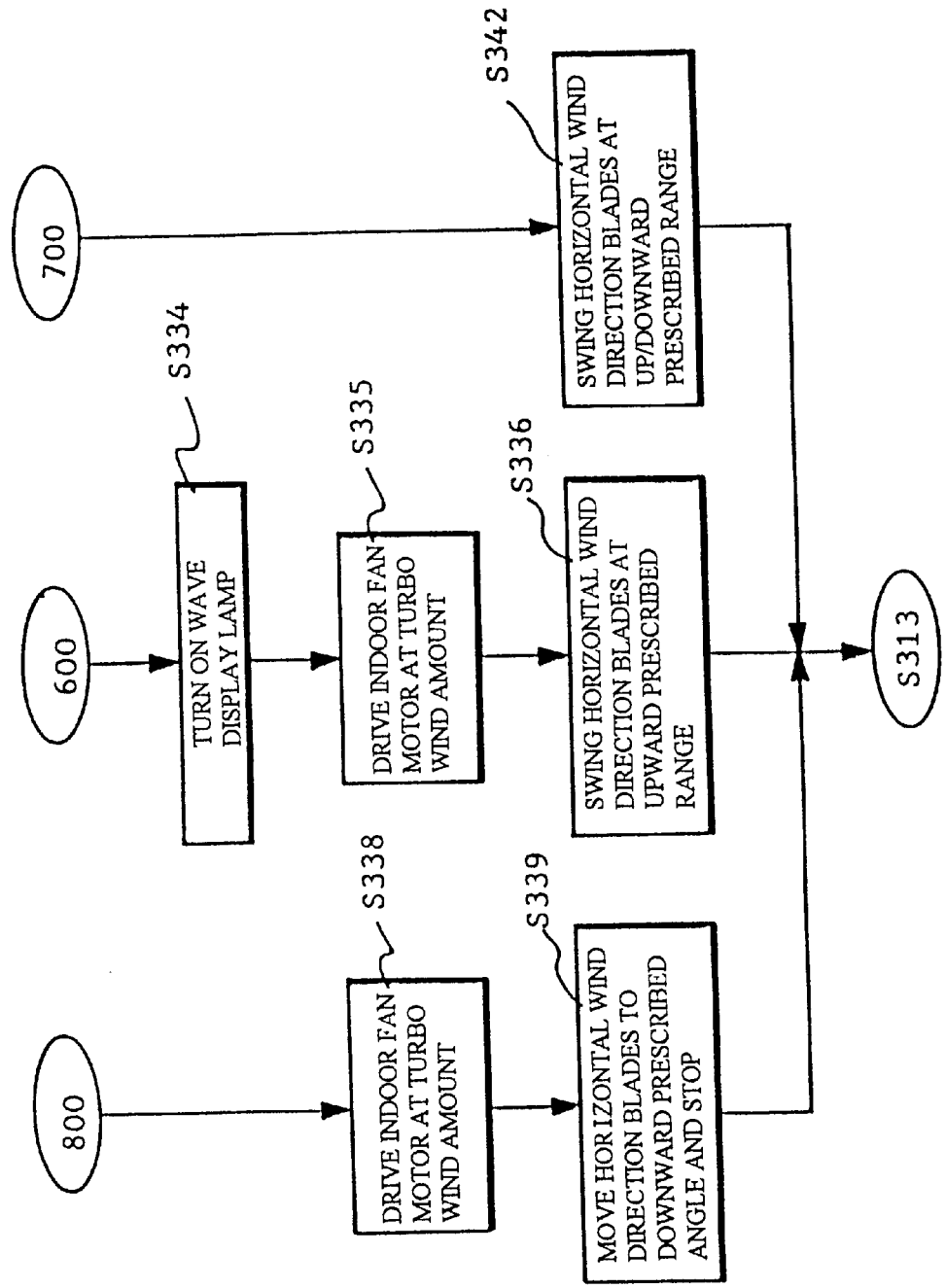
Figure 10E:
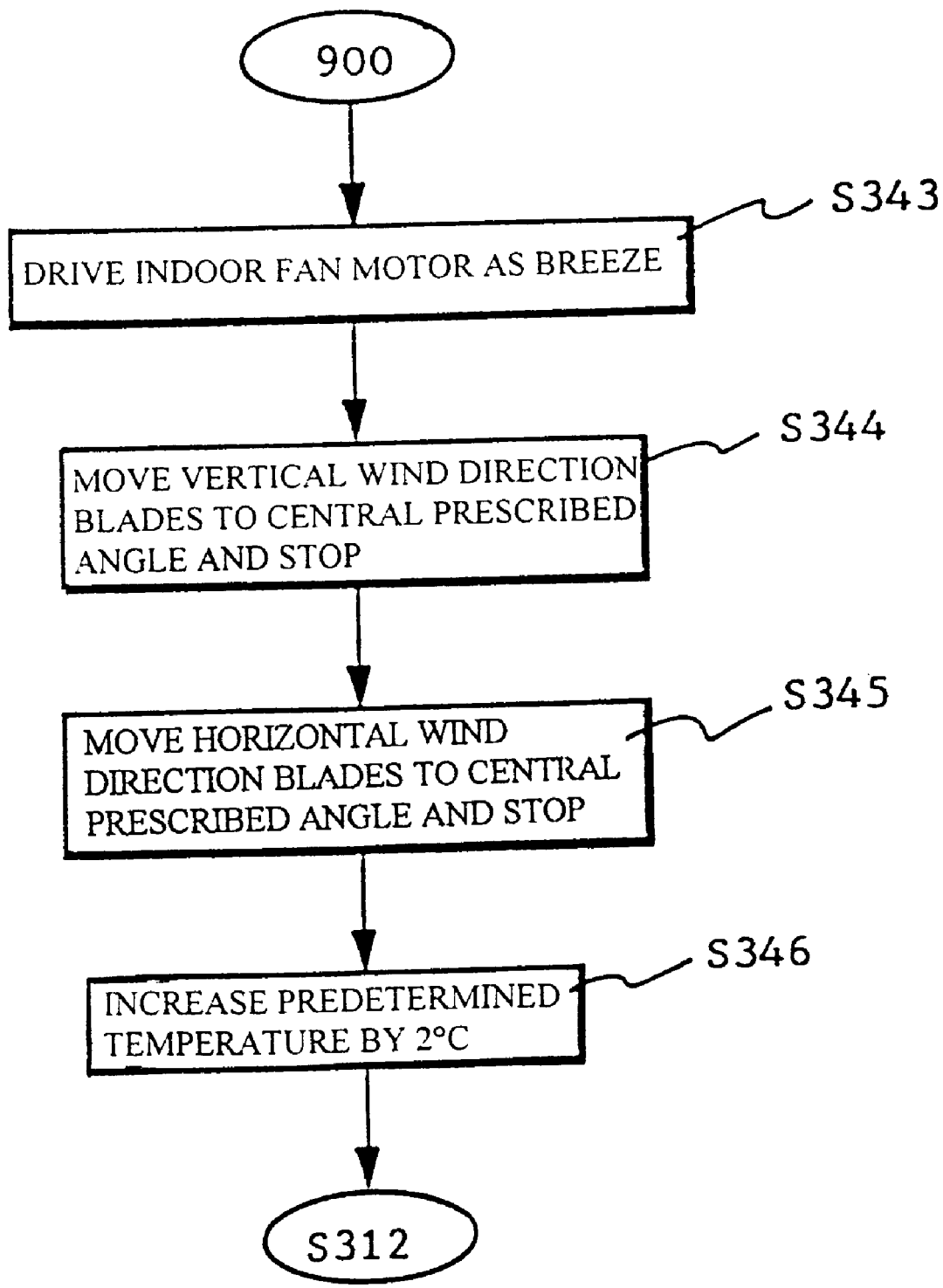
Figure 11A:
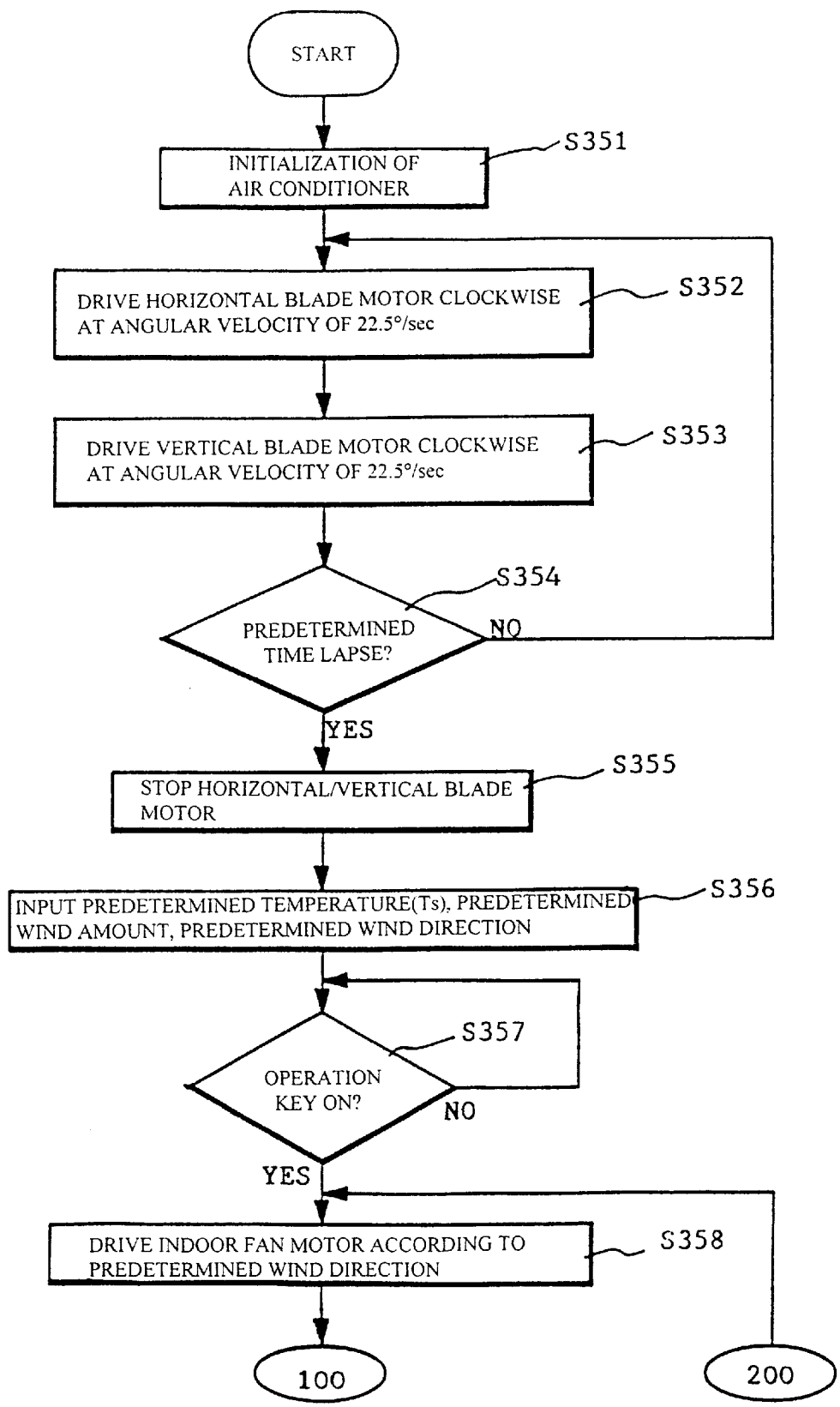
FIGS. 11A through 11E are flow charts for showing a discharge current control operation in a short distance, wide, and long distance mode according to the present invention.
Figure 11B:
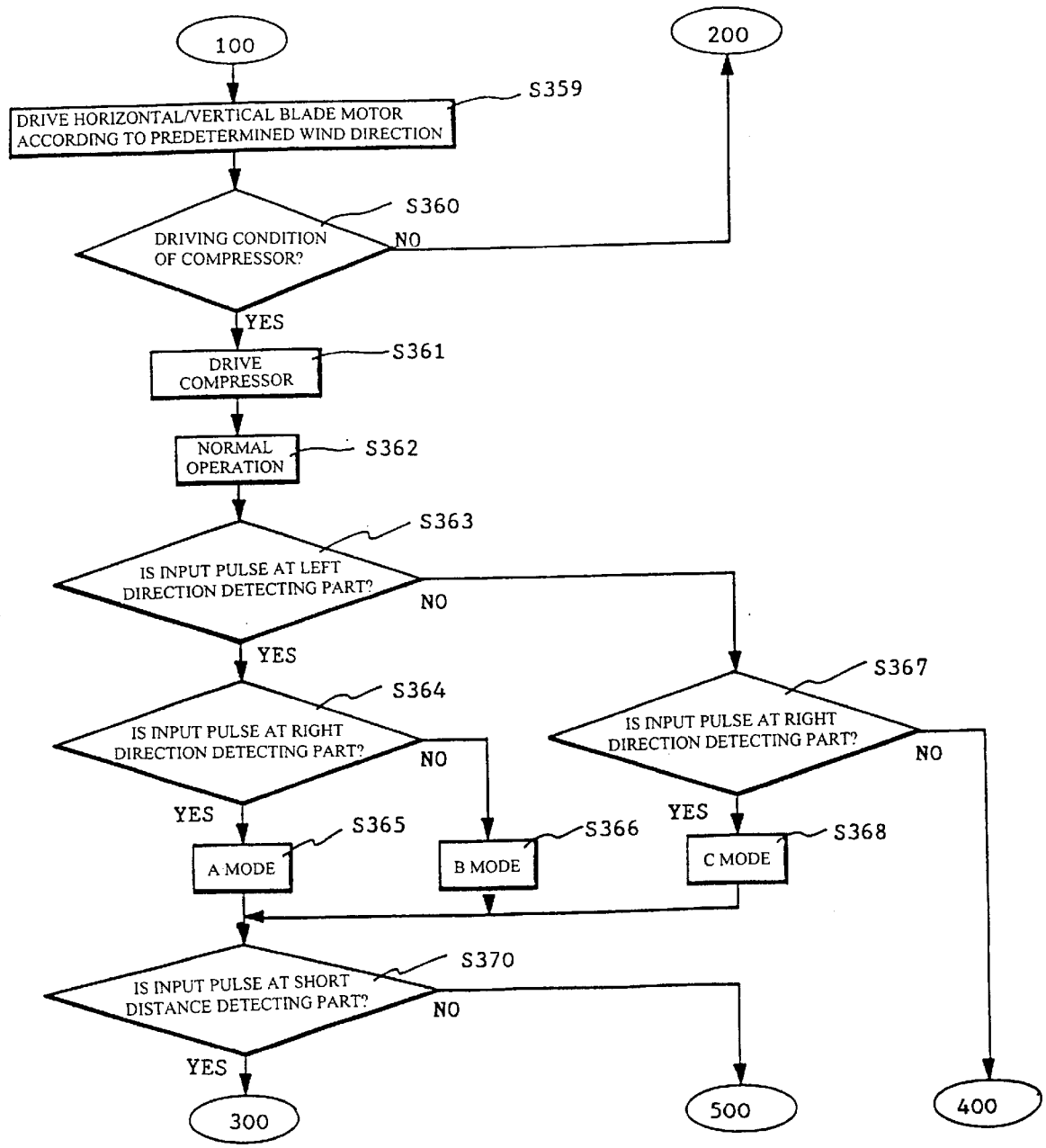
Figure 11C:
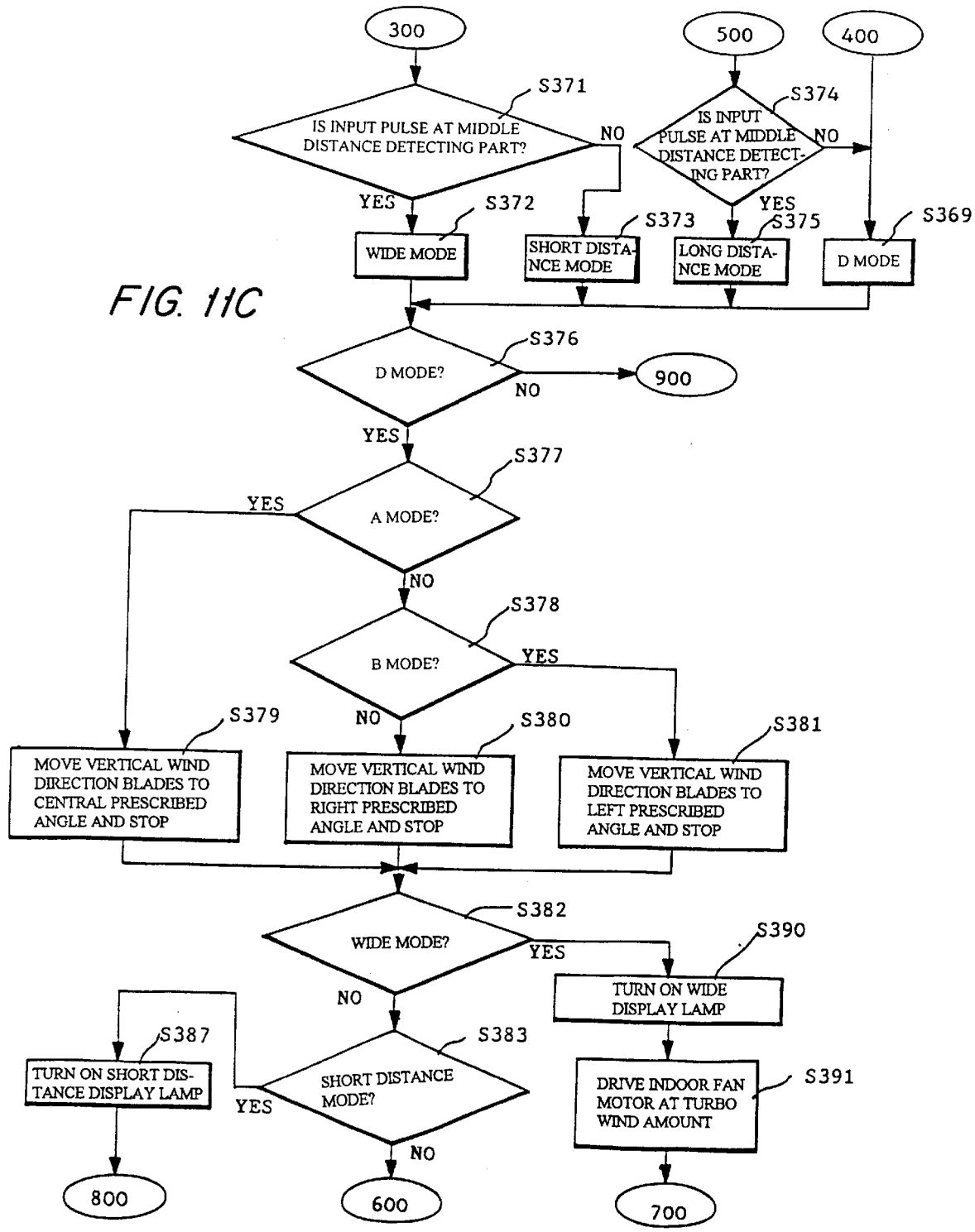
Figure 11D:
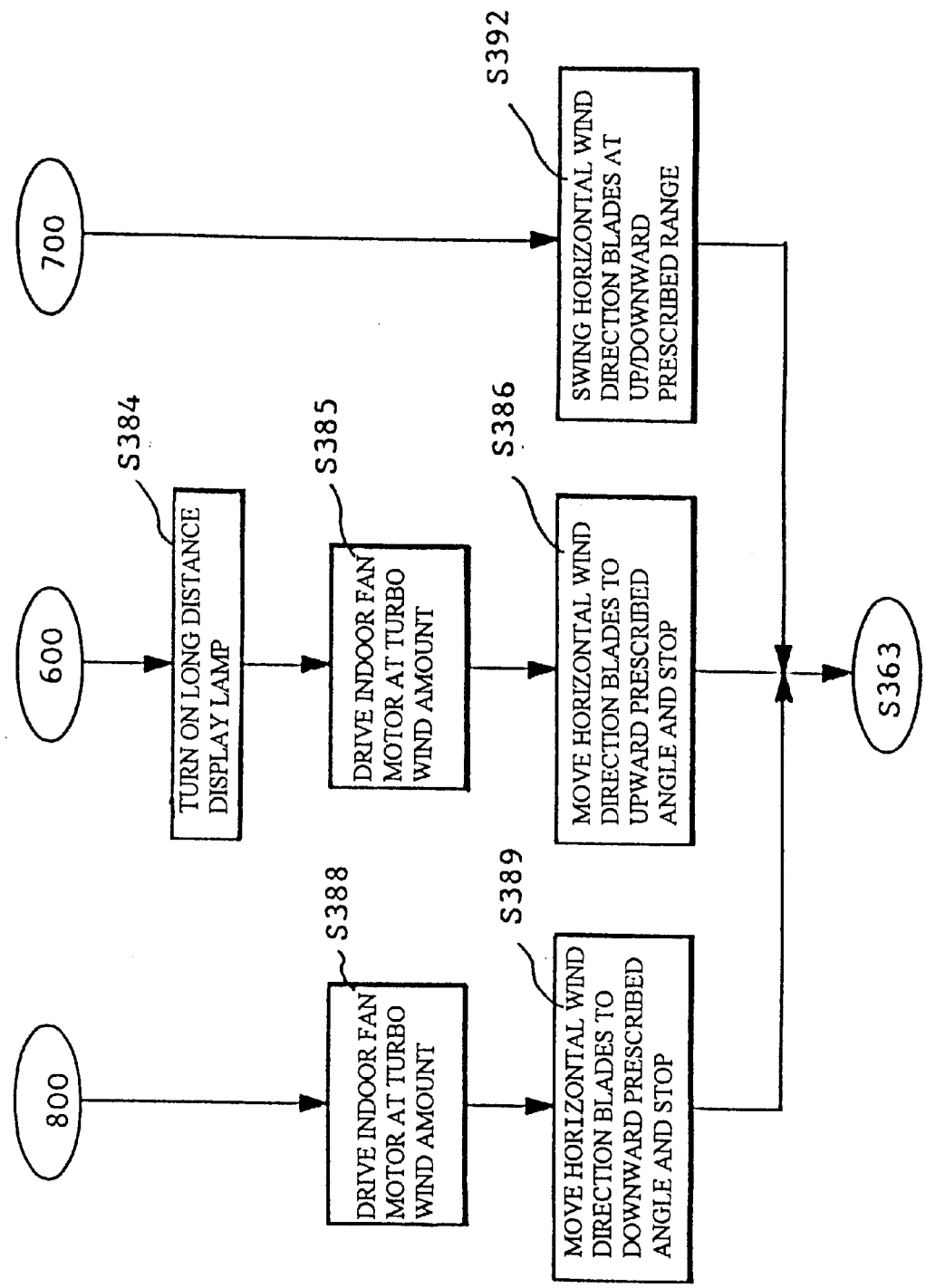
Figure 11E:
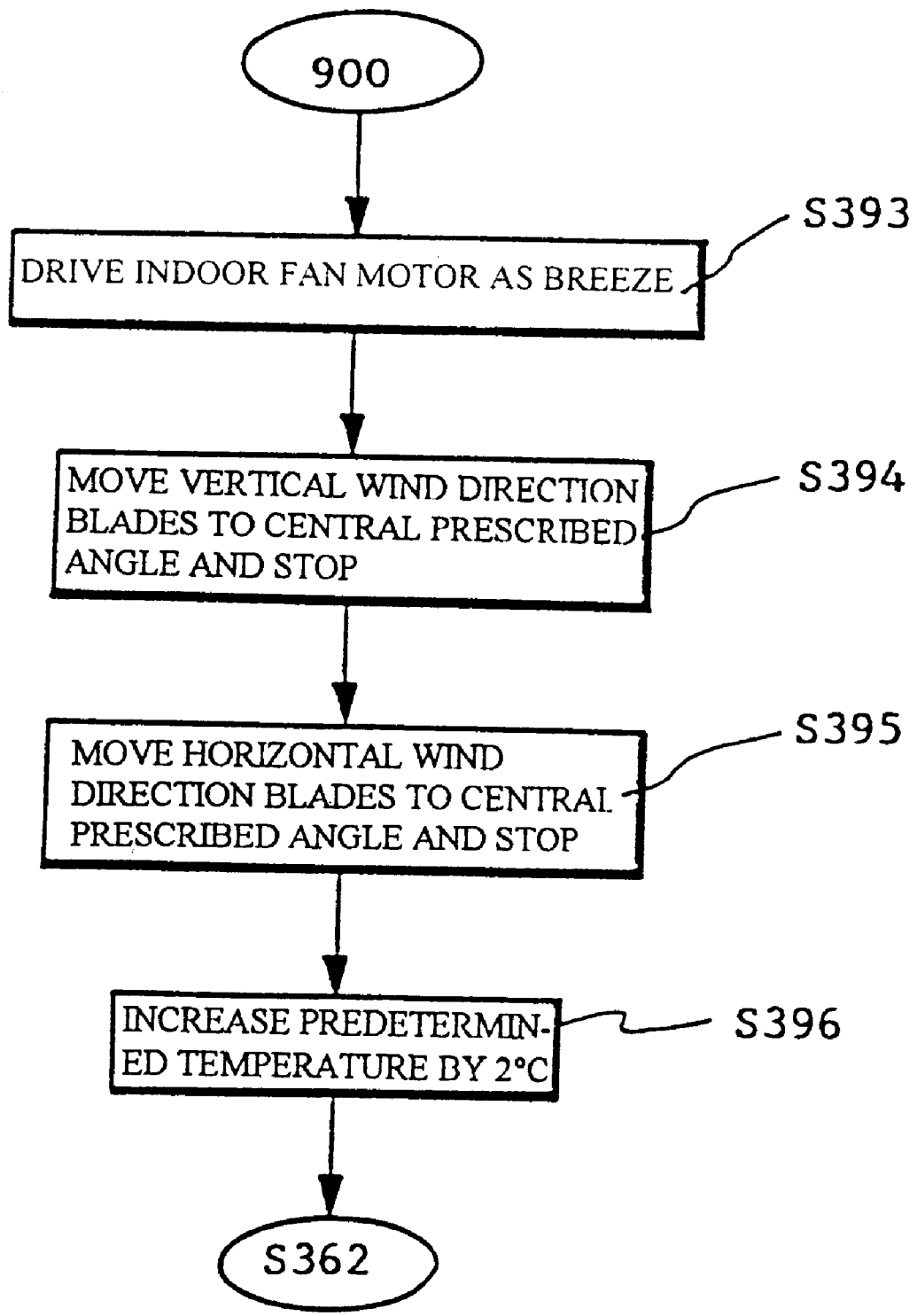
Figure 12A:
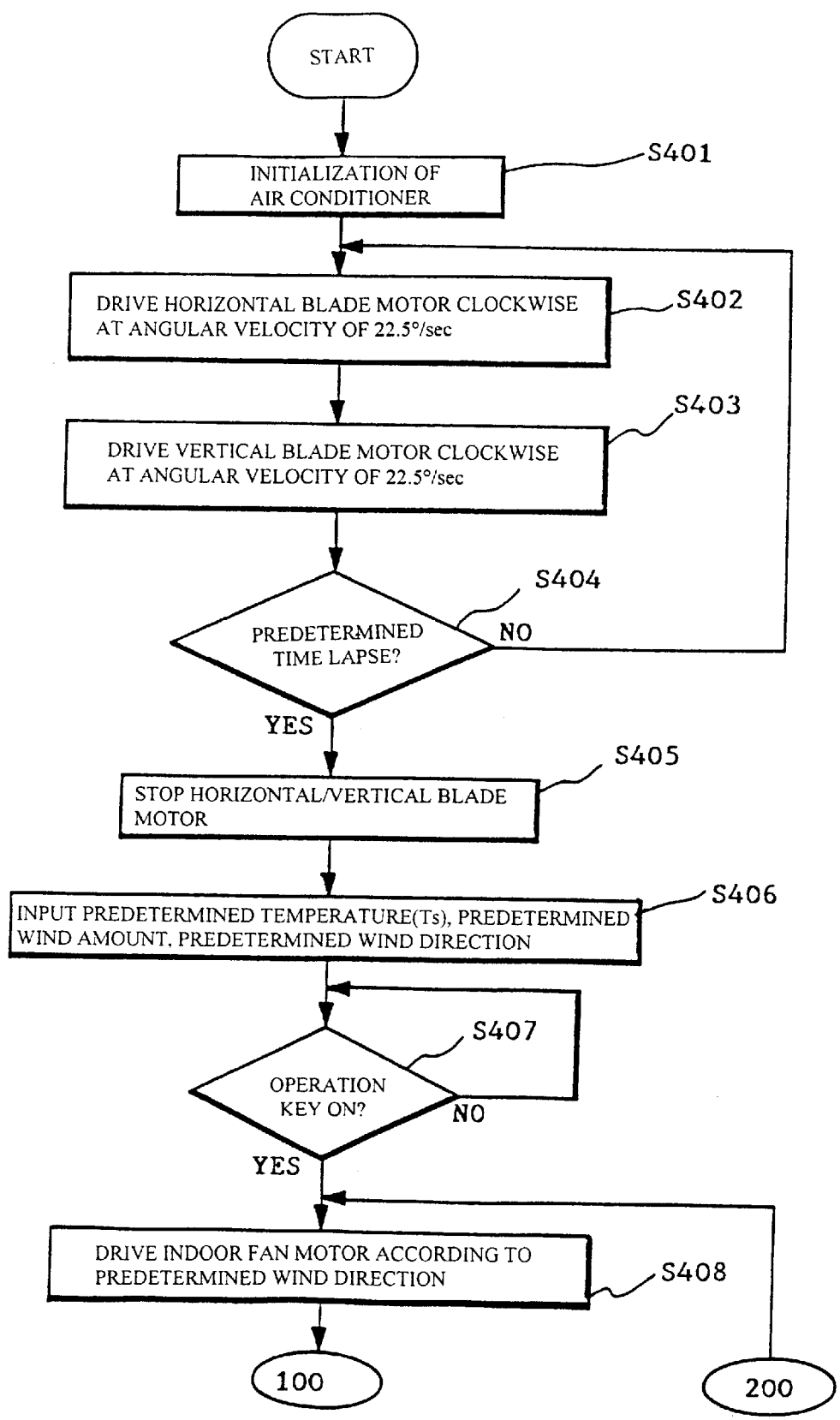
Figure 12B:
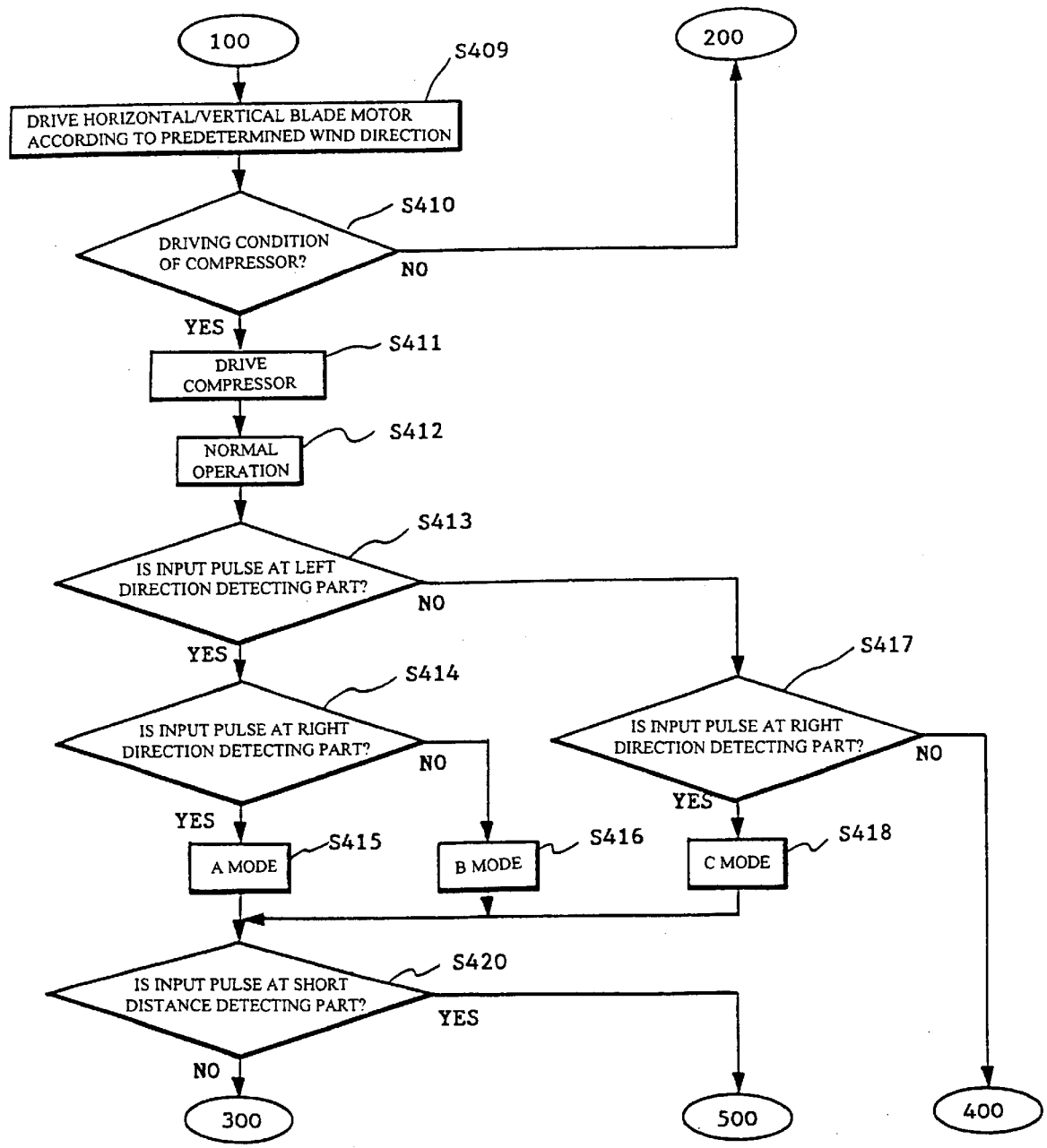
Figure 12C:
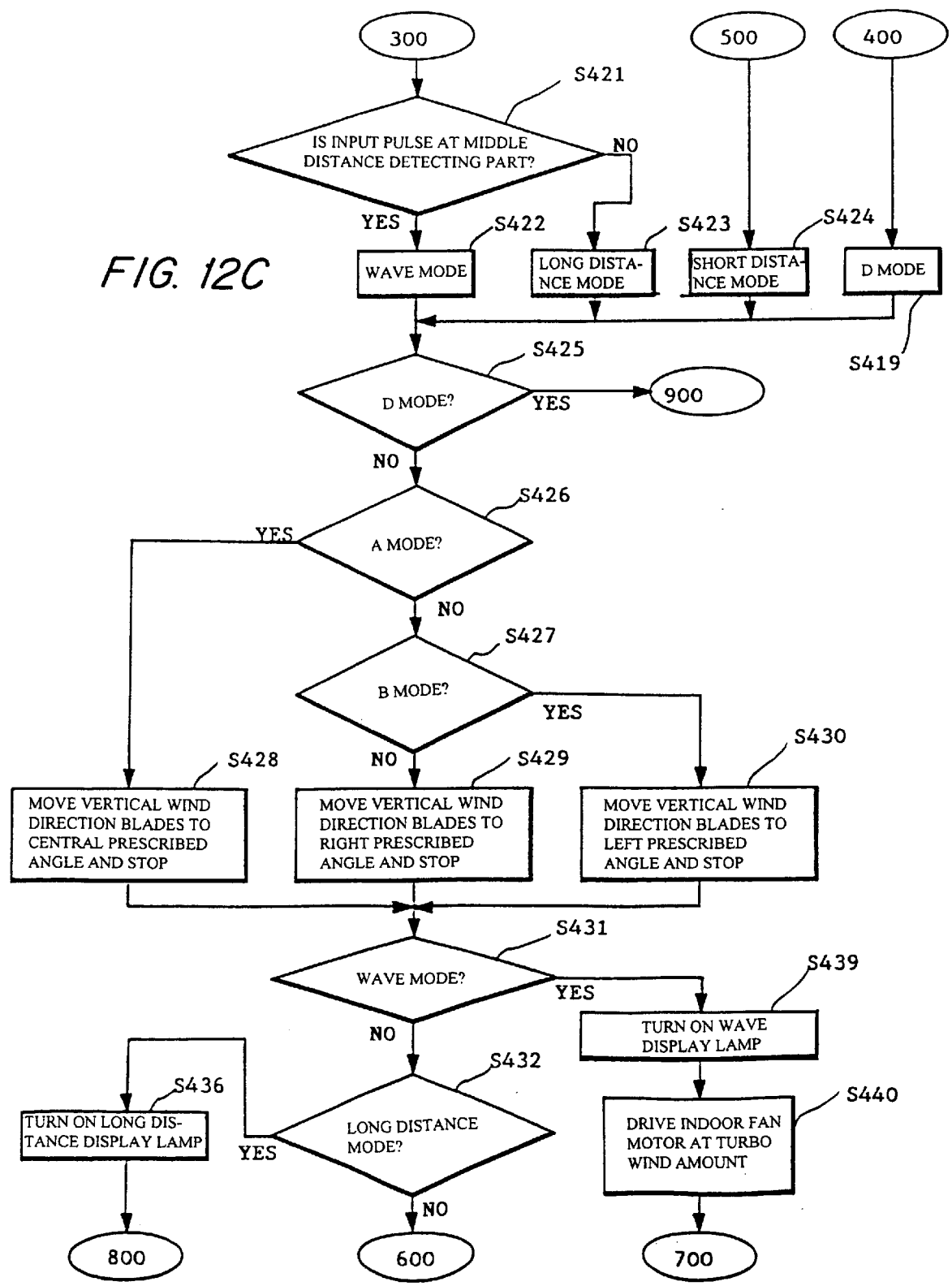
Figure 12E:
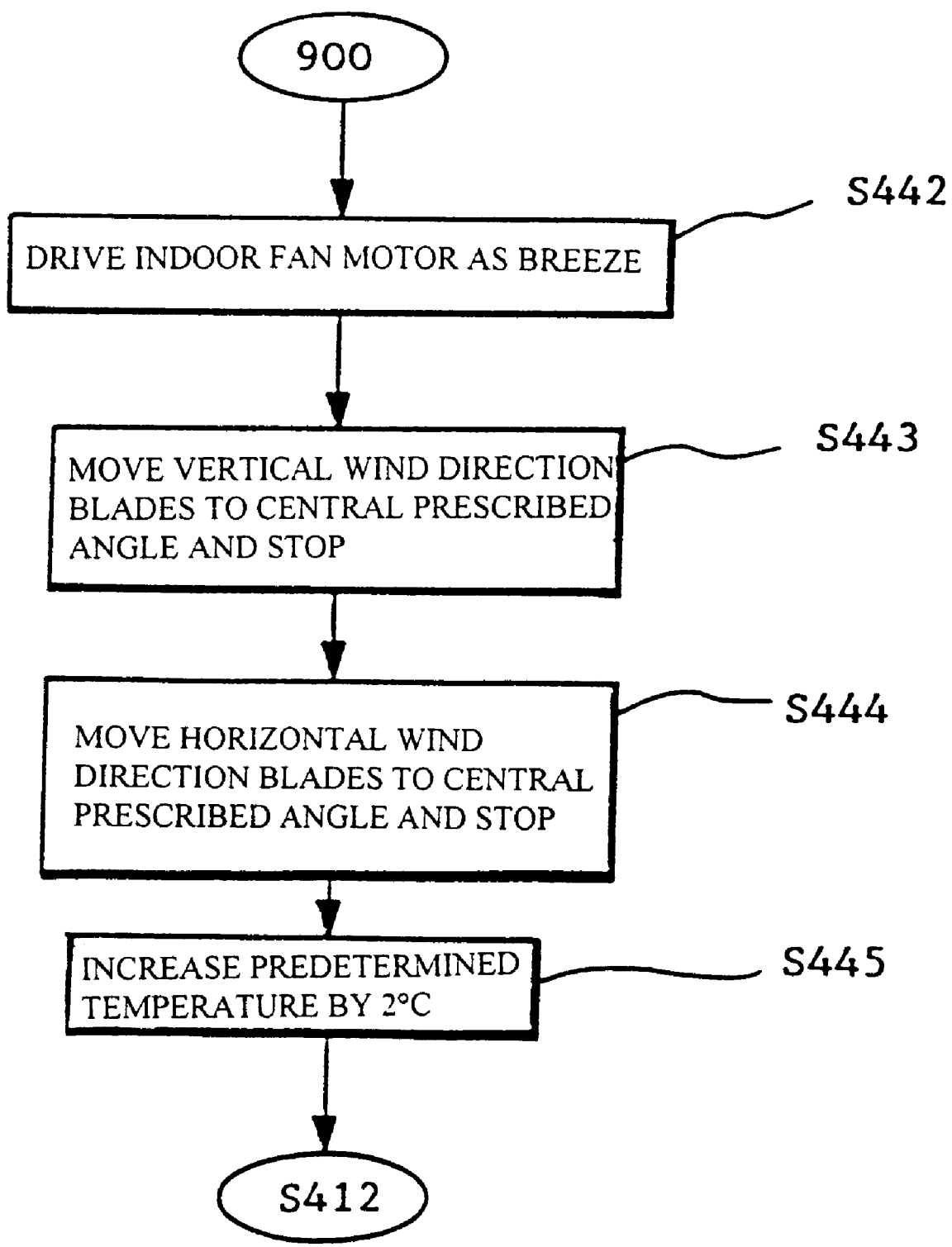
Figure 13A:
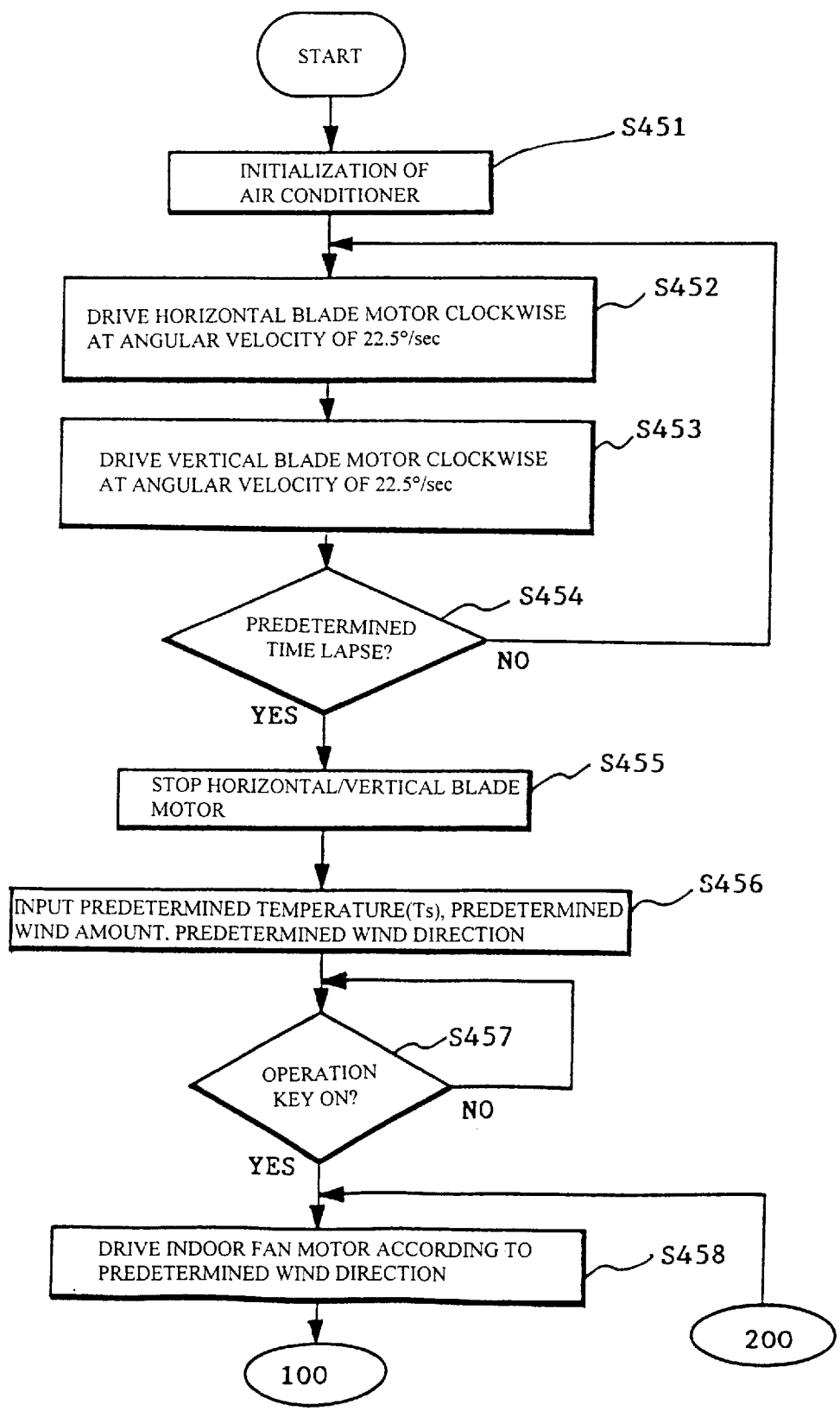
Figure 13B:
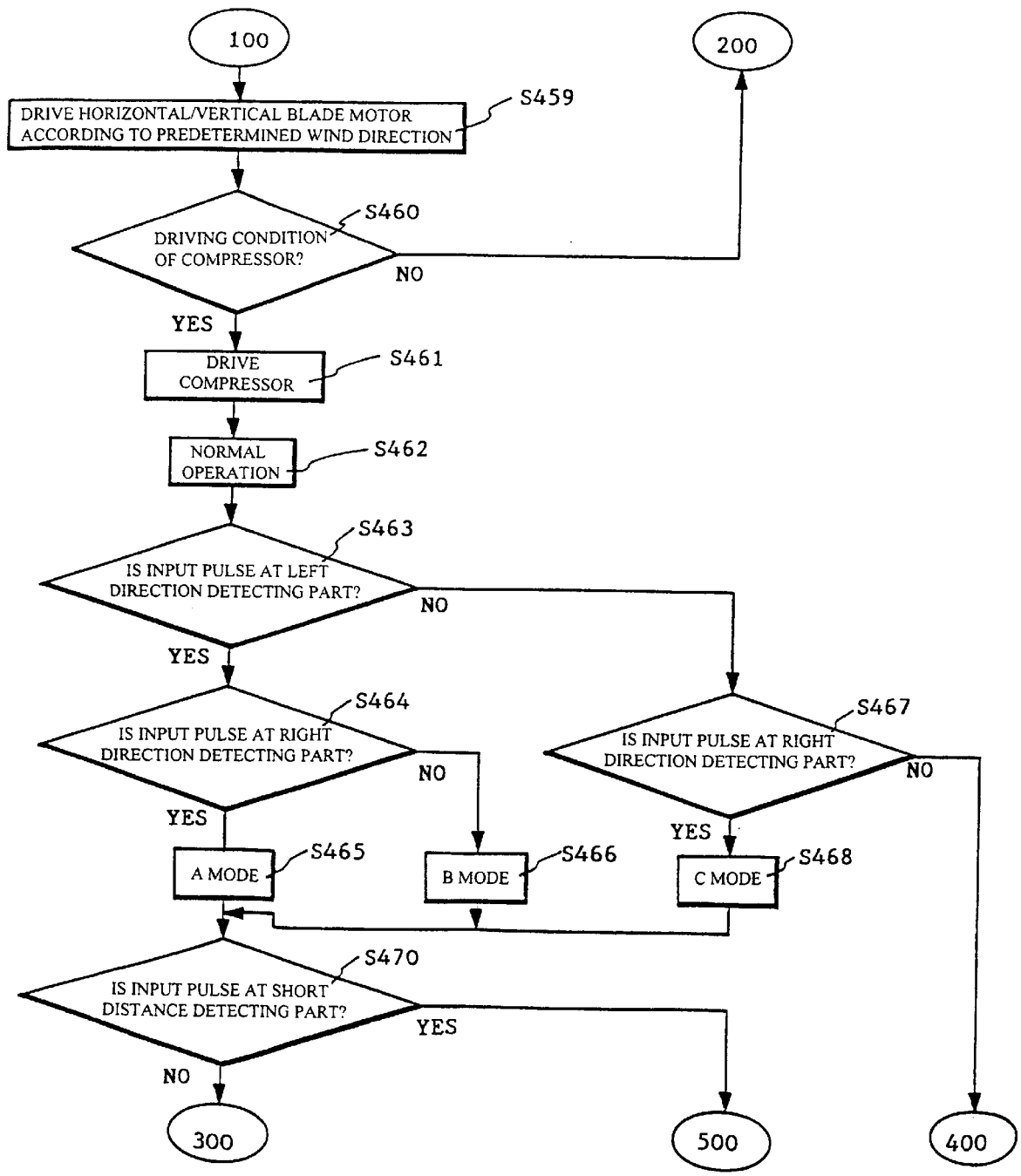
Figure 13C:
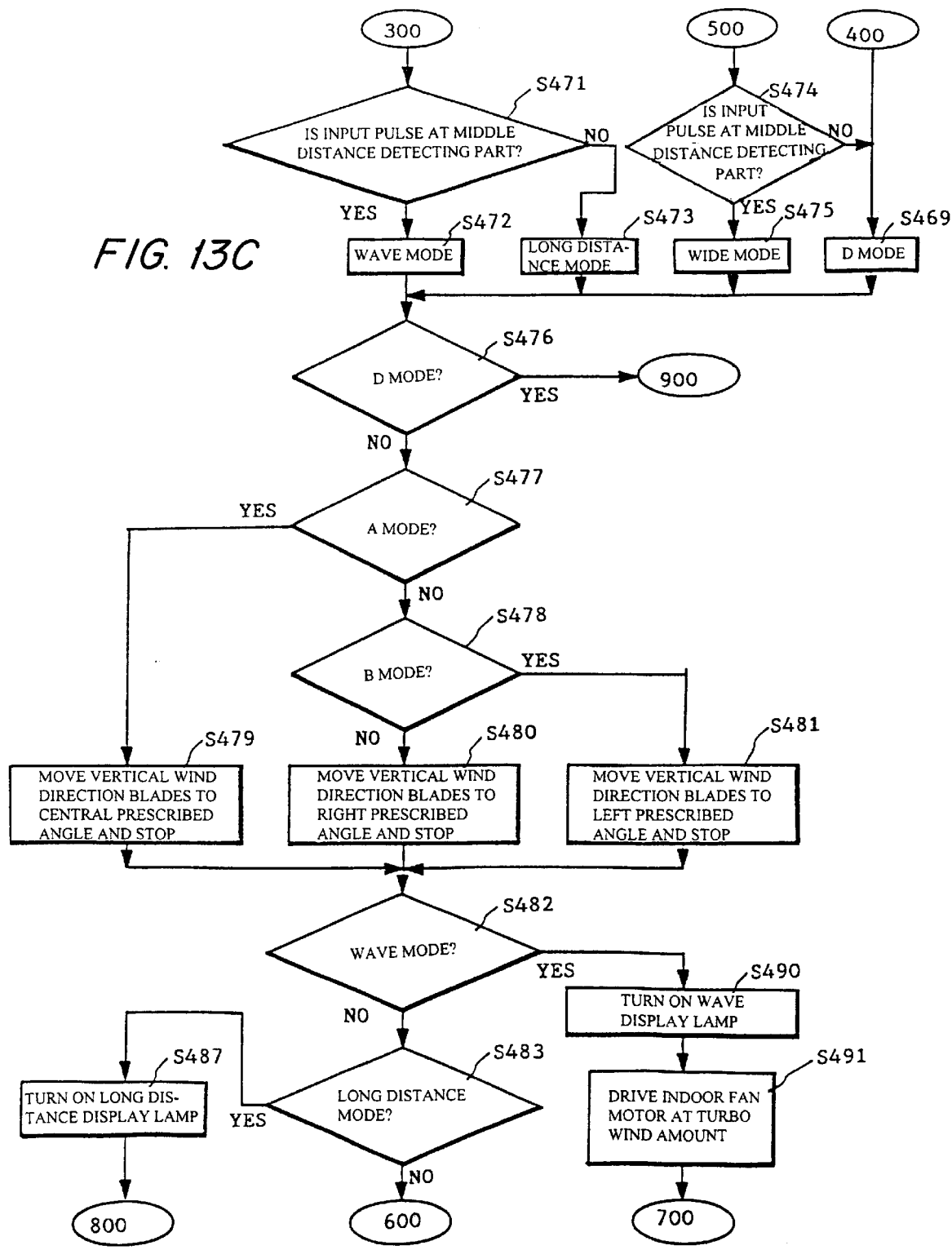
Figure 13E:
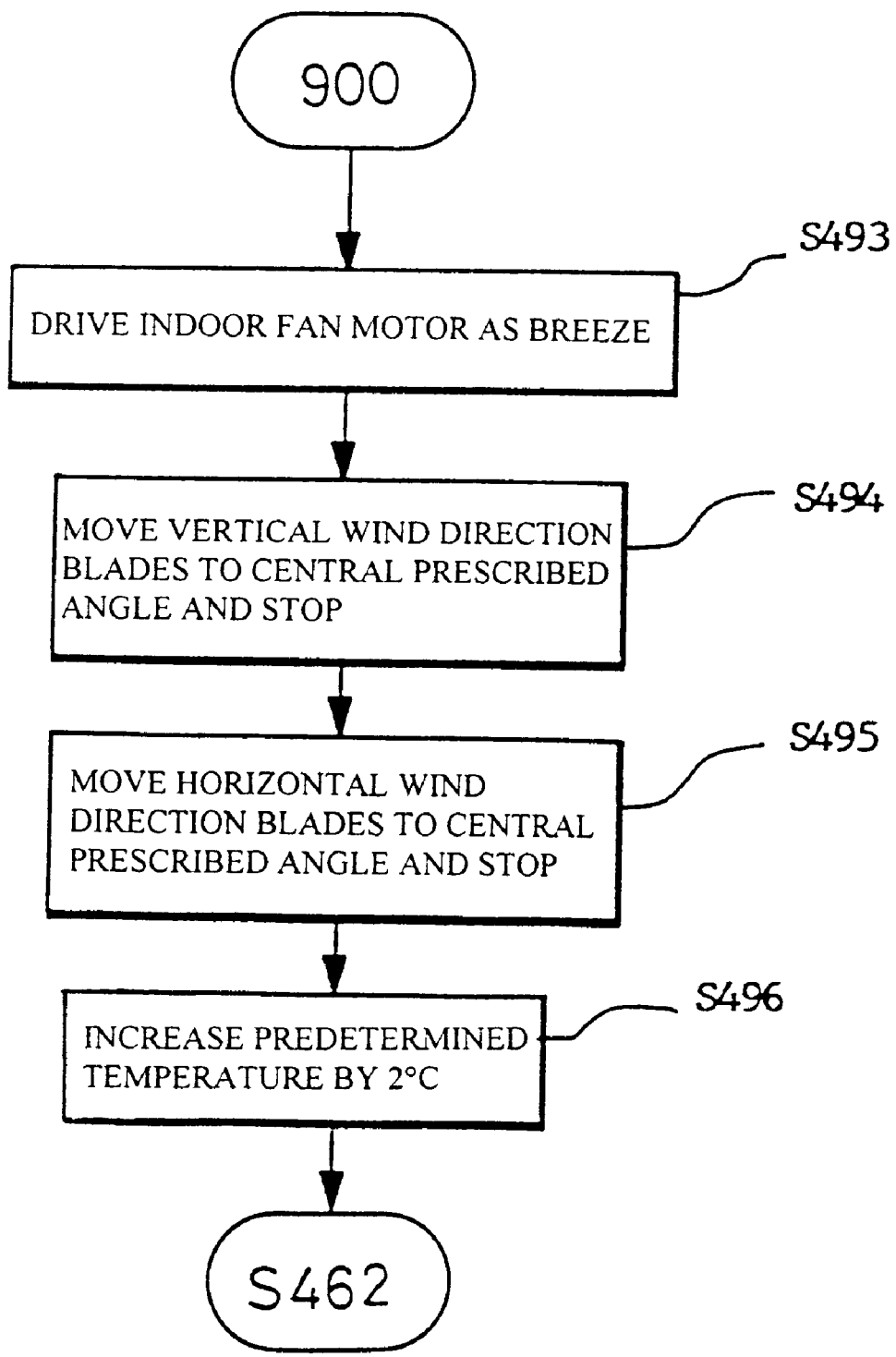

As a result of judgement at the step S74, if the operation mode is D mode (in case of YES), operations from step S90 to step S93 and those from the step S40 to the step S43 as shown in FIG. 4E are the same.

Next, an air conditioner including a short distance control and a long distance control is described with reference to FIGS. 6A to 6E.

FIGS. 6A to 6E are flow charts for showing a discharge current control operation in a short distance and long distance mode according to the present invention.

Operations from step S101 to step S119 and those from the step S1 to the step S19 shown in FIGS. 4A to 4C are the same.

At step S120, it is judged whether there is an input pulse at the short distance detecting part 106. If there is no input pulse at the short distance detecting part 106 (in case of NO), the flow proceeds to step S121, and it is judged whether there is an input pulse at the middle distance detecting part 108.

As a result of judgement at the step S121, if there is no input pulse at the middle distance detecting part 108 (in case of NO), it is determined that there are activities of human bodies at places which are far away from the body 1, the flow proceeds to step S122, and the control unit 116 sets the operation mode of the air conditioner to a long distance mode. If there is an input pulse at the middle distance detecting part 108 (in case of YES), the flow proceeds to step S119, and the control unit 116 sets the operation mode of the air conditioner to D mode.

On the other hand, as a result of judgement at the step S120, if there is an input pulse at the short distance detection part 106 (in case of YES), it is determined that there are activities of human bodies at the short distance which is near the body 1, the flow proceeds to step S123, and the control unit 116 sets the operation mode of the air conditioner to a short distance mode.

At step S124, it is judged whether the operation mode is D mode. If the operation mode is not D mode (in case of NO), the flow proceeds to step S125, and it is judged whether the operation mode is A mode. If the operation mode is A mode (in case of YES), the flow proceeds to step S127, the vertical blade control part 126 drives the vertical blade motor 127, moves the angle of the vertical wind direction blades 11 to a central prescribed angle as shown in FIG. 15(B), and then stops the driving of the vertical blade motor 127.

As a result of judgement at the step S125, if the operation mode is not A mode (in case of NO), the flow proceeds to step S126, and it is judged whether the operation mode is B mode. If the operation mode is not B mode (in case of NO), it is determined that the operation mode is C mode, and the flow proceeds to step S128. At the step S128, the vertical blade control part 126 drives the vertical blade motor 127 according to a control of the control unit 116, moves the angle of the vertical wind direction blades 11 to a right prescribed angle (about 15°) as shown in FIG. 15(C), and then stops the driving of the vertical blade motor 127.

As a result of judgement at the step S126, if the operation mode is B mode (in case of YES), the flow proceeds to step S129. The vertical blade control part 126 drives the vertical blade motor 127 according to a control of the control unit 116, moves the angle of the vertical wind direction blades 11 to a left prescribed angle (about 15°) as shown in FIG. 15(A), and then stops the driving of the vertical blade motor 127.

At step S130, it is judged whether the operation mode of the air conditioner is a long distance mode. If it is not the long distance mode (in case of NO), the flow proceeds to step S131 and it is judged whether the operation mode is a short distance mode.

As a result of judgement at the step S131, if it is a short distance mode (in case of YES), the flow proceeds to step S132 and the display unit 130 turns on a short distance display lamp according to the control of the control unit 116, thereby displaying the short distance operation state. At step S133, the fan motor driving unit 128 receives the control signal outputted from the control unit 116 and drives the indoor fan motor 21 at a turbo wind amount (about 670 RPM). At step S134, the control unit 116 outputs a control signal to the horizontal blade control part 124, so that the discharged air reaches the short distance.

Accordingly, the horizontal blade control part 124 drives the horizontal blade motor 125, moves the angle of the horizontal wind direction blades 9 to a downward prescribed angle (about 15°) as shown in FIG. 14(B), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied to the left, right or central side of places near the body 1 according to the downward prescribed angle fixation of the horizontal wind direction blades 9 and the left, right, or central prescribed angle fixation of the vertical wind direction blades 11 mounted at the discharge outlet 7, thereby air conditioning of the short distance mode is carried out, the flow returns to the step S113, and the operations below the step S113 are repeatedly carried out.

In addition, as a result of judgement at the step S130, if the operation mode is the long distance mode (in case of YES), the flow proceeds to step S135, and the control unit 116 outputs a control signal for displaying a long distance operation state air-conditioning a long distance which is far away from the body 1, to the display unit 130.

Accordingly, the display unit 130 turns on a long distance display lamp according to the control of the control unit 116 and displays the long distance operation state. At step S136, the fan motor driving unit 128 receives the control signal outputted from the control unit 116 and drives the indoor fan motor 21 at a turbo wind amount. At step S137, the control unit 116 outputs a control signal to the horizontal blade control part 124, so that the discharge air reaches the long distance which is far away from the body 1.

Accordingly, the horizontal blade control part 124 drives the horizontal blade motor 125, moves the angle of the horizontal wind direction blades 9 to a upward prescribed angle (about 15°) as shown in FIG. 14(A), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. Air conditioning of the long distance, which is far away from the body 1, is carried out according to the upward prescribed angle swing of the horizontal wind direction blades 9 and the left, right, or central prescribed angle fixation of the vertical which direction blades 11 mounted at the discharge outlet 7, the flow returns to the step S113, and the operations below the step S113 are repeatedly carried out.

As a result of judgement at the step S124, if the operation mode is D mode (in case of YES), operations from step S140 to step S143 and those from the step S40 to the step S43 shown in FIG. 4E are the same.

Next, an air conditioner including a wide control and a wave control is described with reference to FIGS. 7A to 7E.

FIGS. 7A to 7E are flow charts for showing a discharge current control operation in a wide and wave mode according to the present invention.

Operations from step S151 to step S169 and those from the step S1 to the step S19 shown in FIGS. 4A to 4C are the same.

At step S170, it is judged whether there is an input pulse at the middle distance detecting part 108. If there is an input pulse at the middle distance detecting part 108 (in case of YES), the flow proceeds to step S171, and it is judged whether there is an input pulse at the short distance detecting part 106.

As a result of judgement at the step S171, if there is an input pulse at the short distance detecting part 106 (in case of YES), it is determined that there are activities of human bodies at places which are relatively near the body 1 or relatively away from the body 1, the flow proceeds to step S172, and the control unit 116 sets the operation mode of the air conditioner to a wide mode. If there is no input pulse at the short distance detecting part 106 (in case of NO), it is determined that there are activities of human bodies at an indoor central portion which is relatively away from the body 1, the flow proceeds to step S173, and the control unit 116 sets the operation mode of the air conditioner to a wave mode.

On the other hand, as a result of judgement at the step S170, if there is no input pulse at the middle distance detecting part 108 (in case of NO), the flow proceeds to step S169, and the control unit 116 sets the operation mode of the air conditioner to D mode.

At step S174, it is judged whether the operation mode is D mode. If the operation mode is not D mode (in case of NO), the flow proceeds to step S175, and it is judged whether the operation mode is A mode. If the operation mode is A mode (in case of YES), the flow proceeds to step S177, the vertical blade control part 126 drives the vertical blade motor 127, moves the angle of the vertical wind direction blades 11 to a central prescribed angle as shown in FIG. 15(B), and then stops the driving of the vertical blade motor 127.

As a result of judgement at the step S175, if the operation mode is not A mode (in case of NO), the flow proceeds to step S176, and it is judged whether the operation mode is B mode. If the operation mode is not B mode (in case of NO), it is determined that the operation mode is C mode, and the flow proceeds to step S178. At the step S128, the vertical blade control part 126 drives the vertical blade motor 127 according to a control of the control unit 116, moves the angle of the vertical wind direction blades 11 to a right prescribed angle (about 15°) as shown in FIG. 15(C), and then stops the driving of the vertical blade motor 127.

As a result of judgement at the step S176, if the operation mode is B mode (in case of YES), the flow proceeds to step S179. The vertical blade control part 126 drives the vertical blade motor 127 according to a control of the control unit 116, moves the angle of the vertical wind direction blades 11 to a left prescribed angle (about 15°) as shown in FIG. 15(A), and then stops the driving of the vertical blade motor 127.

At step S180, it is judged whether the operation mode of the air conditioner is a wide mode. If it is not the wide mode (in case of NO), the flow proceeds to step S181 and it is judged whether the operation mode is a wave mode.

As a result of judgement at the step S181, if it is the wave mode (in case of YES), the flow proceeds to step S182 and the display unit 130 turns on a wave display lamp according to the control of the control unit 116, thereby displaying the wave operation state. At step S183, the fan motor driving unit 128 receives the control signal outputted from the control unit 116 and drives the indoor fan motor 21 at a turbo wind amount (about 670 RPM). At step S184, the control unit 116 outputs a control signal to the horizontal blade control part 124, so that the discharged air reaches the indoor central portion which is relatively away from the body 1.

Accordingly, the horizontal blade control part 124 drives the horizontal blade motor 125, so that the horizontal wind direction blades 9 swing at an upward prescribed angle (about 15°) as show in FIG. 14(C).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. Air conditioning of the indoor central portion is carried out according to the upward prescribed angle swing of the horizontal wind direction blades 9 and the left, right, or central prescribed angle fixation of the vertical which direction blades 11 mounted at the discharge outlet 7, the flow returns to the step S163, and the operations below the step S163 are repeatedly carried out.

In addition, as a result of judgement at the step S180, if the operation mode is the wide mode (in case of YES), the flow proceeds to step S185, the display unit 130 turns on a wide display lamp according to the control of the control unit 116 and displays the wide operation state. At step S186, the fan motor driving unit 128 receives the control signal outputted from the control unit 116 and drives the indoor fan motor 21 at a turbo wind amount. At step S187, the control unit 116 outputs a control signal to the horizontal blade control part 124, so that the discharged air is spread equally to the whole indoor areas.

Accordingly, the horizontal blade control part 124 receives the control signal outputted from the control unit 116 and drives the horizontal blade motor 125, thereby the horizontal wind direction blades 9 swing at an upward and downward prescribed angle (about 30°) as shown in FIG. 14(E).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. Air conditioning of the whole indoor areas is carried out according to the upward and downward prescribed angle swing of the horizontal wind direction blades 9 and the left, right, or central prescribed angle fixation of the vertical wind direction blades 11 mounted at the discharge outlet 7, the flow returns to the step S163, and the operations below the step S163 are repeatedly carried out.

As a result of judgement at the step S174, if the operation mode is D mode (in case of YES), operations from step S190 to step S193 and those from the step S40 to the step S43 shown in FIG. 4E are the same.

Next, an air conditioner including a wide control and a long distance control is described with reference to FIGS. 8A to 8E. FIGS. 8A to 8E are flow charts for showing a discharge current control operation in a wide and long distance mode according to the present invention.

Operations from step S201 to step S219 and those from the step S1 to the step S19 shown in FIGS. 4A to 4C are the same.

At step S 220, it is judged whether there is an input pulse at the middle distance detecting part 108. If there is an input pulse at the middle distance detecting part 108 (in case of YES), the flow proceeds to step S221, and it is judged whether there is an input pulse at the short distance detecting part 106.

As a result of judgement at the step S221, if there is an input pulse at the short distance detecting part 106 (in case of YES), it is determined that there are activities of human bodies at places which are relatively near the body 1 or relatively away from the body 1, the flow proceeds to step S222, and the control unit 116 sets the operation mode of the air conditioner to a wide mode. If there is no input pulse at the short distance detecting part 106 (in case of NO), the flow proceeds to the step S219, and the operation mode is set to D mode.

As a result of judgement at the step S220, if there is no input pulse at the middle distance detecting part 108 (in case of NO), it is determined that there are activities of human bodies at a long distance which is far away from the body 1, the flow proceeds to step S223, and the control unit 116 sets the operation mode of the air conditioner to a long distance mode.

At step S224, it is judged whether the operation mode is D mode. If the operation mode is not D mode (in case of NO), the flow proceeds to step S225, and it is judged whether the operation mode is A mode. If the operation mode is A mode (in case of YES), the flow proceeds to step S227, the vertical blade control part 126 drives the vertical blade motor 127, moves the angle of the vertical wind direction blades 11 to a central prescribed angle as shown in FIG. 15(B), and then stops the driving of the vertical blade motor 127.

As a result of judgement at the step S225, if the operation mode is not A mode (in case of NO), the flow proceeds to step S226, and it is judged whether the operation mode is B mode. If the operation mode is not B mode (in case of NO), it is determined that the operation mode is C mode, and the flow proceeds to step S228. At the step S228, the vertical blade control part 126 drives the vertical blade motor 127 according to a control of the control unit 116, moves the angle of the vertical wind direction blades 11 to a right prescribed angle (about 15°) as shown in FIG. 15(C), and then stops the driving of the vertical blade motor 127.

As a result of judgement at the step S226, if the operation mode is B mode (in case of YES), the flow proceeds to step S229. The vertical blade control part 126 drives the vertical blade motor 127 according to a control of the control unit 116, moves the angle of the vertical wind direction blades 11 to a left prescribed angle (about 15°) as shown in FIG. 15(A), and then stops the driving of the vertical blade motor 127.

At step S230, it is judged whether the operation mode of the air conditioner is a wide mode. If it is not the wide mode (in case of NO), the flow proceeds to step S231 and it is judged whether the operation mode is a long distance mode.

As a result of judgement at the step S231, if it is a long distance mode (in case of YES), the flow proceeds to step S232 and the display unit 130 turns on a long distance display lamp according to the control of the control unit 116, thereby displaying the long distance operation state. At step S233, the fan motor driving unit 128 receives the control signal outputted from the control unit 116 and drives the indoor fan motor 21 at a turbo wind amount (about 670 RPM). At step S234, the control unit 116 outputs a control signal to the horizontal blade control part 124, so that the discharged air reaches the long distance which is far away from the body 1.

Accordingly, the horizontal blade control part 124 drives the horizontal blade motor 125, moves the angle of the horizontal wind direction blades 9 to an upward prescribed angle (about 15°) as shown in FIG. 14(A), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied to the left, right or central side of places near the body 1 according to the upward prescribed angle fixation of the horizontal wind direction blades 9 and the left, right, or central prescribed angle fixation of the vertical wind direction blades 11 mounted at the discharge outlet 7, thereby air conditioning of the short distance mode is carried out, the flow returns to the step S213, and the operations below the step S213 are repeatedly carried out.

In addition, as a result of judgement at the step S230, if the operation mode is the wide mode (in case of YES), the flow proceeds to step S235, the display unit 130 turns on a wide display lamp according to the control of the control unit 116 and displays the wide operation state. At step S236, the fan motor driving unit 128 receives the control signal outputted from the control unit 116 and drives the indoor fan motor 21 at a turbo wind amount. At step S237, the control unit 116 outputs a control signal to the horizontal blade control part 124, so that the discharged air is spread equally to the whole indoor areas.

Accordingly, the horizontal blade control part 124 receives the control signal outputted from the control unit 116 and drives the horizontal blade motor 125, thereby the horizontal wind direction blades 9 swing at an upward and downward prescribed angle (about 30°) as shown in FIG. 14(E).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. Air conditioning of the whole indoor areas is carried out according to the upward and downward prescribed angle swing of the horizontal wind direction blades 9 and the left, right, or central prescribed angle fixation of the vertical wind direction blades 11 mounted at the discharge outlet 7, the flow returns to the step S213, and the operations below the step S213 are repeatedly carried out.

As a result of judgement at the step S224, if the operation mode is D mode (in case of YES), operations from step S240 to step S243 and those from the step S40 to the step S43 shown in FIG. 4E are the same.

Next, an air conditioner including a wave control and a long distance control is described with reference to FIGS. 9A to 9E.

FIGS. 9A to 9E are flow charts for showing a discharge current control operation in a wave and long distance mode according to the present invention.

Operations from step S251 to step S269 and those from the step S1 to the step S19 shown in FIGS. 4A to 4C are the same.

At step S270, it is judged whether there is an input pulse at the short distance detecting part 106. If there is no input pulse at the short distance detecting part 106 (in case of NO), the flow proceeds to step S271, and it is judged whether there is an input pulse at the middle distance detecting part 108.

As a result of judgement at the step S271, if there is an input pulse at the middle distance detecting part 108 (in case of YES), it is determined that there are activities of human bodies at places which are relatively away from the body 1, the flow proceeds to step S272, and the control unit 116 sets the operation mode of the air conditioner to a wave mode. If there is no input pulse at the middle distance detecting part 108 (in case of NO), it is determined that there are activities of human bodies at a long distance which is far away from the body 1, the flow proceeds to step S273, and the operation mode is set to a long distance mode.

On the other hand, as a result of judgement at the step S270, if there is an input pulse at the short distance detection part 106 (in case of YES), the flow proceeds to step S269, and the control unit 116 sets the operation mode of the air conditioner to a D mode.

At step S274, it is judged whether the operation mode is D mode. If the operation mode is not D mode (in case of NO), the flow proceeds to step S275, and it is judged whether the operation mode is A mode. If the operation mode is A mode (in case of YES), the flow proceeds to step S277, the vertical blade control part 126 drives the vertical blade motor 127, moves the angle of the vertical wind direction blades 11 to a central prescribed angle as shown in FIG. 15(B), and then stops the driving of the vertical blade motor 127.

As a result of judgement at the step S275, if the operation mode is not A mode (in case of NO), the flow proceeds to step S276, and it is judged whether the operation mode is B mode. If the operation mode is not B mode (in case of NO), it is determined that the operation mode is C mode, and the flow proceeds to step S278. At the step S278, the vertical blade control part 126 drives the vertical blade motor 127 according to a control of the control unit 116, moves the angle of the vertical wind direction blades 11 to a right prescribed angle (about 15°) as shown in FIG. 15(C), and then stops the driving of the vertical blade motor 127.

As a result of judgement at the step S276, if the operation mode is B mode (in case of YES), the flow proceeds to step S279. The vertical blade control part 126 drives the vertical blade motor 127 according to a control of the control unit 116, moves the angle of the vertical wind direction blades 11 to a left prescribed angle (about 15°) as shown in FIG. 15(A), and then stops the driving of the vertical blade motor 127.

At step S280, it is judged whether the operation mode of the air conditioner is a wave mode. If it is not the wave mode (in case of NO), the flow proceeds to step S281 and it is judged whether the operation mode is a long distance mode.

As a result of judgement at the step S281, if it is the long distance mode (in case of YES), the flow proceeds to step S282 and the display unit 130 turns on a long distance display lamp according to the control of the control unit 116, thereby displaying the long distance operation state. At step S283, the fan motor driving unit 128 receives the control signal outputted from the control unit 116 and drives the indoor fan motor 21 at a turbo wind amount (about 670 RPM). At step S284, the control unit 116 outputs a control signal to the horizontal blade control part 124, so that the discharged air reaches the long distance which is far away from the body 1.

Accordingly, the horizontal blade control part 124 drives the horizontal blade motor 125, moves the angle of the horizontal wind direction blades 9 to an upward prescribed angle (about 15°) as shown in FIG. 14(A), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the upward prescribed angle fixation of the horizontal wind direction blades 9 and the left, right, or central prescribed angle fixation of the vertical wind direction blades 11 mounted at the discharge outlet 7, thereby air conditioning of the long distance mode is carried out, the flow returns to the step S263, and the operations below the step S263 are repeatedly carried out.

In addition, as a result of judgement at the step S280, if the operation mode is the wave mode (in case of YES), the flow proceeds to step S285, and the display unit 130 turns on a wave display lamp according to the control of the control unit 116 and displays the wave operation state. At step S286, the fan motor driving unit 128 receives the control signal outputted from the control unit 116 and drives the indoor fan motor 21 at a turbo wind amount. At step S287, the control unit 116 outputs a control signal to the horizontal blade control part 124, so that the discharge air reaches places which are relatively away from the body 1.

Accordingly, the horizontal blade control part 124 receives the control signal outputted from the control unit 116 and drives the horizontal blade motor 125, thereby the horizontal wind direction blades 9 swing at an upward prescribed angle (about 15°) as shown in FIG. 14(C).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. Air conditioning of the indoor central portion is carried out according to the upward prescribed range swing of the horizontal wind direction blades 9 and the left, right, or central prescribed angle fixation of the vertical wind direction blades 11 mounted at the discharge outlet 7, the flow returns to the step S263, and the operations below the step S263 are repeatedly carried out.

As a result of judgement at the step S274, if the operation mode is D mode (in case of YES), operations from step S290 to step S293 and those from the step S40 to the step S43 shown in FIG. 4E are the same.

Next, an air conditioner including a short distance control, a wide control and a wave control is described with reference to FIGS. 10A to 10E.

FIGS. 10A to 10E are flow charts for showing a discharge current control operation in a short distance, wide and wave mode according to the present invention.

Operations from step S301 to step S319 and those from the step S1 to the step S19 shown in FIGS. 4A to 4C are the same.

At step S320, it is judged whether there is an input pulse at the short distance detecting part 106. If there is an input pulse at the short distance detecting part 106 (in case of YES), the flow proceeds to step S321, and it is judged whether there is an input pulse at the middle distance detecting part 108.

As a result of judgement at the step S321, if there is an input pulse at the middle distance detecting part 108 (in case of YES), it is determined that there are activities of human bodies at places which are relatively near or away from the body 1, the flow proceeds to step S322, and the control unit 116 sets the operation mode of the air conditioner to a wide mode. If there is no input pulse at the middle distance detecting part 108 (in case of NO), it is determined that there are activities of human bodies at a short distance which is near the body 1, the flow proceeds to step S323, and the operation mode is set to a short distance mode.

On the other hand, as a result of judgement at the step S320, if there is no input pulse at the short distance detection part 106 (in case of NO), the flow proceeds to step S324, and it is judged whether there is an input pulse at the middle distance detecting part 108.

As a result of judgement at the step S324, if there is no input pulse at the middle distance detecting part 108 (in case of NO), the flow proceeds to step S319, and the operation mode is set to D mode. If there is an input pulse at the middle distance detecting part 108 (in case of YES), it is determined that there are activities of human bodies at places which are relatively away from the body 1, the flow proceeds to step S325, and the operation mode is set to a wave mode.

At step S326, it is judged whether the operation mode is D mode. If the operation mode is not D mode (in case of NO), the flow proceeds to step S327, and it is judged whether the operation mode is A mode. If the operation mode is A mode (in case of YES), the flow proceeds to step S329, the vertical blade control part 126 drives the vertical blade motor 127, moves the angle of the vertical wind direction blades 11 to a central prescribed angle as shown in FIG. 15(B), and then stops the driving of the vertical blade motor 127.

As a result of judgement at the step S327, if the operation mode is not A mode (in case of NO), the flow proceeds to step S328, and it is judged whether the operation mode is B mode. If the operation mode is not B mode (in case of NO), it is determined that the operation mode is C mode, and the flow proceeds to step S330. At the step S330, the vertical blade control part 126 drives the vertical blade motor 127 according to a control of the control unit 116, moves the angle of the vertical wind direction blades 11 to a right prescribed angle (about 15°) as shown in FIG. 15(C), and then stops the driving of the vertical blade motor 127.

As a result of judgement at the step S328, if the operation mode is B mode (in case of YES), the flow proceeds to step S331. The vertical blade control part 126 drives the vertical blade motor 127 according to a control of the control unit 116, moves the angle of the vertical wind direction blades 11 to a left prescribed angle (about 15°) as shown in FIG. 15(A), and then stops the driving of the vertical blade motor 127.

At step S332, it is judged whether the operation mode of the air conditioner is a wide mode. If it is not the wide mode (in case of NO), the flow proceeds to step S333 and it is judged whether the operation mode is a short distance mode.

As a result of judgement at the step S333, if the operation mode is not the short distance mode (in case of NO), it is determined that the operation mode is a wave mode. The flow proceeds to step S334, the display unit 130 turns on a wave display lamp according to the control of the control unit 116 and displays the wave operation state. At step S335, the fan motor driving unit 128 receives the control signal outputted from the control unit 116 and drives the indoor fan motor 21 at a turbo wind amount. At step S336, the control unit 116 outputs a control signal to the horizontal blade control part 124, so that the discharged air reaches the indoor central portion which is relatively away from the body 1.

Accordingly, the horizontal blade control part 124 drives the horizontal blade motor 125, thereby the horizontal wind direction blades 9 swing at an upward prescribed angle (about 15°) as shown in FIG. 14(C).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. Air conditioning of the indoor central portion is carried out according to the upward prescribed angle swing of the horizontal wind direction blades 9 and the left, right, or central prescribed angle fixation of the vertical wind direction blades 11 mounted at the discharge outlet 7, the flow returns to the step S313, and the operations below the step S313 are repeatedly carried out.

As a result of judgement at the step S333, if the operation mode is the short distance mode (in case of YES), the flow proceeds to step S337, the display unit 130 turns on a short distance display lamp according to the control of the control unit 116 and displays the short distance operation state. At step S338, the fan motor driving unit 128 receives the control signal outputted from the control unit 116 and drives the indoor fan motor 21 at a turbo wind amount. At step S339, the control unit 116 outputs a control signal to the horizontal blade control part 124, so that the discharged air reaches the short distance which is near the body 1.

Accordingly, the horizontal blade control part 124 receives the control signal outputted from the control unit 116, drives the horizontal blade motor 125, moves the angle of the horizontal wind direction blades 9 to a downward prescribed angle (about 15°) as shown in FIG. 14(B), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the downward prescribed angle fixation of the horizontal wind direction blades 9 and the left, right, or central prescribed angle fixation of the vertical wind direction blades 11 mounted at the discharge outlet 7, thereby air conditioning of the short distance mode is carried out, the flow returns to the step S313, and the operations below the step S313 are repeatedly carried out.

On the other hand, as a result of judgement at the step S332, if the operation mode is the wide mode (in case of YES), the flow proceeds to step S340, and the display unit 130 turns on a wide display lamp according to the control of the control unit 116 and displays the wide operation state. At step S341, the fan motor driving unit 128 receives the control signal outputted from the control unit 116 and drives the indoor fan motor 21 at a turbo wind amount. At step 342, the control unit 116 outputs a control signal to the horizontal blade control part 124, so that the discharged air is spread equally to the whole indoor areas.

Accordingly, the horizontal blade control part 124 receives the control signal outputted from the control unit 116 and drives the horizontal blade motor 125, thereby the horizontal wind direction blades 9 swing at an upward and downward prescribed angle (about 30°) as shown in FIG. 14(E).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the upward/downward prescribed angle swing of the horizontal wind direction blades 9 and the left, right, or central prescribed angle fixation of the vertical wind direction blades 11 mounted at the discharge outlet 7, thereby air conditioning of the whole indoor areas is carried out, the flow returns to the step S313, and the operations below the step S313 are repeatedly carried out.

As a result of judgement at the step S326, if the operation mode is D mode (in case of YES), operations from step S343 to step S346 and those from the step S40 to the step S43 shown in FIG. 4E are the same.

Next, an air conditioner including a short distance control, a wide control and a long distance control is described with reference to FIGS. 11A to 11E.

FIGS. 11A to 11E are flow charts for showing a discharge current control operation in a short distance, wide and long distance mode according to the present invention.

Operations from step S351 to step S369 and those from the step S1 to the step S19 shown in FIGS. 4A to 4C are the same.

At step S370, it is judged whether there is an input pulse at the short distance detecting part 106. If there is an input pulse at the short distance detecting part 106 (in case of YES), the flow proceeds to step S371, and it is judged whether there is an input pulse at the middle distance detecting part 108.

As a result of judgement at the step S371, if there is an input pulse at the middle distance detecting part 108 (in case of YES), it is determined that there are activities of human bodies at places which are relatively near or away from the body 1, the flow proceeds to step S372, and the control unit 116 sets the operation mode of the air conditioner to a wide mode. If there is no input pulse at the middle distance detecting part 108 (in case of NO), it is determined that there are activities of human bodies at a short distance which is near the body 1, the flow proceeds to step S373, and the operation mode is set to a short distance mode.

On the other hand, as a result of judgement at the step S370, if there is no input pulse at the short distance detection part 106 (in case of NO), the flow proceeds to step S374, and it is judged whether there is an input pulse at the middle distance detecting part 108.

As a result of judgement at the step S374, if there is an input pulse at the middle distance detecting part 108 (in case of YES), the flow proceeds to step S369, and the operation mode is set to D mode. If there is no input pulse at the middle distance detecting part 108 (in case of NO), it is determined that there are activities of human bodies at a long distance which is far away from the body 1, the flow proceeds to step S375, and the operation mode is set to a long distance mode.

At step S376, it is judged whether the operation mode is D mode. If the operation mode is not D mode (in case of NO), the flow proceeds to step S377, and it is judged whether the operation mode is A mode. If the operation mode is A mode (in case of YES), the flow proceeds to step S379, the vertical blade control part 126 drives the vertical blade motor 127, moves the angle of the vertical wind direction blades 11 to a central prescribed angle as shown in FIG. 15(B), and then stops the driving of the vertical blade motor 127.

As a result of judgement at the step S377, if the operation mode is not A mode (in case of NO), the flow proceeds to step S378, and it is judged whether the operation mode is B mode. If the operation mode is not B mode (in case of NO), it is determined that the operation mode is C mode, and the flow proceeds to step S380. At the step S380, the vertical blade control part 126 drives the vertical blade motor 127 according to a control of the control unit 116, moves the angle of the vertical wind direction blades 11 to a right prescribed angle (about 15°) as shown in FIG. 15(C), and then stops the driving of the vertical blade motor 127.

As a result of judgement at the step S378, if the operation mode is B mode (in case of YES), the flow proceeds to step S381. The vertical blade control part 126 drives the vertical blade motor 127 according to a control of the control unit 116, moves the angle of the vertical wind direction blades 11 to a left prescribed angle (about 15°) as shown in FIG. 15(A), and then stops the driving of the vertical blade motor 127.

At step S382, it is judged whether the operation mode of the air conditioner is a wide mode. If it is not the wide mode (in case of NO), the flow proceeds to step S383 and it is judged whether the operation mode is a short distance mode.

As a result of judgement at the step S383, if the operation mode is not the short distance mode (in case of NO), it is determined that the operation mode is a long distance mode. The flow proceeds to step S384, the display unit 130 turns on a long distance display lamp according to the control of the control unit 116 and displays the long distance operation state. At step S385, the fan motor driving unit 128 receives the control signal outputted from the control unit 116 and drives the indoor fan motor 21 at a turbo wind amount (about, 670 RPM). At step S386, the control unit 116 outputs a control signal to the horizontal blade control part 124, so that the discharged air reaches the long distance.

Accordingly, the horizontal blade control part 124 drives the horizontal blade motor 125, moves the angle of the horizontal wind direction blades 9 to an upward prescribed angle (about 15°) as shown in FIG. 14(A), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the upward prescribed angle fixation of the horizontal wind direction blades 9 and the left, right, or central prescribed angle fixation of the vertical wind direction blades 11 mounted at the discharge outlet 7, thereby air conditioning of the long distance mode is carried out, the flow returns to the step S363, and the operations below the step S363 are repeatedly carried out.

In addition, as a result of judgement at the step S383, if the operation mode is the short distance mode (in case of YES), the flow proceeds to step S387, and the display unit 130 turns on a short distance display lamp according to the control of the control unit 116 and displays the short distance operation state. At step S388, the fan motor driving unit 128 receives the control signal outputted from the control unit 116 and drives the indoor fan motor 21 at a turbo wind amount. At step 389, the control unit 116 outputs a control signal to the horizontal blade control part 124, so that the discharged air reaches the short distance which is near the body 1.

Accordingly, the horizontal blade control part 124 receives the control signal outputted from the control unit 116, drives the horizontal blade motor 125, moves the angle of the horizontal wind direction blades 9 to a downward prescribed angle (about 15°) as shown in FIG. 14(B), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the downward prescribed angle fixation of the horizontal wind direction blades 9 and the left, right, or central prescribed angle fixation of the vertical wind direction blades 11 mounted at the discharge outlet 7, thereby air conditioning of the short distance mode is carried out, the flow returns to the step S363, and the operations below the step S363 are repeatedly carried out.

On the other hand, as a result of judgement at the step S382, if the operation mode is the wide mode (in case of YES), the flow proceeds to step S390, and the display unit 130 turns on a wide display lamp according to the control of the control unit 116 and displays the wide operation state. At step S391, the fan motor driving unit 128 receives the control signal outputted from the control unit 116 and drives the indoor fan motor 21 at a turbo wind amount. At step 392, the control unit 116 outputs a control signal to the horizontal blade control part 124, so that the discharged air is spread equally to the whole indoor areas.

Accordingly, the horizontal blade control part 124 receives the control signal outputted from the control unit 116 and drives the horizontal blade motor 125, thereby the horizontal wind direction blades 9 swing at an upward and downward prescribed angle (about 30°) as shown in FIG. 14(E).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the upward/downward prescribed angle swing of the horizontal wind direction blades 9 and the left, right, or central prescribed angle fixation of the vertical wind direction blades 11 mounted at the discharge outlet 7, thereby air conditioning of the whole indoor areas is carried out, the flow returns to the step S363, and the operations below the step S363 are repeatedly carried out.

As a result of judgement at the step S376, if the operation mode is D mode (in case of YES), operations from step S393 to step S396 and those from the step S40 to the step S43 shown in FIG. 4E are the same.

Next, an air conditioner including a short distance control, a wave control and a long distance control is described with reference to FIGS. 12A to 12E.

FIGS. 12A to 12E are flow charts for showing a discharge current control operation in a short distance, wave and long distance mode according to the present invention.

Operations from step S401 to step S419 and those from the step S1 to the step S19 shown in FIGS. 4A to 4C are the same.

At step S420, it is judged whether there is an input pulse at the short distance detecting part 106. If there is no input pulse at the short distance detecting part 106 (in case of NO), the flow proceeds to step S421, and it is judged whether there is an input pulse at the middle distance detecting part 108.

As a result of judgement at the step S421, if there is an input pulse at the middle distance detecting part 108 (in case of YES), it is determined that there are activities of human bodies at places which are relatively away from the body 1, the flow proceeds to step S422, and the control unit 116 sets the operation mode of the air conditioner to a wave mode. If there is no input pulse at the middle distance detecting part 108 (in case of NO), it is determined that there are activities of human bodies at a long distance, the flow proceeds to step S423, and the operation mode is set to a long distance mode.

On the other hand, as a result of judgement at the step S420, if there is an input pulse at the short distance detection part 106 (in case of YES), the flow proceeds to step S424, the operation mode is set to a short distance mode.

At step S425, it is judged whether the operation mode is D mode. If the operation mode is not D mode (in case of NO), the flow proceeds to step S426, and it is judged whether the operation mode is A mode. If the operation mode is A mode (in case of YES), the flow proceeds to step S428, the vertical blade control part 126 drives the vertical blade motor 127, moves the angle of the vertical wind direction blades 11 to a central prescribed angle as shown in FIG. 15(B), and then stops the driving of the vertical blade motor 127.

As a result of judgement at the step S426, if the operation mode is not A mode (in case of NO), the flow proceeds to step S427, and it is judged whether the operation mode is B mode. If the operation mode is not B mode (in case of NO), it is determined that the operation mode is C mode, and the flow proceeds to step S429. At the step S380, the vertical blade control part 126 drives the vertical blade motor 127 according to a control of the control unit 116, moves the angle of the vertical wind direction blades 11 to a right prescribed angle (about 15°) as shown in FIG. 15(C), and then stops the driving of the vertical blade motor 127.

As a result of judgement at the step S427, if the operation mode is B mode (in case of YES), the flow proceeds to step S430. The vertical blade control part 126 drives the vertical blade motor 127 according to a control of the control unit 116, moves the angle of the vertical wind direction blades 11 to a left prescribed angle (about 15°) as shown in FIG. 15(A), and then stops the driving of the vertical blade motor 127.

At step S431, it is judged whether the operation mode of the air conditioner is a wave mode. If it is not the wave mode (in case of NO), the flow proceeds to step S432 and it is judged whether the operation mode is a long distance mode.

As a result of judgement at the step S432, if the operation mode is not the long distance mode (in case of NO), it is determined that the operation mode is a short distance mode. The flow proceeds to step S433, the display unit 130 turns on a short distance display lamp according to the control of the control unit 116 and displays the short distance operation state. At step S434, the fan motor driving unit 128 receives the control signal outputted from the control unit 116 and drives the indoor fan motor 21 at a turbo wind amount (about, 670 RPM). At step S435, the control unit 116 outputs a control signal to the horizontal blade control part 124, so that the discharged air reaches the short distance.

Accordingly, the horizontal blade control part 124 drives the horizontal blade motor 125, moves the angle of the horizontal wind direction blades 9 to a downward prescribed angle (about 15°) as shown in FIG. 14(B), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the downward prescribed angle fixation of the horizontal wind direction blades 9 and the left, right, or central prescribed angle fixation of the vertical wind direction blades 11 mounted at the discharge outlet 7, thereby air conditioning of the short distance mode is carried out, the flow returns to the step S413, and the operations below the step S413 are repeatedly carried out.

In addition, as a result of judgement at the step S432, if the operation mode is the long distance mode (in case of YES), the flow proceeds to step S436, and the display unit 130 turns on a long distance display lamp according to the control of the control unit 116 and displays the long distance operation state. At step S437, the fan motor driving unit 128 receives the control signal outputted from the control unit 116 and drives the indoor fan motor 21 at a turbo wind amount. At step 438, the control unit 116 outputs a control signal to the horizontal blade control part 124, so that the discharged air reaches the long distance.

Accordingly, the horizontal blade control part 124 receives the control signal outputted from the control unit 116, drives the horizontal blade motor 125, moves the angle of the horizontal wind direction blades 9 to an upward prescribed angle (about 15°) as shown in FIG. 14(A), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the upward prescribed angle fixation of the horizontal wind direction blades 9 and the left, right, or central prescribed angle fixation of the vertical wind direction blades 11 mounted at the discharge outlet 7, thereby air conditioning of the long distance mode is carried out, the flow returns to the step S413, and the operations below the step S413 are repeatedly carried out.

On the other hand, as a result of judgement at the step S431, if the operation mode is the wave mode (in case of YES), the flow proceeds to step S439, and the display unit 130 turns on a wave display lamp according to the control of the control unit 116 and displays the wave operation state. At step S440, the fan motor driving unit 128 receives the control signal outputted from the control unit 116 and drives the indoor fan motor 21 at a turbo wind amount. At step 441, the control unit 116 outputs a control signal to the horizontal blade control part 124, so that the discharged air reaches the indoor central portion.

Accordingly, the horizontal blade control part 124 receives the control signal outputted from the control unit 116 and drives the horizontal blade motor 125, thereby the horizontal wind direction blades 9 swing at an upward prescribed angle (about 15°) as shown in FIG. 14(C).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the upward prescribed angle swing of the horizontal wind direction blades 9 and the left, right, or central prescribed angle fixation of the vertical wind direction blades 11 mounted at the discharge outlet 7, thereby air conditioning of the indoor central portion is carried out, the flow returns to the step S413, and the operations below the step S413 are repeatedly carried out.

As a result of judgement at the step S425, if the operation mode is D mode (in case of YES), operations from step S442 to step S445 and those from the step S40 to the step S43 shown in FIG. 4E are the same.

Next, an air conditioner including a wide control, a wave control and a long distance control is described with reference to FIGS. 13A to 13E.

FIGS. 13A to 13E are flow charts for showing a discharge current control operation in a wide, wave and long distance mode according to the present invention.

Operations from step S451 to step S469 and those from the step S1 to the step S19 shown in FIGS. 4A to 4C are the same.

At step S470, it is judged whether there is an input pulse at the short distance detecting part 106. If there is no input pulse at the short distance detecting part 106 (in case of NO), the flow proceeds to step S471, and it is judged whether there is an input pulse at the middle distance detecting part 108.

As a result of judgement at the step S471, if there is an input pulse at the middle distance detecting part 108 (in case of YES), it is determined that there are activities of human bodies at places which are relatively away from the body 1, the flow proceeds to step S472, and the control unit 116 sets the operation mode of the air conditioner to a wave mode. If there is no input pulse at the middle distance detecting part 108 (in case of NO), it is determined that there are activities of human bodies at a long distance, the flow proceeds to step S473, and the operation mode is set to a long distance mode.

On the other hand, as a result of judgement at the step S470, if there is an input pulse at the short distance detection part 106 (in case of YES), the flow proceeds to step S474, and it is judged whether there is an input pulse at the middle distance detecting part 108.

As a result of judgement at the step S474, if there is no input pulse at the middle distance detecting part 108 (in case of YES), the flow proceeds to step S469, and the operation mode is set to D mode. If there is an input pulse at the middle distance detecting part 108 (in case of YES), it is determined that there are activities of human bodies at whole indoor areas, the flow proceeds to step S475, and the operation mode is set to a wide mode.

At step S476, it is judged whether the operation mode is D mode. If the operation mode is not D mode (in case of NO), the flow proceeds to step S477, and it is judged whether the operation mode is A mode. If the operation mode is A mode (in case of YES), the flow proceeds to step S479, the vertical blade control part 126 drives the vertical blade motor 127, moves the angle of the vertical wind direction blades 11 to a central prescribed angle as shown in FIG. 15(B), and then stops the driving of the vertical blade motor 127.

As a result of judgement at the step S477, if the operation mode is not A mode (in case of NO), the flow proceeds to step S478, and it is judged whether the operation mode is B mode. If the operation mode is not B mode (in case of NO), it is determined that the operation mode is C mode, and the flow proceeds to step S480. At the step S480, the vertical blade control part 126 drives the vertical blade motor 127 according to a control of the control unit 116, moves the angle of the vertical wind direction blades 11 to a right prescribed angle (about 15°) as shown in FIG. 15(C), and then stops the driving of the vertical blade motor 127.

As a result of judgement at the step S478, if the operation mode is B mode (in case of YES), the flow proceeds to step S481. The vertical blade control part 126 drives the vertical blade motor 127 according to a control of the control unit 116, moves the angle of the vertical wind direction blades 11 to a left prescribed angle (about 15°) as shown in FIG. 15(A), and then stops the driving of the vertical blade motor 127.

At step S482, it is judged whether the operation mode of the air conditioner is a wave mode. If it is not the wide mode (in case of NO), the flow proceeds to step S483 and it is judged whether the operation mode is a long distance mode.

As a result of judgement at the step S483, if the operation mode is not the long distance mode (in case of NO), it is determined that the operation mode is a wide mode. The flow proceeds to step S484, the display unit 130 turns on a wide display lamp according to the control of the control unit 116 and displays the wide operation state. At step S485, the fan motor driving unit 128 receives the control signal outputted from the control unit 116 and drives the indoor fan motor 21 at a turbo wind amount (about, 670 RPM). At step S486, the control unit 116 outputs a control signal to the horizontal blade control part 124, so that the discharged air is spread to whole indoor areas.

Accordingly, the horizontal blade control part 124 drives the horizontal blade motor 125, thereby the horizontal wind direction blades 9 swing at an upward and downward prescribed angle (about 30°) as shown in FIG. 14(E).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. Air conditioning of the whole indoor areas is carried out according to the upward and downward prescribed angle swing of the horizontal wind direction blades 9 and the left, right, or central prescribed angle fixation of the vertical wind direction blades 11 mounted at the discharge outlet 7, the flow returns to the step S463, and the operations below the step S463 are repeatedly carried out.

As a result of judgement at the step S483, if the operation mode is the long distance mode (in case of YES), the flow proceeds to step S487, the display unit 130 turns on a long distance display lamp according to the control of the control unit 116 and displays the long distance operation state. At step S488, the fan motor driving unit 128 receives the control signal outputted from the control unit 116 and drives the indoor fan motor 21 at a turbo wind amount. At step S489, the control unit 116 outputs a control signal to the horizontal blade control part 124, so that the discharged air reaches the long distance.

Accordingly, the horizontal blade control part 124 receives the control signal outputted from the control unit 116, drives the horizontal blade motor 125, moves the angle of the horizontal wind direction blades 9 to an upward prescribed angle (about 15°) as shown in FIG. 14(A), and then stops the driving of the horizontal blade motor 125.

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the upward prescribed angle fixation of the horizontal wind direction blades 9 and the left, right, or central prescribed angle fixation of the vertical wind direction blades 11 mounted at the discharge outlet 7, thereby air conditioning of the long distance mode is carried out, the flow returns to the step S463, and the operations below the step S463 are repeatedly carried out.

On the other hand, as a result of judgement at the step S482, if the operation mode is the wide mode (in case of YES), the flow proceeds to step S490, and the display unit 130 turns on a wave display lamp according to the control of the control unit 116 and displays the wave operation state. At step S491, the fan motor driving unit 128 receives the control signal outputted from the control unit 116 and drives the indoor fan motor 21 at a turbo wind amount. At step 492, the control unit 116 outputs a control signal to the horizontal blade control part 124, so that the discharged air reaches the indoor central portion.

Accordingly, the horizontal blade control part 124 receives the control signal outputted from the control unit 116 and drives the horizontal blade motor 125, thereby the horizontal wind direction blades 9 swing at an upward prescribed angle (about 15°) as shown in FIG. 14(C).

According to this, the indoor air sucked through the suction inlet 3 is heat-exchanged by the latent heat of vaporization of the refrigerant flowing within the heat exchanger 19 during the passage of the heat exchanger 19, and the heat-exchanged air is guided upward by means of the duct member 25. The guided and discharged air flow is supplied according to the upward prescribed angle swing of the horizontal wind direction blades 9 and the left, right, or central prescribed angle fixation of the vertical wind direction blades 11 mounted at the discharge outlet 7, thereby air conditioning of the indoor central portion is carried out, the flow returns to the step S463, and the operations below the step S463 are repeatedly carried out.

As a result of judgement at the step S476, if the operation mode is D mode (in case of YES), operations from step S493 to step S496 and those from the step S40 to the step S43 shown in FIG. 4E are the same.

According to the discharge current control apparatus for the air conditioner and method thereof according to the present invention, a wind direction, a wind amount, and a predetermined temperature of a discharged air are automatically controlled by detecting existence and inexistence of a human body, proximity state between an indoor unit body and a human body, position of a human body, and activity quantity of a human body at whole areas of an indoor space, so that the air conditioner is convenient for use and a delightful room can be provided owing to air conditioning of whole areas of the indoor space.

What is claimed is:

1. A discharge current control apparatus of an air conditioner having a plurality of suction inlets for sucking an indoor air, a heat exchanger for heat-exchanging said indoor air sucked through said suction inlets, a discharge outlet for discharging the air heat-exchanged by said heat exchanger, a plurality of wind direction blades for controlling a wind direction of the air discharged through said discharge outlet, and an indoor fan for controlling a wind amount of the air discharged through said discharge outlet, the apparatus comprising:

distance detecting means for sensing a human body nearness distance by detecting infrared generated from a human body;

position detecting means for sensing a human body left and right position by detecting infrared generated from a human body;

control means for controlling a wind direction, a wind amount, and a predetermined temperature of the discharged air, so that the discharged air can be supplied to an area where the human body exists according to the human body nearness distance sensed by said distance detecting means and the human body left and right position sensed by said position detecting means;

wind direction control means for controlling a wind direction of the discharged air by controlling an angle of the wind direction of said wind direction blades according to the control of said control means;

wind amount control means for controlling a wind amount of the discharged air by controlling a velocity of said indoor fan according to the control of said control means; and display means for receiving a control signal outputted from said control means and displaying a short distance, a wide, a wave, and a long distance operation states according to the human body nearness distance sensed by said distance detecting means and the human body left and right position sensed by said position detecting means.

2. A discharge current control method of an air condition comprising:

a distance detecting means for sensing a human body nearness distance by detecting infrared generated from a human body;

a position detecting step for sensing a human body left and right position by detecting infrared generated from a human body;

a wind direction control step for controlling a wind amount of the discharged air by controlling a velocity of an indoor fan according to the human body nearness distance sensed by said distance detecting step and the human body left and right position sensed by said position detecting step; and a temperature control step for controlling a predetermined temperature according to the human body left and right position sensed by said position detecting step.

3. A discharge current control method of an air conditioner comprising:

a human body judgement step for judging whether a position of said human body is a short distance, wave, and long distance operation by detecting infrared generated from said human body;

a wind direction control step for controlling a wind direction of a discharged air so that said discharged air can be supplied to a short distance, an indoor central portion, and a long distance according to the position of said human body judged by said human body judgement step;

a wind amount control step for controlling a wind amount of a discharged air so that said discharged air can be supplied to a short distance, an indoor central portion, and a long distance according to the position of said human body judged by said human body judgement step;

a display step for displaying the short distance, wave, and long distance operation state according to the position of said human body judged by said human body judgement step.

4. A discharge current control method of an air conditioner comprising:

a human body judgement step for judging whether a position of said human body is a short distance and wide operation by detecting infrared generated from said human body;

a wind direction control step for controlling a wind direction of a discharged air so that said discharged air can be supplied to a short distance and whole indoor areas according to the position of said human body judged by said human body judgement step;

a wind amount control step for controlling a wind amount of a discharged air so that said discharged air can be supplied to a short distance and whole indoor areas according to the position of said human body judged by said human body judgement step;

a display step for displaying the short distance and wide operation state according to the position of said human body judged by said human body judgement step.

5. A discharge current control method of an air conditioner comprising:

a human body judgement step for judging whether a position of said human body is a short distance and wave operation by detecting infrared generated from said human body;

a wind direction control step for controlling a wind direction of a discharged air so that said discharged air can be supplied to a short distance and an indoor central portion according to the position of said human body judged by said human body judgement step;

a wind amount control step for controlling a wind amount of a discharged air so that said discharged air can be supplied to a short distance and an indoor central portion according to the position of said human body judged by said human body judgement step;

a display step for displaying the short distance and wave operation state according to the position of said human body judged by said human body judgement step.

6. A discharge current control method of an air conditioner comprising:

a human body judgement step for judging whether a position of said human body is a short distance and long distance operation by detecting infrared generated from said human body;

a wind direction control step for controlling a wind direction of a discharged air so that said discharged air can be supplied to a short distance and a long distance according to the position of said human body judged by said human body judgement step;

a wind amount control step for controlling a wind amount of a discharged air so that said discharged air can be supplied to a short distance and a long distance according to the position of said human body judged by said human body judgement step;

a display step for displaying the short distance and long distance operation state according to the position of said human body judged by said human body judgement step.

7. A discharge current control method of an air conditioner comprising:

a human body judgement step for judging whether, a position of said human body is a wide and wave operation by detecting infrared generated from said human body;

a wind direction control step for controlling a wind direction of a discharged air so that said discharged air can be supplied to whole indoor areas and an indoor central portion according to the position of said human body judged by said human body judgement step;

a wind amount control step for controlling a wind amount of a discharged air so that said discharged air can be supplied to whole indoor areas and an indoor central portion according to the position of said human body judged by said human body judgement step;

a display step for displaying the wide and wave operation state according to the position of said human body judged by said human body judgement step.

8. A discharge current control method of an air conditioner comprising:

a human body judgement step for judging whether a position of said human body is a wide and long distance operation by detecting infrared generated from said human body;

a wind direction control step for controlling a wind direction of a discharged air so that said discharged air can be supplied to whole indoor areas and a long distance according to the position of said human body judged by said human body judgement step;

a wind amount control step for controlling a wind amount of a discharged air so that said discharged air can be supplied to whole indoor areas and a long distance according to the position of said human body judged by said human body judgement step;

a display step for displaying the wide and long distance operation state according to the position of said human body judged by said human body judgement step.

9. A discharge current control method of an air conditioner comprising:

a human body judgement step for judging whether a position of said human body is a wave and long distance operation by detecting infrared generated from said human body;

a wind direction control step for controlling a wind direction of a discharged air so that said discharged air can be supplied to an indoor central portion and a long distance according to the position of said human body judged by said human body judgement step;

a wind amount control step for controlling a wind amount of a discharged air so that said discharged air can be supplied to an indoor central portion and a long distance according to the position of said human body judged by said human body judgement step;

a display step for displaying the wave and long distance operation state according to the position of said human body judged by said human body judgement step.

10. A discharge current control method of an air conditioner comprising:

a human body judgement step for judging whether a position of said human body is a short distance, wide, and wave operation by detecting infrared generated from said human body;

a wind direction control step for controlling a wind direction of a discharged air so that said discharged air can be supplied to a short distance, whole indoor areas, and an indoor central portion according to the position of said human body judged by said human body judgement step;

a wind amount control step for controlling a wind amount of a discharged air so that said discharged air can be supplied to a short distance, whole indoor areas, and an indoor central portion according to the position of said human body judged by said human body judgement step;

a display step for displaying the short distance, wide, and wave operation state according to the position of said human body judged by said human body judgement step.

11. A discharge current control method of an air conditioner comprising:

a human body judgement step for judging whether a position of said human body is a short distance, wide, and long distance operation by detecting infrared generated from said human body;

a wind direction control step for controlling a wind direction of a discharged air so that said discharged air can be supplied to a short distance, whole indoor areas, and a long distance according to the position of said human body judged by said human body judgement step;

a wind amount control step for controlling a wind amount of a discharged air so that said discharged air can be supplied to a short distance, whole indoor areas, and a long distance according to the position of said human body judged by said human body judgement step;

a display step for displaying the short distance, wide, and long distance operation state according to the position of said human body judged by said human body judgement step.

12. A discharge current control method of an air conditioner comprising:

a human body judgement step for judging whether a position of said human body is a wide, wave, and long distance operation by detecting infrared generated from said human body;

a wind direction control step for controlling a wind direction of a discharged air so that said discharged air can be supplied to whole indoor areas, an indoor central portion, and a long distance according to the position of said human body judged by said human body judgement step;

a wind amount control step for controlling a wind amount of a discharged air so that said discharged air can be supplied to whole indoor areas, an indoor central portion, and a long distance according to the position of said human body judged by said human body judgement step;

a display step for displaying the wide, wave, and long distance operation state according to the position of said human body judged by said human body judgement step.

13. A discharge current control method of an air conditioner as in any one of claims 2 to 12, wherein if the position of said human body is the short distance operation at said human body judgement step, said wind direction control step fixes horizontal wind direction blades at a downward prescribed angle, moves vertical wind direction blades, and controls the direction of said discharged air to the short distance.

14. A discharge current control method of an air conditioner as in any one of claims 2 to 12, wherein if the position of said human body is the wide operation at said human body judgement step, said wind direction control step swings horizontal wind direction blades upward and downward, moves vertical wind direction blades, and controls the direction of said discharged air to the whole indoor areas.

15. A discharge current control method of an air conditioner as in any one of claims 2 to 12, wherein if the position of said human body is the wave operation at said human body judgement step, said wind direction control step swings horizontal wind direction blades at upward prescribed range, moves vertical wind direction blades, and controls the direction of said discharged air to the indoor central portion.

16. A discharge current control method of an air conditioner as in any one of claims 2 to 12, wherein if the position of said human body is the long distance operation at said human body judgement step, said wind direction control step fixes horizontal wind direction blades at a upward prescribed angle, moves vertical wind direction blades, and controls the direction of said discharged air to the long distance.

* * * * *